(12) United States Patent
Farlow et al.

(10) Patent No.: US 9,014,848 B2
(45) Date of Patent: Apr. 21, 2015

(54) MOBILE ROBOT SYSTEM

(75) Inventors: Timothy S. Farlow, Needham, MA (US); Michael Rosenstein, S. Hadley, MA (US); Michael Halloran, Waltham, MA (US); Chikyung Won, Tewksbury, MA (US); Steven V. Shamlian, Bedford, MA (US); Mark Chiappetta, Chelmsford, MA (US)

(73) Assignee: iRobot Corporation, Bedford, MA (US)

( * ) Notice: Subject to any disclaimer, the term of this patent is extended or adjusted under 35 U.S.C. 154(b) by 929 days.

(21) Appl. No.: 13/032,406

(22) Filed: Feb. 22, 2011

(65) Prior Publication Data

US 2011/0288684 A1 Nov. 24, 2011

Related U.S. Application Data

(60) Provisional application No. 61/346,612, filed on May 20, 2010, provisional application No. 61/356,910, filed on Jun. 21, 2010, provisional application No. 61/428,717, filed on Dec. 30, 2010, provisional application No. 61/428,734, filed on Dec. 30, 2010, provisional application No. 61/428,759, filed on Dec. 30, 2010, provisional application No. 61/429,863, filed on Jan. 5, 2011.

(51) Int. Cl.
| | |
|---|---|
| G05D 1/02 | (2006.01) |
| B25J 5/00 | (2006.01) |
| B25J 11/00 | (2006.01) |
| G05D 1/00 | (2006.01) |

(Continued)

(52) U.S. Cl.
CPC .............. *G05D 1/0246* (2013.01); *B25J 11/009* (2013.01); *G05D 1/0011* (2013.01); *G05D 1/0274* (2013.01); *G05D 1/0227* (2013.01); *G05D 1/024* (2013.01); *G05D 1/0242* (2013.01); *G05D 1/0255* (2013.01); *G05D 1/027* (2013.01); *G05D 1/0272* (2013.01); *G05D 2201/0206* (2013.01); *G05D 2201/0211* (2013.01); *Y10S 901/01* (2013.01); *Y10S 901/47* (2013.01)

(58) Field of Classification Search
USPC .......... 318/568.12; 700/245–264; 701/23, 25, 701/532; 901/1, 47
See application file for complete search history.

(56) References Cited

U.S. PATENT DOCUMENTS

| | | | |
|---|---|---|---|
| 4,413,693 | A | 11/1983 | Derby |
| 4,638,445 | A | 1/1987 | Mattaboni |

(Continued)

FOREIGN PATENT DOCUMENTS

| | | |
|---|---|---|
| CA | 2289697 A1 | 11/1998 |
| CN | 101866396 | 10/2010 |

(Continued)

OTHER PUBLICATIONS

Fels, Deborah I., et al. "Developing a video-mediated communication system for hospitalized children." Telemedicine Journal 5.2 (1999): 193-208.*

(Continued)

*Primary Examiner* — Khoi Tran
*Assistant Examiner* — Dale Moyer
(74) *Attorney, Agent, or Firm* — Honigman Miller Schwartz and Cohn LLP

(57) ABSTRACT

A robot system includes a mobile robot having a controller executing a control system for controlling operation of the robot, a cloud computing service in communication with the controller of the robot, and a remote computing device in communication with the cloud computing service. The remote computing device communicates with the robot through the cloud computing service.

18 Claims, 41 Drawing Sheets

(51) Int. Cl.
  *B25J 13/00* (2006.01)
  *B25J 19/02* (2006.01)

(56) References Cited

U.S. PATENT DOCUMENTS

| | | |
|---|---|---|
| 4,669,168 A | 6/1987 | Tamura et al. |
| 4,697,472 A | 10/1987 | Hiyane |
| 4,709,265 A | 11/1987 | Silverman et al. |
| 4,751,658 A | 6/1988 | Kadonoff et al. |
| 4,777,416 A | 10/1988 | George, II et al. |
| 4,797,557 A | 1/1989 | Ohman |
| 4,803,625 A | 2/1989 | Fu et al. |
| 4,847,764 A | 7/1989 | Halvorson |
| 4,875,172 A | 10/1989 | Kanayama |
| 4,942,538 A | 7/1990 | Yuan et al. |
| 4,953,159 A | 8/1990 | Hayden et al. |
| 4,974,607 A | 12/1990 | Miwa |
| 4,977,971 A | 12/1990 | Crane, III et al. |
| 5,006,988 A | 4/1991 | Borenstein et al. |
| 5,040,116 A | 8/1991 | Evans, Jr. et al. |
| 5,051,906 A | 9/1991 | Evans, Jr. et al. |
| 5,073,749 A | 12/1991 | Kanayama |
| 5,084,828 A | 1/1992 | Kaufman et al. |
| 5,130,794 A | 7/1992 | Ritchey |
| 5,148,591 A | 9/1992 | Pryor |
| 5,153,833 A | 10/1992 | Gordon et al. |
| 5,155,684 A | 10/1992 | Burke et al. |
| 5,157,491 A | 10/1992 | Kassatly |
| 5,193,143 A | 3/1993 | Kaemmerer et al. |
| 5,217,453 A | 6/1993 | Wilk |
| 5,224,157 A | 6/1993 | Yamada et al. |
| 5,231,693 A | 7/1993 | Backes et al. |
| 5,236,432 A | 8/1993 | Matsen, III et al. |
| 5,315,287 A | 5/1994 | Sol |
| 5,319,611 A | 6/1994 | Korba |
| 5,341,242 A | 8/1994 | Gilboa et al. |
| 5,341,459 A | 8/1994 | Backes |
| 5,350,033 A | 9/1994 | Kraft |
| 5,366,896 A | 11/1994 | Margrey et al. |
| 5,372,211 A | 12/1994 | Wilcox et al. |
| 5,374,879 A | 12/1994 | Pin et al. |
| 5,417,210 A | 5/1995 | Funda et al. |
| 5,436,542 A | 7/1995 | Petelin et al. |
| 5,441,047 A | 8/1995 | David et al. |
| 5,442,728 A | 8/1995 | Kaufman et al. |
| 5,462,051 A | 10/1995 | Oka et al. |
| 5,539,741 A | 7/1996 | Barraclough et al. |
| 5,544,649 A | 8/1996 | David et al. |
| 5,553,609 A | 9/1996 | Chen et al. |
| 5,572,229 A | 11/1996 | Fisher |
| 5,572,999 A | 11/1996 | Funda et al. |
| 5,594,859 A | 1/1997 | Palmer et al. |
| 5,636,218 A | 6/1997 | Ishikawa et al. |
| 5,652,849 A | 7/1997 | Conway et al. |
| 5,682,199 A | 10/1997 | Lankford |
| 5,684,695 A | 11/1997 | Bauer |
| 5,701,904 A | 12/1997 | Simmons et al. |
| 5,739,657 A | 4/1998 | Takayama et al. |
| 5,749,058 A | 5/1998 | Hashimoto |
| 5,749,362 A | 5/1998 | Funda et al. |
| 5,762,458 A | 6/1998 | Wang et al. |
| 5,767,897 A | 6/1998 | Howell |
| 5,786,846 A | 7/1998 | Hiroaki |
| 5,802,494 A | 9/1998 | Kuno |
| 5,836,872 A | 11/1998 | Kenet et al. |
| 5,867,653 A | 2/1999 | Aras et al. |
| 5,876,325 A | 3/1999 | Mizuno et al. |
| 5,911,036 A | 6/1999 | Wright et al. |
| 5,917,958 A | 6/1999 | Nunally et al. |
| 5,927,423 A | 7/1999 | Wada et al. |
| 5,949,758 A | 9/1999 | Kober |
| 5,954,692 A | 9/1999 | Smith et al. |
| 5,959,423 A | 9/1999 | Nakanishi et al. |
| 5,966,130 A | 10/1999 | Benman, Jr. |
| 5,974,446 A | 10/1999 | Sonnenreich et al. |
| 6,133,944 A | 10/2000 | Braun et al. |
| 6,135,228 A | 10/2000 | Asada et al. |
| 6,148,100 A | 11/2000 | Anderson et al. |
| 6,170,929 B1 | 1/2001 | Wilson et al. |
| 6,175,779 B1 | 1/2001 | Barrett |
| 6,201,984 B1 | 3/2001 | Funda et al. |
| 6,211,903 B1 | 4/2001 | Bullister |
| 6,219,587 B1 | 4/2001 | Ahlin et al. |
| 6,232,735 B1 | 5/2001 | Baba et al. |
| 6,233,504 B1 | 5/2001 | Das et al. |
| 6,256,556 B1 | 7/2001 | Zenke |
| 6,259,806 B1 | 7/2001 | Green |
| 6,259,956 B1 | 7/2001 | Myers et al. |
| 6,266,162 B1 | 7/2001 | Okamura et al. |
| 6,266,577 B1 | 7/2001 | Popp et al. |
| 6,289,263 B1 | 9/2001 | Mukherjee |
| 6,292,713 B1 | 9/2001 | Jouppi et al. |
| 6,304,050 B1 | 10/2001 | Skaar et al. |
| 6,321,137 B1 | 11/2001 | De Smet |
| 6,323,942 B1 | 11/2001 | Bamji |
| 6,325,756 B1 | 12/2001 | Webb et al. |
| 6,327,516 B1 | 12/2001 | Zenke |
| 6,330,486 B1 | 12/2001 | Padula |
| 6,330,493 B1 | 12/2001 | Takahashi et al. |
| 6,346,950 B1 | 2/2002 | Jouppi |
| 6,346,962 B1 | 2/2002 | Goodridge |
| 6,369,847 B1 | 4/2002 | James et al. |
| 6,408,230 B2 | 6/2002 | Wada |
| 6,430,471 B1 | 8/2002 | Kintou et al. |
| 6,430,475 B2 | 8/2002 | Okamoto et al. |
| 6,438,457 B1 | 8/2002 | Yokoo et al. |
| 6,452,915 B1 | 9/2002 | Jorgensen |
| 6,463,352 B1 | 10/2002 | Tadokoro et al. |
| 6,463,361 B1 | 10/2002 | Wang et al. |
| 6,466,844 B1 | 10/2002 | Ikeda et al. |
| 6,468,265 B1 | 10/2002 | Evans et al. |
| 6,491,701 B2 | 12/2002 | Tierney et al. |
| 6,496,099 B2 | 12/2002 | Wang et al. |
| 6,496,755 B2 | 12/2002 | Wallach et al. |
| 6,501,740 B1 | 12/2002 | Sun et al. |
| 6,507,773 B2 | 1/2003 | Parker et al. |
| 6,515,740 B2 | 2/2003 | Bamji et al. |
| 6,522,906 B1 | 2/2003 | Salisbury, Jr. et al. |
| 6,523,629 B1 | 2/2003 | Buttz et al. |
| 6,526,332 B2 | 2/2003 | Sakamoto et al. |
| 6,529,765 B1 | 3/2003 | Franck et al. |
| 6,529,802 B1 | 3/2003 | Kawakita et al. |
| 6,532,404 B2 | 3/2003 | Colens |
| 6,535,182 B2 | 3/2003 | Stanton |
| 6,535,793 B2 | 3/2003 | Allard |
| 6,540,039 B1 | 4/2003 | Yu et al. |
| 6,543,899 B2 | 4/2003 | Covannon et al. |
| 6,549,215 B2 | 4/2003 | Jouppi |
| 6,563,533 B1 | 5/2003 | Colby |
| 6,580,246 B2 | 6/2003 | Jacobs |
| 6,584,376 B1 | 6/2003 | Van Kommer |
| 6,604,019 B2 | 8/2003 | Ahlin et al. |
| 6,604,021 B2 | 8/2003 | Imai et al. |
| 6,611,120 B2 | 8/2003 | Song et al. |
| 6,646,677 B2 | 11/2003 | Noro et al. |
| 6,650,748 B1 | 11/2003 | Edwards et al. |
| 6,684,129 B2 | 1/2004 | Salisbury, Jr. et al. |
| 6,691,000 B2 | 2/2004 | Nagai et al. |
| 6,710,797 B1 | 3/2004 | McNelley et al. |
| 6,728,599 B2 | 4/2004 | Wright et al. |
| 6,764,373 B1 | 7/2004 | Osawa et al. |
| 6,769,771 B2 | 8/2004 | Trumbull |
| 6,781,606 B2 | 8/2004 | Jouppi |
| 6,784,916 B2 | 8/2004 | Smith |
| 6,785,589 B2 | 8/2004 | Eggenberger et al. |
| 6,791,550 B2 | 9/2004 | Goldhor et al. |
| 6,799,065 B1 | 9/2004 | Niemeyer |
| 6,799,088 B2 | 9/2004 | Wang et al. |
| 6,804,580 B1 | 10/2004 | Stoddard et al. |
| 6,804,656 B1 | 10/2004 | Rosenfeld et al. |
| 6,810,411 B1 | 10/2004 | Coughlin et al. |
| 6,836,703 B2 | 12/2004 | Wang et al. |
| 6,839,612 B2 | 1/2005 | Sanchez et al. |
| 6,840,904 B2 | 1/2005 | Goldberg |

(56) References Cited

U.S. PATENT DOCUMENTS

| | | |
|---|---|---|
| 6,845,297 B2 | 1/2005 | Allard |
| 6,852,107 B2 | 2/2005 | Wang et al. |
| 6,853,878 B2 | 2/2005 | Hirayama et al. |
| 6,853,880 B2 | 2/2005 | Sakagami et al. |
| 6,871,117 B2 | 3/2005 | Wang et al. |
| 6,879,879 B2 | 4/2005 | Jouppi et al. |
| 6,892,112 B2 | 5/2005 | Wang et al. |
| 6,895,305 B2 | 5/2005 | Lathan et al. |
| 6,914,622 B1 | 7/2005 | Smith et al. |
| 6,925,357 B2 | 8/2005 | Wang et al. |
| 6,951,535 B2 | 10/2005 | Ghodoussi et al. |
| 6,958,706 B2 | 10/2005 | Chaco et al. |
| 6,965,394 B2 | 11/2005 | Gutta et al. |
| 6,995,664 B1 | 2/2006 | Darling |
| 7,030,757 B2 | 4/2006 | Matsuhira et al. |
| 7,092,001 B2 | 8/2006 | Schulz |
| 7,096,090 B1 | 8/2006 | Zweig |
| 7,115,102 B2 | 10/2006 | Abbruscato |
| 7,115,849 B2 | 10/2006 | Dowski, Jr. et al. |
| 7,117,067 B2 | 10/2006 | McLurkin et al. |
| 7,123,285 B2 | 10/2006 | Smith et al. |
| 7,123,974 B1 | 10/2006 | Hamilton |
| 7,123,991 B2 | 10/2006 | Graf et al. |
| 7,127,325 B2 | 10/2006 | Nagata et al. |
| 7,129,970 B2 | 10/2006 | James et al. |
| 7,133,062 B2 | 11/2006 | Castles et al. |
| 7,142,945 B2 | 11/2006 | Wang et al. |
| 7,142,947 B2 | 11/2006 | Wang et al. |
| 7,151,982 B2 | 12/2006 | Liff et al. |
| 7,154,526 B2 | 12/2006 | Foote et al. |
| 7,155,306 B2 | 12/2006 | Haitin et al. |
| 7,156,809 B2 | 1/2007 | Quy |
| 7,158,317 B2 | 1/2007 | Ben-Eliezer et al. |
| 7,158,859 B2 | 1/2007 | Wang et al. |
| 7,158,860 B2 | 1/2007 | Wang et al. |
| 7,161,322 B2 | 1/2007 | Wang et al. |
| 7,162,338 B2 | 1/2007 | Goncalves et al. |
| 7,164,969 B2 | 1/2007 | Wang et al. |
| 7,171,286 B2 | 1/2007 | Wang et al. |
| 7,174,238 B1 | 2/2007 | Zweig |
| 7,184,559 B2 | 2/2007 | Jouppi |
| 7,188,000 B2 | 3/2007 | Chiappetta et al. |
| 7,206,627 B2 | 4/2007 | Abovitz et al. |
| 7,215,786 B2 | 5/2007 | Nakadai et al. |
| 7,256,708 B2 | 8/2007 | Rosenfeld et al. |
| 7,262,573 B2 | 8/2007 | Wang et al. |
| 7,289,883 B2 | 10/2007 | Wang et al. |
| 7,321,807 B2 | 1/2008 | Laski |
| 7,340,077 B2 | 3/2008 | Gokturk et al. |
| 7,346,429 B2 | 3/2008 | Goldenberg et al. |
| 7,382,399 B1 | 6/2008 | McCall et al. |
| 7,432,949 B2 | 10/2008 | Remy et al. |
| 7,433,024 B2 | 10/2008 | Garcia et al. |
| 7,441,953 B2 | 10/2008 | Banks |
| 7,624,166 B2 | 11/2009 | Foote et al. |
| 7,706,917 B1 | 4/2010 | Chiappetta et al. |
| 7,924,323 B2 | 4/2011 | Walker et al. |
| 2001/0002448 A1 | 5/2001 | Wilson et al. |
| 2001/0010053 A1 | 7/2001 | Ben-Shachar et al. |
| 2001/0034475 A1 | 10/2001 | Flach et al. |
| 2001/0037163 A1 | 11/2001 | Allard |
| 2001/0051881 A1 | 12/2001 | Filler |
| 2001/0054071 A1 | 12/2001 | Loeb |
| 2002/0015296 A1 | 2/2002 | Howell et al. |
| 2002/0027597 A1 | 3/2002 | Sachau |
| 2002/0049517 A1 | 4/2002 | Ruffner |
| 2002/0055917 A1 | 5/2002 | Muraca |
| 2002/0057279 A1 | 5/2002 | Jouppi |
| 2002/0058929 A1 | 5/2002 | Green |
| 2002/0059587 A1 | 5/2002 | Cofano et al. |
| 2002/0063726 A1 | 5/2002 | Jouppi |
| 2002/0073429 A1 | 6/2002 | Beane et al. |
| 2002/0082498 A1 | 6/2002 | Wendt et al. |
| 2002/0095238 A1 | 7/2002 | Ahlin et al. |
| 2002/0098879 A1 | 7/2002 | Rheey |
| 2002/0104094 A1 | 8/2002 | Alexander et al. |
| 2002/0111988 A1 | 8/2002 | Sato |
| 2002/0120362 A1 | 8/2002 | Lathan et al. |
| 2002/0130950 A1 | 9/2002 | James et al. |
| 2002/0141595 A1 | 10/2002 | Jouppi |
| 2002/0143923 A1 | 10/2002 | Alexander |
| 2002/0177925 A1 | 11/2002 | Onishi et al. |
| 2002/0183894 A1 | 12/2002 | Wang et al. |
| 2002/0184674 A1 | 12/2002 | Xi et al. |
| 2002/0186243 A1 | 12/2002 | Ellis et al. |
| 2003/0030397 A1 | 2/2003 | Simmons |
| 2003/0048481 A1 | 3/2003 | Kobayashi et al. |
| 2003/0050733 A1 | 3/2003 | Wang et al. |
| 2003/0060808 A1 | 3/2003 | Wilk |
| 2003/0069752 A1 | 4/2003 | LeDain et al. |
| 2003/0100892 A1 | 5/2003 | Morley et al. |
| 2003/0104806 A1 | 6/2003 | Ruef et al. |
| 2003/0114962 A1 | 6/2003 | Niemeyer |
| 2003/0135203 A1 | 7/2003 | Wang et al. |
| 2003/0144579 A1 | 7/2003 | Buss |
| 2003/0144649 A1 | 7/2003 | Ghodoussi et al. |
| 2003/0151658 A1 | 8/2003 | Smith |
| 2003/0171710 A1 | 9/2003 | Bassuk et al. |
| 2003/0174285 A1 | 9/2003 | Trumbull |
| 2003/0180697 A1 | 9/2003 | Kim et al. |
| 2003/0199000 A1 | 10/2003 | Valkirs et al. |
| 2003/0216834 A1 | 11/2003 | Allard |
| 2003/0220541 A1 | 11/2003 | Salisbury et al. |
| 2003/0231244 A1 | 12/2003 | Bonilla et al. |
| 2003/0232649 A1 | 12/2003 | Gizis et al. |
| 2004/0012362 A1 | 1/2004 | Tsurumi |
| 2004/0013295 A1 | 1/2004 | Sabe et al. |
| 2004/0019406 A1 | 1/2004 | Wang et al. |
| 2004/0024490 A1 | 2/2004 | McLurkin et al. |
| 2004/0041904 A1 | 3/2004 | Lapalme et al. |
| 2004/0065073 A1 | 4/2004 | Nash |
| 2004/0068657 A1 | 4/2004 | Alexander et al. |
| 2004/0078219 A1 | 4/2004 | Kaylor et al. |
| 2004/0080610 A1 | 4/2004 | James et al. |
| 2004/0088077 A1 | 5/2004 | Jouppi et al. |
| 2004/0093409 A1 | 5/2004 | Thompson et al. |
| 2004/0098167 A1 | 5/2004 | Yi et al. |
| 2004/0102167 A1 | 5/2004 | Shim et al. |
| 2004/0117065 A1 | 6/2004 | Wang et al. |
| 2004/0138547 A1 | 7/2004 | Wang et al. |
| 2004/0143421 A1 | 7/2004 | Wang et al. |
| 2004/0148638 A1 | 7/2004 | Weisman et al. |
| 2004/0153211 A1 | 8/2004 | Kamoto et al. |
| 2004/0157612 A1 | 8/2004 | Kim |
| 2004/0162637 A1 | 8/2004 | Wang et al. |
| 2004/0167666 A1 | 8/2004 | Wang et al. |
| 2004/0167668 A1 | 8/2004 | Wang et al. |
| 2004/0172301 A1 | 9/2004 | Mihai et al. |
| 2004/0174129 A1 | 9/2004 | Wang et al. |
| 2004/0175684 A1 | 9/2004 | Kaasa et al. |
| 2004/0179714 A1 | 9/2004 | Jouppi |
| 2004/0201602 A1 | 10/2004 | Mody et al. |
| 2004/0215490 A1 | 10/2004 | Duchon et al. |
| 2004/0230340 A1 | 11/2004 | Fukuchi et al. |
| 2005/0003330 A1 | 1/2005 | Asgarinejad et al. |
| 2005/0021182 A1 | 1/2005 | Wang et al. |
| 2005/0021183 A1 | 1/2005 | Wang et al. |
| 2005/0021187 A1 | 1/2005 | Wang et al. |
| 2005/0021309 A1 | 1/2005 | Alexander et al. |
| 2005/0024485 A1 | 2/2005 | Castles et al. |
| 2005/0027567 A1 | 2/2005 | Taha |
| 2005/0027794 A1 | 2/2005 | Decker |
| 2005/0028221 A1 | 2/2005 | Liu et al. |
| 2005/0035862 A1 | 2/2005 | Wildman et al. |
| 2005/0038416 A1 | 2/2005 | Wang et al. |
| 2005/0038564 A1 | 2/2005 | Burick |
| 2005/0052527 A1 | 3/2005 | Remy et al. |
| 2005/0065435 A1 | 3/2005 | Rauch et al. |
| 2005/0065659 A1 | 3/2005 | Tanaka et al. |
| 2005/0065813 A1 | 3/2005 | Mishelevich et al. |
| 2005/0071046 A1 | 3/2005 | Miyazaki et al. |
| 2005/0099493 A1 | 5/2005 | Chew |
| 2005/0110867 A1 | 5/2005 | Schulz |
| 2005/0154265 A1 | 7/2005 | Miro et al. |

(56) References Cited

U.S. PATENT DOCUMENTS

| | | |
|---|---|---|
| 2005/0182322 A1 | 8/2005 | Grispo |
| 2005/0192721 A1 | 9/2005 | Jouppi |
| 2005/0204438 A1 | 9/2005 | Wang et al. |
| 2005/0216126 A1 | 9/2005 | Koselka et al. |
| 2005/0219356 A1 | 10/2005 | Smith et al. |
| 2005/0267826 A1 | 12/2005 | Levy et al. |
| 2005/0283414 A1 | 12/2005 | Fernandes et al. |
| 2006/0007943 A1 | 1/2006 | Fellman |
| 2006/0013263 A1 | 1/2006 | Fellman |
| 2006/0013469 A1 | 1/2006 | Wang et al. |
| 2006/0013488 A1 | 1/2006 | Inoue |
| 2006/0029065 A1 | 2/2006 | Fellman |
| 2006/0047365 A1 | 3/2006 | Ghodoussi et al. |
| 2006/0052676 A1 | 3/2006 | Wang et al. |
| 2006/0052684 A1 | 3/2006 | Takahashi et al. |
| 2006/0064212 A1 | 3/2006 | Thorne |
| 2006/0082642 A1 | 4/2006 | Wang et al. |
| 2006/0087746 A1 | 4/2006 | Lipow |
| 2006/0095170 A1 | 5/2006 | Yang et al. |
| 2006/0098573 A1 | 5/2006 | Beer et al. |
| 2006/0103659 A1 | 5/2006 | Karandikar et al. |
| 2006/0104279 A1 | 5/2006 | Fellman et al. |
| 2006/0106493 A1 | 5/2006 | Niemeyer et al. |
| 2006/0122482 A1 | 6/2006 | Mariotti et al. |
| 2006/0142983 A1 | 6/2006 | Sorensen et al. |
| 2006/0161303 A1 | 7/2006 | Wang et al. |
| 2006/0173712 A1 | 8/2006 | Joubert |
| 2006/0178776 A1 | 8/2006 | Feingold et al. |
| 2006/0189393 A1 | 8/2006 | Edery |
| 2006/0195569 A1 | 8/2006 | Barker |
| 2006/0259193 A1 | 11/2006 | Wang et al. |
| 2006/0293788 A1 | 12/2006 | Pogodin |
| 2007/0021871 A1 | 1/2007 | Wang et al. |
| 2007/0046237 A1 | 3/2007 | Lakshmanan et al. |
| 2007/0064092 A1 | 3/2007 | Sandbeg et al. |
| 2007/0078566 A1 | 4/2007 | Wang et al. |
| 2007/0100498 A1 | 5/2007 | Matsumoto et al. |
| 2007/0114075 A1 | 5/2007 | Buehler et al. |
| 2007/0117516 A1 | 5/2007 | Saidi et al. |
| 2007/0120965 A1 | 5/2007 | Sandberg et al. |
| 2007/0135967 A1 | 6/2007 | Jung et al. |
| 2007/0142964 A1 | 6/2007 | Abramson |
| 2007/0152427 A1 | 7/2007 | Olsen |
| 2007/0192910 A1 | 8/2007 | Vu et al. |
| 2007/0197896 A1 | 8/2007 | Moll et al. |
| 2007/0198128 A1 | 8/2007 | Ziegler et al. |
| 2007/0199108 A1 | 8/2007 | Angle et al. |
| 2007/0250212 A1 | 10/2007 | Halloran et al. |
| 2007/0262884 A1 | 11/2007 | Goncalves et al. |
| 2007/0273751 A1 | 11/2007 | Sachau |
| 2007/0291109 A1 | 12/2007 | Wang et al. |
| 2007/0291128 A1 | 12/2007 | Wang et al. |
| 2007/0293985 A1 | 12/2007 | Myeong et al. |
| 2008/0011904 A1 | 1/2008 | Cepollina et al. |
| 2008/0065268 A1 | 3/2008 | Wang et al. |
| 2008/0082211 A1 | 4/2008 | Wang et al. |
| 2008/0105481 A1 | 5/2008 | Hutcheson et al. |
| 2008/0106746 A1 | 5/2008 | Shpunt et al. |
| 2008/0201014 A1 | 8/2008 | Sonoura |
| 2008/0201017 A1 | 8/2008 | Wang et al. |
| 2008/0215987 A1 | 9/2008 | Alexander et al. |
| 2008/0229531 A1 | 9/2008 | Takida |
| 2008/0240502 A1 | 10/2008 | Freedman et al. |
| 2008/0255703 A1 | 10/2008 | Wang et al. |
| 2008/0281467 A1 | 11/2008 | Pinter |
| 2009/0055023 A1 | 2/2009 | Walters et al. |
| 2009/0096783 A1 | 4/2009 | Shpunt et al. |
| 2009/0105882 A1 | 4/2009 | Wang et al. |
| 2009/0125147 A1 | 5/2009 | Wang et al. |
| 2009/0164045 A1 | 6/2009 | Deguire et al. |
| 2009/0177323 A1 | 7/2009 | Ziegler et al. |
| 2009/0185274 A1 | 7/2009 | Shpunt |
| 2009/0226113 A1 | 9/2009 | Matsumoto et al. |
| 2009/0240371 A1 | 9/2009 | Wang et al. |
| 2009/0259339 A1 | 10/2009 | Wright et al. |
| 2010/0010672 A1 | 1/2010 | Wang et al. |
| 2010/0010673 A1 | 1/2010 | Wang et al. |
| 2010/0019715 A1 | 1/2010 | Roe et al. |
| 2010/0020078 A1 | 1/2010 | Shpunt |
| 2010/0034457 A1 | 2/2010 | Berliner et al. |
| 2010/0066587 A1 | 3/2010 | Yamauchi et al. |
| 2010/0070079 A1 | 3/2010 | Mangaser et al. |
| 2010/0073490 A1 | 3/2010 | Wang et al. |
| 2010/0115418 A1 | 5/2010 | Wang et al. |
| 2010/0118123 A1 | 5/2010 | Freedman et al. |
| 2010/0131103 A1 | 5/2010 | Herzog et al. |
| 2010/0191375 A1 | 7/2010 | Wright et al. |
| 2010/0268383 A1 | 10/2010 | Wang et al. |
| 2011/0050841 A1 | 3/2011 | Wang et al. |
| 2011/0071702 A1 | 3/2011 | Wang et al. |
| 2011/0187875 A1 | 8/2011 | Sanchez et al. |
| 2011/0190930 A1 | 8/2011 | Hanrahan et al. |
| 2011/0218674 A1 | 9/2011 | Stuart et al. |
| 2011/0288684 A1 | 11/2011 | Farlow et al. |
| 2011/0292193 A1 | 12/2011 | Wang et al. |
| 2011/0301759 A1 | 12/2011 | Wang et al. |
| 2012/0191287 A1* | 7/2012 | Shin et al. ............... 701/28 |
| 2013/0226344 A1* | 8/2013 | Wong et al. ............... 700/258 |

FOREIGN PATENT DOCUMENTS

| | | |
|---|---|---|
| CN | 101978365 | 2/2011 |
| CN | 101106939 | 11/2011 |
| EP | 0981905 B1 | 1/2002 |
| EP | 1262142 A2 | 12/2002 |
| EP | 1536660 A2 | 6/2005 |
| EP | 1806210 A2 | 7/2007 |
| EP | 1536660 A3 | 4/2008 |
| EP | 2263158 A2 | 12/2010 |
| EP | 2300930 A1 | 3/2011 |
| GB | 2431261 A | 4/2007 |
| JP | 07213753 | 8/1995 |
| JP | 07248823 | 9/1995 |
| JP | 08084328 | 3/1996 |
| JP | 07257422 | 12/1996 |
| JP | 08320827 | 12/1996 |
| JP | 09267276 | 10/1997 |
| JP | 10079097 | 3/1998 |
| JP | 10143243 A | 5/1998 |
| JP | 10288689 | 10/1998 |
| JP | 00032319 | 1/2000 |
| JP | 00049800 | 2/2000 |
| JP | 00079587 | 3/2000 |
| JP | 00196876 | 7/2000 |
| JP | 2000289985 A | 10/2000 |
| JP | 00188124 | 4/2001 |
| JP | 01125641 | 5/2001 |
| JP | 01147718 | 5/2001 |
| JP | 01179663 | 7/2001 |
| JP | 01198865 | 7/2001 |
| JP | 01198868 | 7/2001 |
| JP | 01199356 | 7/2001 |
| JP | 02000574 | 1/2002 |
| JP | 02035423 | 2/2002 |
| JP | 02046088 | 2/2002 |
| JP | 200285305 A | 3/2002 |
| JP | 02305743 | 10/2002 |
| JP | 02355779 | 12/2002 |
| JP | 04261941 | 9/2004 |
| JP | 04524824 | 9/2004 |
| JP | 05028066 | 2/2005 |
| JP | 2008004078 A | 1/2008 |
| JP | 2009123061 A | 6/2009 |
| JP | 2009217363 A | 9/2009 |
| JP | 10064154 | 3/2010 |
| JP | 10532109 | 9/2010 |
| JP | 10246954 | 11/2010 |
| KR | 060037979 | 5/2006 |
| KR | 100019479 | 2/2010 |
| KR | 100139037 | 12/2010 |
| WO | WO-9306690 A1 | 4/1993 |
| WO | WO-9851078 A1 | 11/1998 |
| WO | WO-9967067 A1 | 12/1999 |
| WO | WO-0033726 A1 | 6/2000 |

(56) References Cited

FOREIGN PATENT DOCUMENTS

| | | |
|---|---|---|
| WO | WO-03007745 A1 | 9/2003 |
| WO | WO-03102706 A1 | 12/2003 |
| WO | WO-2004075456 A2 | 9/2004 |
| WO | WO-2006012797 A1 | 2/2006 |
| WO | WO-2006078611 A2 | 7/2006 |
| WO | WO-2007041038 A2 | 4/2007 |
| WO | WO-2007041295 A2 | 4/2007 |
| WO | WO-2008/083489 A1 | 7/2008 |
| WO | WO-2008100272 A2 | 8/2008 |
| WO | WO-2008105634 A1 | 9/2008 |
| WO | WO-2008100272 A3 | 10/2008 |
| WO | WO-2009117274 A2 | 9/2009 |
| WO | WO-2009128997 A1 | 10/2009 |
| WO | WO-2009145958 A2 | 12/2009 |
| WO | WO-2010006205 A1 | 1/2010 |
| WO | WO-2010006211 A1 | 1/2010 |
| WO | WO-2010033666 A1 | 3/2010 |
| WO | WO-2010047881 A1 | 4/2010 |
| WO | WO-2010062798 A1 | 6/2010 |
| WO | WO-2010065257 A1 | 6/2010 |
| WO | WO-2010120407 A1 | 10/2010 |
| WO | WO-2010120707 A1 | 10/2010 |
| WO | WO-2011028589 A2 | 3/2011 |
| WO | WO-2011028589 A3 | 4/2011 |
| WO | WO-2011097130 A2 | 8/2011 |
| WO | WO-2011097132 A2 | 8/2011 |
| WO | WO-2011109336 A2 | 9/2011 |
| WO | WO-2011146254 A2 | 11/2011 |
| WO | WO-2011146259 A2 | 11/2011 |
| WO | WO-2011097132 A3 | 12/2011 |
| WO | WO-2011149902 A2 | 12/2011 |

OTHER PUBLICATIONS

Ishihara, Ken, and Toshiyuki Furukawa. "Intelligent microrobot DDS (Drug Delivery System) measured and controlled by ultrasonics." Intelligent Robots and Systems' 91.'Intelligence for Mechanical Systems, Proceedings IROS'91. IEEE/RSJ International Workshop on. IEEE, 1991.*

International Search Report for Application No. PCT/US2011/035488 dated May 13, 2013.

Muller A., et al. "A model-based object following system", Intelligent Vehicles Symposium, 2009 IEEE, Piscataway, NJ, USA, Jun. 3, 2009, all pages.

Ho Seok Ahn, et. al. "PDA-based mobile robot system with remote monitoring for home environment", IEEE Transactions on Consumer Electronics, IEEE Service Center, New York, NY, USA, vol. 55, No. 3, 1, Aug. 1, 2009, all pages.

Kathryn A Daltorio, et al. "An obstacle-edging reflex for an autonomous lawnmower", Position Location and Navigation Symposium (PLANS), 2010 IEEE/ION, IEEE, Piscataway, NJ, USA, May 4, 2010, all pages.

International Search Report for Application No: PCT/US2011/035476 Dated May 17, 2013.

Jong-Hwan Kim et al., "Ubiquitous Robot: A New Paradigm for Integrated Sciences", 2007 IEEE International Conference on Robotics and Automation—Apr. 10-14, 2007—Roma, Italy, IEEE, Piscataway, NJ, USA, Apr. 10, 2007, all pages.

De F O Araujo T et al, "MaeRobot: An Open Source Test Platform for Prototyping Robots", Robotic Symposium, 2008, LARS '08. IEEE Latin American, IEEE, Piscataway, NJ, USA, Oct. 29, 2008, all pages.

Li Xiaopen et al., "Research an open control architecture of autonomous mobile robot with multi-layer and modularization", Infomatics in Control, Automation and Robotics (Car), 2010 2nd International Asia Conference on, IEEE, Piscataway, NJ, USA, Mar. 6, 2010, all pages.

Hu Guanshan, "Neutral Networks Based on Information Fusion Using for Avoiding Obstacle Robot", Information Engineering, 2009. ICIE '09. Wase International Conference on, IEEE, Piscataway, NJ, USA, Jul. 10, 2009, all pages.

Freire E O et al., "Prototyping a wheeled mobile robot embedding multiple sensors and agent-based control system", Proc. 43rd IEEE Midwest Symposium on Circuits and Systems, Aug. 8, 2000, all pages.

Sung-Min Han et al., "Mobile robot navigation by circular path planning algorithm using camera and ultrasonic sensor", Industrial Electronics, 2009. ISIE 2009. IEEE International Symposium on, IEEE, Piscataway, NJ, USA, Jul. 5, 2009, all pages.

Ruifeng Li et al., "The development of a general type of security robot", Robotics and Biometrics, 2007. ROBIO 2007. IEEE International Conference on, IEEE, Piscataway, NJ, USA, Dec. 15, 2007, all pages.

Pil Gyeom Kim el al., "Obstacle Avoidance of a Mobile Robot Using Vision System and Ultrasonic Sensor", Aug. 21, 2007, Advanced Intelligent Computing Theories and Applications, With Aspects of Theoretical and Methodological Issues, all pages.

International Search Report for Application No. PCT/US2011/059980 dated May 14, 2013.

Se, S.; Lowe, David G.; Little, J. (2001). "Vision-based mobile robot localization and mapping using scale-invariant features". *Proceedings of the IEEE International Conference on Robotics and Automation(ICRA* ). 2. pp. 2051.

Rothganger, F; S. Lazebnik, C. Schmid, and J. Ponce: 2004. 3D Object Modeling and Recognition Using Local Affine-Invariant Image Descriptors and Multi-View Spatial Constraints, ICCV.

Laptev, Ivan and Lindeberg, Tony (2004). "Local descriptors for spatio-temporal recognition". *ECCV'04 Workshop on Spatial Coherence for Visual Motion Analysis, Springer Lecture Notes in Computer Science*, vol. 3667. pp. 91-103.

Ivan Laptev, Barbara Caputo, Christian Schuldt and Tony Lindeberg (2007). "Local velocity-adapted motion events for spatio-temporal recognition". *Computer Vision and Image Understanding 108: 207-229*; Scovanner, Paul.

Ali, S; Shah, M (2007). "A 3-dimensional sift descriptor and its application to action recognition". *Proceedings of the 15th International Conference on Multimedia*. pp. 357-360.

Iryna Gordon and David G. Lowe, "What and where: 3D object recognition with accurate pose," *Toward Category-Level Object Recognition*, (Springer-Verlag, 2006), pp. 67-82.

Niebles, J. C. Wang, H. And Li, Fei-Fei (2006). "Unsupervised Learning of Human Action Categories Using Spatial-Temporal Words". *Proceedings of the British Machine Vision Conference (BMVC)*. Edinburgh.

Binotto A P D et al: "Real-time taks reconfiguration support applied to an UAV-based surveillance system", Computer Science and Information Technology, 2008. IMCSIT 2008. International Multiconference on, IEEE, Piscataway, NJ, USA, Oct. 20, 2008, pp. 581-588, XP031406238, ISBN: 978-83-60810-14-9.

International Search Report for application No. PCT/US2011/059863 dated Nov. 22, 2012.

Freire E. O., et al. "Prototyping a wheeled mobile robot embedding multiple sensors and agent-based control system", Proc. 43rd IEEE Midwest Symp. on Circuits and Systems, vol. 2, Aug. 8, 2000, pp. 926-929.

International Search Report and Written Opinion for Application No. PCT/US2013/028208 dated Jul. 9, 2013.

International Search Report for Application No: PCT/US2011/060935 Dated May 27, 2013.

Rajesh, Arumugam et al., "DAvinCi: A cloud computing framework fo service robots", 2010 IEEE International Conference on Robotics and Automation: ICRA 2010; Anchorage, Alaska, USA, May 3-8, 2010, IEEE, Piscataway, NJ, USA, May 3, 2010, all pages.

Bistry, H., et al. "A cloud computing approach to complex robot vision tasks using smart camera systems", Intelligent Robots and Systems (IROS), 2010 IEEE/RSJ International Conference on, Piscataway, NJ, USA, vol. 1-24, Oct. 18, 2010, all pages.

Nimmagadda, Y., et al. "Real-time moving object recognition and tracking using computation offloading", Intelligent Robots and Systems (IROS), 2010 IEEE/RSJ International Conference on, IEEE, Piscataway, NJ, USA, Oct. 18, 2010, all pages.

International Search Report for Application No: PCT/US2011/059910 Dated May 29, 2013.

(56) References Cited

OTHER PUBLICATIONS

Ferriere L. et. al., "Design of omnimobile robot wheels", Robotics and Automation, 1996. Proceedings., 1996 IEEE International Conference on Minneapolis, MN, Apr. 22028, 1996, New York, NY, IEEE, Apr. 22, 1996, all pages.
Kanda A. et. al., "Environment Recognition System Based on Multiple Classification Analyses for Mobile Robots", Journal of Bionic Engineering, Sep. 1, 2008, all pages.
Canadian Office Action for related Application No. 2,800,372 dated Apr. 2, 2014.
Translation of Japanese Office Action for Application No. 2013-547475 dated Dec. 16, 2013.
Australian examination report for related Application No. 2011256720 dated Mar. 27, 2014.
Paulos, "Video of PRoP 2 at Richmond Field Station", www.prop.org Printout of Home Page of Website and two-page Transcript of the audio portion of said PRoP Video, May 2001.
Paulos, Eric J., "Personal Tele-Embodiment", UC Berkeley, Fall 2001.
Pin, et al., "A New Family of Omnidirectional and Holonomic Wheeled Platforms for Mobile Robots", IEEE, vol. 10, No. 4, Aug. 1994.
Rovetta, et al., "A New Telerobotic Application: Remote Laparoscopic Surgery Using Satellites and and optical fiber Networks for Data Exchange", International Journal of Robotics Research, Jun. 1, 1996, pp. 267-279.
Roy, et al., "Towards Personal Service Robots for the Elderly", Internet, Mar. 7, 2002, 7 pgs.
Salemi, et al., "MILO: Personal robot platform", Internet, 2005, pp. 1-6.
Sandt, Frederic et al., "Perceptions for a Transport Robot in Public Environments", IROS, 1997.
Schaeffer, "Care-O-bot: A System for Assisting Elderly or Disabled Persons in Home Environments", Proceedings of AAATE-99, http://morpha.de/download/publications/IPA, 1999.
Schulz, "Web Interfaces for Mobile Robots in Public Places", Robotics & Automation Magazine, IEEE, vol. 7, Issue 1, Mar. 2000.
Shimoga, et al., "Touch and force reflection for telepresence surgery", IEEE, 1994, pp. 1049-1050.
Siegwart, "Interacting Mobile Robots on the Web", Proceedings of the 1999 IEEE International Conference on Robotics and Automation, May 1999.
Simmons, "Xavier: An Autonomous Mobile Robot on the Web", IEEE Robotics and Automation Magazine, 1999, pp. 43-48.
Spawar Systems Center, "Robart", San Diego, CA, http://www.nosc.mil/robots/land/robart/robart.html, 1998, pp. 1-8.
Stephenson, Gary, "Dr. Robot Tested at Hopkins", Internet, Aug. 5, 2003, pp. 1-2.
Stoianovici, et al., "Robotic Tools for Minimally Invasive Urologic Surgery", Internet, Dec. 2002, pp. 1-17.
Suplee, "Mastering the Robot", The Washington Post, http://www.cs.cmu.edu-nursebotlweb/press/wash/index.html, Sep. 17, 2000, p. A01.
Tahboub, Karim A. et al., "Dynamics Analysis and Control of a Holonomic Vehicle With Continously Variable Transmission", Journal of Dynamic Systems, Measurement and Control ASME vol. 124, Mar. 2002, pp. 118-126.
Tendick, et al., "Human-Machine Interfaces for Minimally Invasive Surgery", IEEE, 1997, pp. 2771-2776.
Thrun, et al., "Probabilistic Algorithms and the Interactive Museum Tour-Guide Robot Minerva", Internet, 2000, pp. 1-35.
Tzafestas, et al., "VR-based Teleoperation of a Mobile Robotic Assistant: Progress Report", Internet, Nov. 2000, pp. 1-23.
Urquhart, Kim , "InTouch's robotic Companion 'beams up' healthcare experts", Medical Device Daily, vol. 7, No. 39, Feb. 27, 2003, p. 1, 4.
Weiss, et al., "Telework and video-mediated communication: Importance of real-time, interactive communication for workers with disabilities", California State University Northridge http://www.csun.edu/cod/conf/1999/proceedings/session0238.html, pp. 1-4.
West, et al., "Design of Ball Wheel Mechanisms for Omnidirectional Vehicles with Full Mobility and Invariant Kinematics", Journal of Mechanical Design, vol. 119, Jun. 1997, pp. 153-161.
Yamasaki, et al., "Applying Personal Robots and Active Interface to Video Conference Systems", Internet, 1995, pp. 243-248.
Yamauchi, "PackBot: A Versatile Platform for Military Robotics", Internet, 2004, pp. 1-10.
Yong, et al., "Robot task execution with telepresence using virtual reality technology", Internet, 1998, pp. 1-8.
Zamrazil, Kristie, "Telemedicine in Texas: Public Policy Concerns", House Research Organization Focus Report, Texas House of Representatives, http://www.hro.house.state.tx.us/focus/telemed.pdf, May 5, 2000, pp. 76-22.
Zipperer, Lorri, "Robotic dispensing system", 1999, pp. 1-2.
Zorn, Benjamin G., "Ubiquitous Telepresence", http://www.cs.colorado.edu/-zorn/utlvision/vision.html, May 5, 1996.
Goldberg, "More Online Robots, Robots that Manipulate", Internet, Updated Aug. 2001, http://ford.ieor.berkeley.edu/ir/robots_a2.html, Aug. 2001.
Goldenberg, et al., "Telemedicine in Otolaryngology", American Journal of Otolaryngology vol. 23, No. 1, 2002, pp. 35-43.
Goldman, Lea, "Machine Dreams", Entrepreneurs, Forbes, May 27, 2002.
Gump, Michael D., "Robot Technology Improves VA Pharmacies", Internet, 2001, pp. 1-3.
Hameed, Mohammed et al., "A Review of Telemedicine", Journal of Telemedicine and Telecare., vol. 5, Supplement 1, 1999, pp. S1:103-S1:106.
Han, et al., "Construction of an Omnidirectional Mobile Robot Platform Based on Active Dual-Wheel Caster Mechanisms and Development of a Control Simulator", Kluwer Acedemic Publishers, vol. 29, Nov. 2000, pp. 257-275.
Handley, et al., "RFC 2327—SDP:Session Description Protocol", http://www.faqs.org/rfcs/rfc2327.html, Apr. 1998.
Hanebeck, et al., "Roman: A mobile Robotic Assistant for Indoor Service Applications", Proceedings of the 1997 IEEE/RSJ International Conference on Intelligent Robots and Systems, 1997.
Harmo, et al., "Moving Eye-Interactive Telepresence Over Internet With a Ball Shaped Mobile Robot", 2000.
Haule, et al., "Control Scheme for Delayed Teleoperation Tasks", Proceedings of the Pacific Rim Conference on Communications, Computer and Signal Processing, May 17, 1995.
Hees, William P., "Communications Design for a Remote Presence Robot", Jan. 14, 2002.
Holmberg, "Development of a Holonomic Mobile Robot for Mobile Manipulation Tasks", International Conference on Field and Service Robotics, Pittsburgh, PA, Aug. 1999.
Intl Communication Union, "ITU-T H.323 Packet-based multimedia communications", http://www.itu.int/rec/T-REC-H.323-199802-S/en, Feb. 1998.
Ishiguro, "Integrating a Perceptual Information Infrastructure with Robotic Avatars: A Framework for Tele-Existence", Proceeding of IEEE Conference on Intelligent Robots and Systems, 1999, pp. 1032-1038.
Ivanova, Natali, "Masters thesis: Internet Based Interface for Control of a Mobile Robot", Department of Numerical Analysis and Computer Science, 2003, 59 pages.
Jenkins, et al., "Telehealth Advancing Nursing Practice", Nursing Outlook, vol. 49, No. 2, Mar./Apr. 2001.
Johanson, "Supporting video-mediated communication over the Internet", Chalmers University of Technology, Dept of Computer Engineering, Gothenburg, Sweden, 2003.
Jouppi, et al., "Mutually-lmmersive Audio Telepresence", Audio Engineering Society Convention Paper presented at 113th Convention, Oct. 2002.
Jouppi, Norman et al., "First Steps Towards Mutually-Immersive Mobile Telepresence", CSCW, 02, New Orleans LA, Nov. 16-20, 2002.
Kanehiro, Fumio et al., "Virtual Humanoid Robot Platform to Develop Controllers of Real Humanoid Robots without Porting", IEEE, 2001, pp. 3217-3276.

(56) References Cited

OTHER PUBLICATIONS

Kaplan, A. E. et al., "An Internet Accessible Telepresence", {aek keshav nls jhv}@research.att.com, AT&T Bell Laboratories, Murray Hill, N.J., pp. 1-7.
Keeler et al., "Raven Interface Project", http://upclose.lrdc.pitt.edu/people/louw—assets/Raven—Slides.pps, Fall 2001.
Khatib, "Robots in Human Environments", Proc. International Conference on Control, Automation, Robotics, and Vision ICRACV2000, Singapore, Dec. 2000, pp. 454-457.
Kuzuoka, et al., "Can the GestureCam Be a Surrogate?", Proceedings of the Fourth European Conference on Computer-Supported Cooperative Work, Sep. 10-14, pp. 181-196.
Lane, "Automated Aides", Newsday, http://www.cs.cum.edu/nursebot/web/press/nd4380.htm, Oct. 17, 2000.
Lee, et al., "A novel method of surgical instruction: International telementoring", Internet, 1998, pp. 1-4.
Lim, Hun-Ok et al., "Control to Realize Human-like Walking of a Biped Humanoid Robot", IEEE, 2000, pp. 3271-3276.
Linebarger, John M. et al., "Concurrency Control Mechanisms for Closely Coupled Collaboration in Multithreaded Virtual Environments", Presence, Special Issue on Advances in Collaborative VEs, 2004.
Loeb, et al., "Virtual Visit: Improving Communication for Those Who Need It Most", Stud Health Technol Inform.; 94: 2003 pp. 302-308.
Adams, Chris, "Mobile Robotics Research Group", Mobile Robotics Research Group, Edinburgh University, http://www.dai.ed.ac.uk/groups/mrg/MRG.html, Internet, Edinburgh. duplicate of 575084, 2000, pp. 1-2.
Ando, et al., "A Multimedia Self-service Terminal with Conferencing Functions", IEEE, Jul. 5-7, 1995, pp. 357-362.
Android Amusement Corp., "What Marketing Secret . . . Renting Robots from Android Amusement Corp!", (Advertisement), 1982.
Applebome, "Planning Domesticated Robots for Tomorrow's Household", New York Times, http://www.theoldrobots.com/images17/dc17.JPG, Mar. 4, 1982, pp. 21, 23.
Baltus, et al., "Towards Personal Service Robots for the Elderly, Proceedings for the Elderly Workshop on Interactive Robots and Entertainment", Computer Science and Robotics, 2000.
Bar-Cohen, et al., "Virtual reality robotic telesurgery simulations using MEMICA haptic system", Internet, Mar. 5, 2001, pp. 1-7.
Bartholomew, "An Apothecary's Pharmacy", http://classes.bnf.fr/ema/grands/034.htm.
Bauer, Jeffrey C. et al., "Service Robots in Health Care: The Evolution of Mechanical Solutions to Human Resource Problems", Jun. 2003.
Bauer, John et al., "Remote telesurgical mentoring: feasibility and efficacy", IEEE, 2000, pp. 1-9.
Bischoff, "Design Concept and Realization of the Humanoid Service Robot Hermes", Field and Service Robotics, Springer, London, 1998, pp. 485-492.
Blackwell, Gerry, "Video: A Wireless LAN Killer App?", Internet, Apr. 16, 2002, pp. 1-3.
Breslow, Michael J. et al., "Effect of a multiple-site intensive care unit telemedicine program on clinical and economic outcome An alternative paradigm for intensivist staffing", Critical Care Med; vol. 32 No. 1, Jan. 2004, pp. 31-38.
Brooks, Rodney, "Remote Presence", Abstracts from Flesh & Machines, How Robots Will Change Us, Feb. 2002, pp. 131-147.
Candelas, Herias et al., "Flexible virtual and remote laboratory for teaching Robotics", Formatex 2006; Proc. Advance in Control Education Madrid, Spain, Jun. 2006, pp. 21-23.
Celt, et al., "The EICU: It's not just telemedicine", Critical Care Medicine vol. 29, No. 8 (Supplement), Aug. 2001.
Cheetham, Anastasia et al., "Interface Development for a Child's Video Conferencing Robot", 2000, pp. 1-4.
Cleary, et al., "State of the art in surgical robotics: Clinical applications and technology challenges", Internet, Feb. 24, 2002, pp. 1-26.
CNN, "Floating 'droids' to roam space corridors of the future", Internet, Jan. 12, 2000, pp. 1-4.
CNN.Com/Technology, "Paging R. Robot: Machine helps doctors with patients", Internet, Sep. 30, 2003, 1-3.
Crowley, Susan L., "Hello to Our Future", AARP Bulletin, http://www.cs.cmu.ed/-nursebot/web/press/aarp 99_14/millennium.html, Jan. 2000.
Dalton, "Techniques for Web Telerobotics", PhD Thesis, University of Western Australia, http://telerobot.mech.uwa.edu.au/information.html, http://catalogue.library.uwa.edu.au/search, 2001, 27-62 pp. 149-191.
Davies, "Robotics in Minimally Invasive Surgery", Internet, 1995, pp. 5/1-5/2.
Digiorgio, James, "Is Your Emergency Department of the 'Leading Edge?", Internet, 2005, pp. 1-4.
Discovery Channel Canada, "Inventing the Future: 2000 Years of Discovery", (Video Transcript), Jan. 2, 2000.
Elhajj, et al., "Supermedia in Internet-based telerobotic operations", Internet, 2001, pp. 1-14.
Elhajj, et al., "Synchronization and Control of Supermedia Transmission Via the Internet", Proceedings of 2001 International Symposium on Intelligent Multimedia Video and Speech Processing., Hong Kong, May 2-4, 2001.
Ellison, et al., "Telerounding and Patient Satisfaction Following Surgery", pp. 523-530.
Fetterman, "Videoconferencing over the Internet", Internet, 2001, pp. 1-8.
Fiorini, P., et al, "Health Care Robotics: A Progress Report", IEEE International Conference on Robotics and Automation, Apr. 1997, pp. 1271-1276.
Ghiasi, et al., "A Generic Web-based Teleoperations Architecture: Details and Experience", SPIE Conference on Telemanipulator and Telepresence Technologies VI, Sep. 1999.
Goldberg, et al., "Collaborative Teleoperation via the Internet", IEEE International Conference on Robotics and Automation, San Francisco, California, Apr. 2000.
Goldberg, "Desktop Teleoperation via the World Wide Web, Proceedings of the IEEE International Conference on Robotics and Automation", htto://citeseer.ist.osu.edu/cache/oaoers/cs/5/fto:zSzzSzusc.eduzSzoubzSziriszS zraiders.odf/aol, 1995, pp. 654-659.
Long, "HelpMate Robotics, Inc. (Formerly Transitions Research Corporation) Robot Navigation Technology", NIST Special Publication, http://www.atp.nist.gov/eao/sp950-1/helpmate.htm, Mar. 1999, pp. 950-951.
Luna, Nancy, "Robot a new face on geriatric care", OC Register, Aug. 6, 2003.
Mack, "Minimally invasive and robotic surgery", Internet IEEE, 2001, pp. 568-572.
Mair, "Telepresence—The Technology. And Its Economic and Social Implications", IEEE Technology and Society, 1997.
Martin, Anya, "Days Ahead", Assisted Living Today, vol. 9, Nov./Dec. 2002, pp. 19-22.
McCardle, et al., "The challenge of utilizing new technology in design education", Internet, 2000, pp. 122-127.
Meng, et al., "E-Service Robot in Home Healthcare", Proceedings of the 2000 IEEE/RSJ, International Conference on Intelligent Robots and Systems, 2000, pp. 832-837.
Michaud, "Introducing Nursebot", The Boston Globe, http://www.cs.cmu.edu/nursebot/web/press/globe 3 01/index.html, Sep. 11, 2001, pp. 1-5.
Montemerlo, "Telepresence: Experiments in Next Generation Internet", CMU Robotics Institute, http://www.ri.cmu.edu/creative/archives.htm (Video/Transcript), Oct. 20, 1998.
Murphy, "Introduction to AI Robotics", A Bradford Book, 2000, p. 487.
Nakajima, et al., "A Multimedia Teleteaching System using an Electronic Whiteboard for Two Way Communication of Motion Videos and Chalkboards", IEEE, 1993, pp. 436-441.
Nomadic Technologies Inc., "Nomad XR4000 Hardware Manual", Release 1.0, Mar. 1999.

(56) References Cited

OTHER PUBLICATIONS

NT'L Energy Res Sci Comp CTR, "Berkeley Lab's RAGE Telepresence Robot Captures R&D100 Award", http://www.nersc.gov/news/newsroom/RAGE070202.php, Jul. 2, 2002.

Ogata, et al., "Development of Emotional Communication Robot: Wamoeba-2r- Experimental evaluation.", IEEE, 2000, pp. 175-180.

Ogata, et al., "Emotional Communication Robot: WAMOEBA-2R-Emotion Model and Evaluation Experiments", Internet, 1999, pp. 1-16.

Oh, et al., "Autonomous Battery Recharging for Indoor Mobile Robots", Proceedings of Australian Conference on Robotics and Automation, http://users.rsise.anu.edu.au/rsl/rsl¯papers/ACRA2000/Auto_Recharge_Paper.pdf, 2000.

Ojha, A. K., "An application of Virtual Reality in Rehabilitation", IEEE, Apr. 10-13, 1994, pp. 4-6.

Paulos, et al., "A World Wide Web Telerobotic Remote Environment Browser", http://vive.cs.berkeley.edu/capek, 1995.

Paulos, "Designing Personal Tele-embodiment", IEEE International Conference on Robotics and Automation http://www.prop.org/papers/icra98.pdf, 1998.

Paulos, "PRoP: Personal Roving Presence", ACM:CHI Proceedings of CHI '98, http://www.prop.org/papers/chi98.pdf, 1998, p. 6.

Paulos, et al., "Ubiquitous Tele-embodiment: Applications and Implications", International Journal of Human Computer Studies, vol. 46, No. 6, Jun. 1997, pp. 861-877.

\* cited by examiner

MOBILE ROBOT SYSTEM

CROSS REFERENCE TO RELATED APPLICATIONS

This U.S. patent application claims priority under 35 U.S.C. §119(e) to U.S. Provisional Application 61/346,612, filed on May 20, 2010; U.S. Provisional Application 61/356,910, filed on Jun. 21, 2010; U.S. Provisional Application 61/428,717, filed on Dec. 30, 2010; U.S. Provisional Application 61/428,734, filed on Dec. 30, 2010; U.S. Provisional Application 61/428,759, filed on Dec. 30, 2010; and U.S. Provisional Application 61/429,863, filed on Jan. 5, 2011. The disclosures of these prior applications are considered part of the disclosure of this application and are hereby incorporated by reference in their entireties.

TECHNICAL FIELD

This disclosure relates to mobile robot systems incorporating cloud computing.

BACKGROUND

A robot is generally an electro-mechanical machine guided by a computer or electronic programming. Mobile robots have the capability to move around in their environment and are not fixed to one physical location. An example of a mobile robot that is in common use today is an automated guided vehicle or automatic guided vehicle (AGV). An AGV is generally a mobile robot that follows markers or wires in the floor, or uses a vision system or lasers for navigation. Mobile robots can be found in industry, military and security environments. They also appear as consumer products, for entertainment or to perform certain tasks like vacuum cleaning and home assistance.

SUMMARY

One aspect of the disclosure provides a robot system that includes a mobile robot having a controller executing a control system for controlling operation of the robot, a cloud computing service in communication with the controller of the robot, and a remote computing device in communication with the cloud computing service. The remote computing device communicates with the robot through the cloud computing service.

Implementations of the disclosure may include one or more of the following features. In some implementations, the remote computing device executes an application for producing a layout map of a robot operating environment. The remote computing device may store the layout map in external cloud storage using the cloud computing service. In some examples, the controller of the robot accesses the layout map through the cloud computing service for issuing drive commands to a drive system of the robot.

The remote computing device may execute an application (e.g., a software program or routine) providing remote teleoperation of the robot. For example, the application may provide controls for at least one of driving the robot, altering a pose of the robot, viewing video from a camera of the robot, and operating a camera of the robot (e.g., moving the camera and/or taking snapshots or pictures using the camera).

In some implementations, the remote computing device executes an application that provides video conferencing between a user of the computing device and a third party within view of a camera of the robot. The remote computing device may execute an application for scheduling usage of the robot. Moreover, the remote computing device may execute an application for monitoring usage and operation of the robot. The remote computing device may comprise a tablet computer optionally having a touch screen.

Another aspect of the disclosure provides a robot system that includes a mobile robot having a controller executing a control system for controlling operation of the robot, a computing device in communication with the controller, a cloud computing service in communication with the computing device, and a portal in communication with cloud computing service.

Implementations of the disclosure may include one or more of the following features. In some implementations, the portal comprises a web-based portal providing access to content. The portal may receive robot information from the robot through the cloud computing service. Moreover, the robot may receive user information from the portal through the cloud computing service.

In some examples, the computing device includes a touch screen (such as with a tablet computer). The computing device may execute an operating system different from an operating system of the controller. For example, the controller may execute an operating system for robot control while the computing device may execute a business enterprise operating system. In some examples, the computing device executes at least one application that collects robot information from the robot and sends the robot information to the cloud computing service.

The robot may include a base defining a vertical center axis and supporting the controller and a holonomic drive system supported by the base. The drive system has first, second, and third drive wheels, each trilaterally spaced about the vertical center axis and each having a drive direction perpendicular to a radial axis with respect to the vertical center axis. The may also include an extendable leg extending upward from the base and a torso supported by the leg. Actuation of the leg causes a change in elevation of the torso. The computing device can be detachably supported above the torso. In some examples, the robot includes a neck supported by the torso and a head supported by the neck. The neck may be capable of panning and tilting the head with respect to the torso. The head may detachably support the computing device.

Another aspect of the disclosure provides a robot system that includes a mobile robot having a controller executing a control system for controlling operation of the robot, a computing device in communication with the controller, a mediating security device controlling communications between the controller and the computing device, a cloud computing service in communication with the computing device, and a portal in communication with cloud computing service.

In some examples, the mediating security device converts communications between a computing device communication protocol of the computing device and a robot communication protocol of the robot. Moreover, the mediating security device may include an authorization chip for authorizing communication traffic between the computing device in the robot.

The computing device may communicate wirelessly with the robot controller. In some examples, the computing device is releasably attachable to the robot. An exemplary computing device includes a tablet computer.

The portal may be a web-based portal that provides access to content (e.g., news, weather, robot information, user information, etc.). In some examples, the portal receives robot information from the robot through the cloud computing service. In additional examples, the robot receives user information from the portal through the cloud computing service. The computing device may access cloud storage using the cloud computing service. The computing device may execute at least one application that collects robot information from the robot and sends the robot information to the cloud computing service.

One aspect of the disclosure provides a method of operating a mobile robot that includes receiving a layout map corresponding to an environment of the robot, moving the robot in the environment to a layout map location on the layout map, recording a robot map location on a robot map corresponding to the environment and produced by the robot, determining a distortion between the robot map and the layout map using the recorded robot map locations and the corresponding layout map locations, and applying the determined distortion to a target layout map location to determine a corresponding target robot map location.

Implementations of the disclosure may include one or more of the following features. In some implementations, the method includes receiving the layout map from a cloud computing service. The method may include producing the layout map on an application executing on a remote computing device and storing the layout map on a remote cloud storage device using the cloud computing service.

In some examples, the method includes determining a scaling size, origin mapping, and rotation between the layout map and the robot map using existing layout map locations and recorded robot map locations, and resolving a robot map location corresponding to the target layout map location. The method may further include applying an affine transformation to the determined scaling size, origin mapping, and rotation to resolve the target robot map location.

In some implementations, the method includes determining a triangulation between layout map locations that bound the target layout map location. The method may further include determining a scale, rotation, translation, and skew between a triangle mapped in the layout map and a corresponding triangle mapped in the robot map and applying the determined scale, rotation, translation, and skew to the target layout map location to determine the corresponding robot map point.

The method, in some examples, includes determining distances between all layout map locations and the target layout map location, determining a centroid of the layout map locations, determining a centroid of all recorded robot map locations, and for each layout map location, determining a rotation and a length scaling to transform a vector running from the layout map centroid to the target layout location into a vector running from the robot map centroid to the target robot map location.

The method may include producing the robot map using a sensor system of the robot. In some implementations, the method includes emitting light onto a scene of the environment, receiving reflections of the emitted light off surfaces of the scene, determining a distance of each reflecting surface, and constructing a three-dimensional depth map of the scene. The method may include emitting a speckle pattern of light onto the scene and receiving reflections of the speckle pattern from the scene. In some examples, the method includes storing reference images of the speckle pattern as reflected off a reference object in the scene, the reference images captured at different distances from the reference object. The method may further include capturing at least one target image of the speckle pattern as reflected off a target object in the scene and comparing the at least one target image with the reference images for determining a distance of the reflecting surfaces of the target object. In some examples, method includes determining a primary speckle pattern on the target object and computing at least one of a respective cross-correlation and a decorrelation between the primary speckle pattern and the speckle patterns of the reference images. The method may include maneuvering the robot with respect to the target object based on the determined distances of the reflecting surfaces of the target object.

In some implementations, the method includes determining a time-of-flight between emitting the light and receiving the reflected light and determining a distance to the reflecting surfaces of the scene. The method may include emitting the light onto the scene in intermittent pulses. Moreover, the method may include altering a frequency of the emitted light pulses.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Mobile robots can interact or interface with humans to provide a number of services that range from home assistance to commercial assistance and more. In the example of home assistance, a mobile robot can assist elderly people with everyday tasks, including, but not limited to, maintaining a medication regime, mobility assistance, communication assistance (e.g., video conferencing, telecommunications, Internet access, etc.), home or site monitoring (inside and/or outside), person monitoring, and/or providing a personal emergency response system (PERS). For commercial assistance, the mobile robot can provide videoconferencing (e.g., in a hospital setting), a point of sale terminal, interactive information/marketing terminal, etc.

Figure 1:
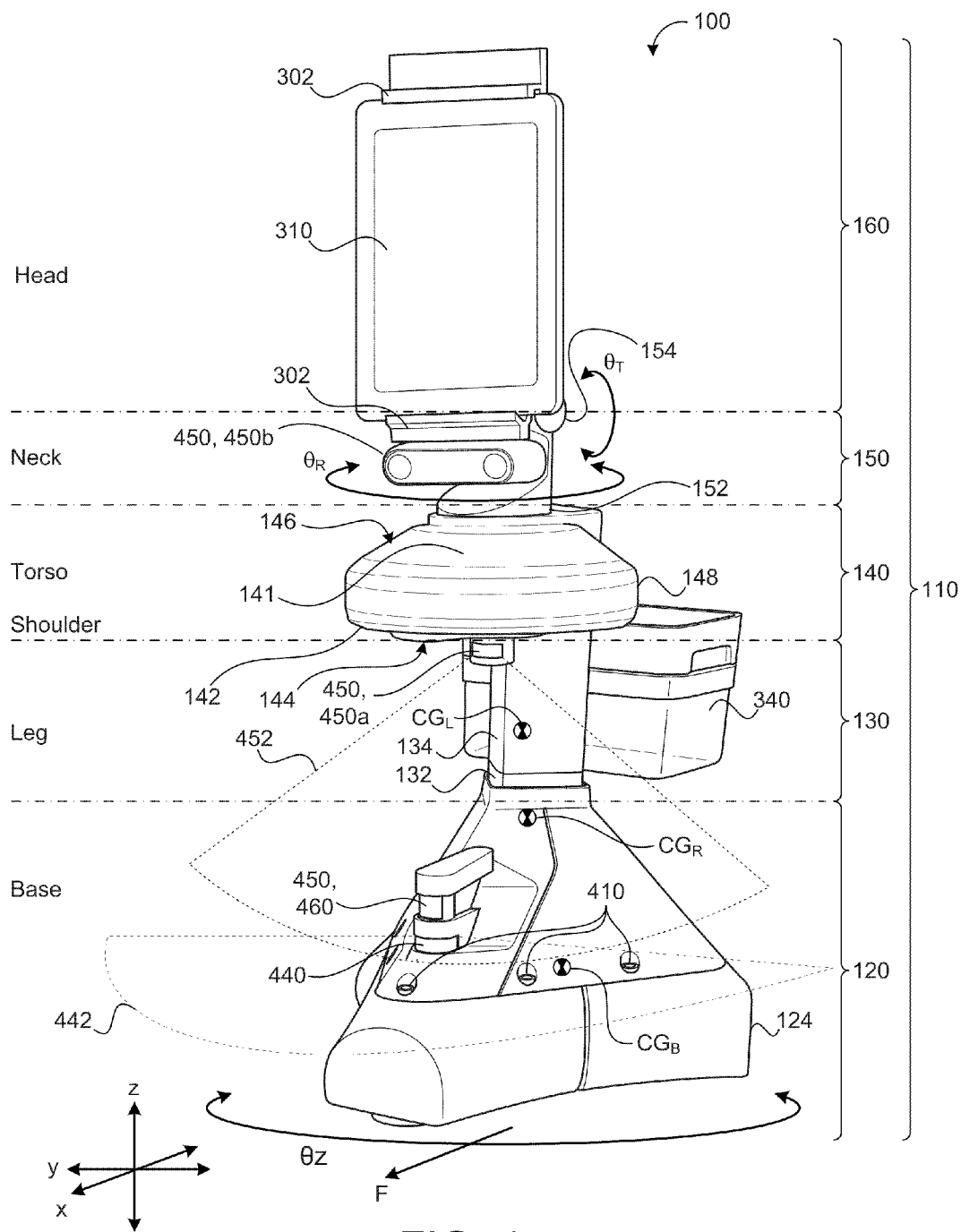
FIG. 1 is a perspective view of an exemplary mobile human interface robot.
Figure 2:
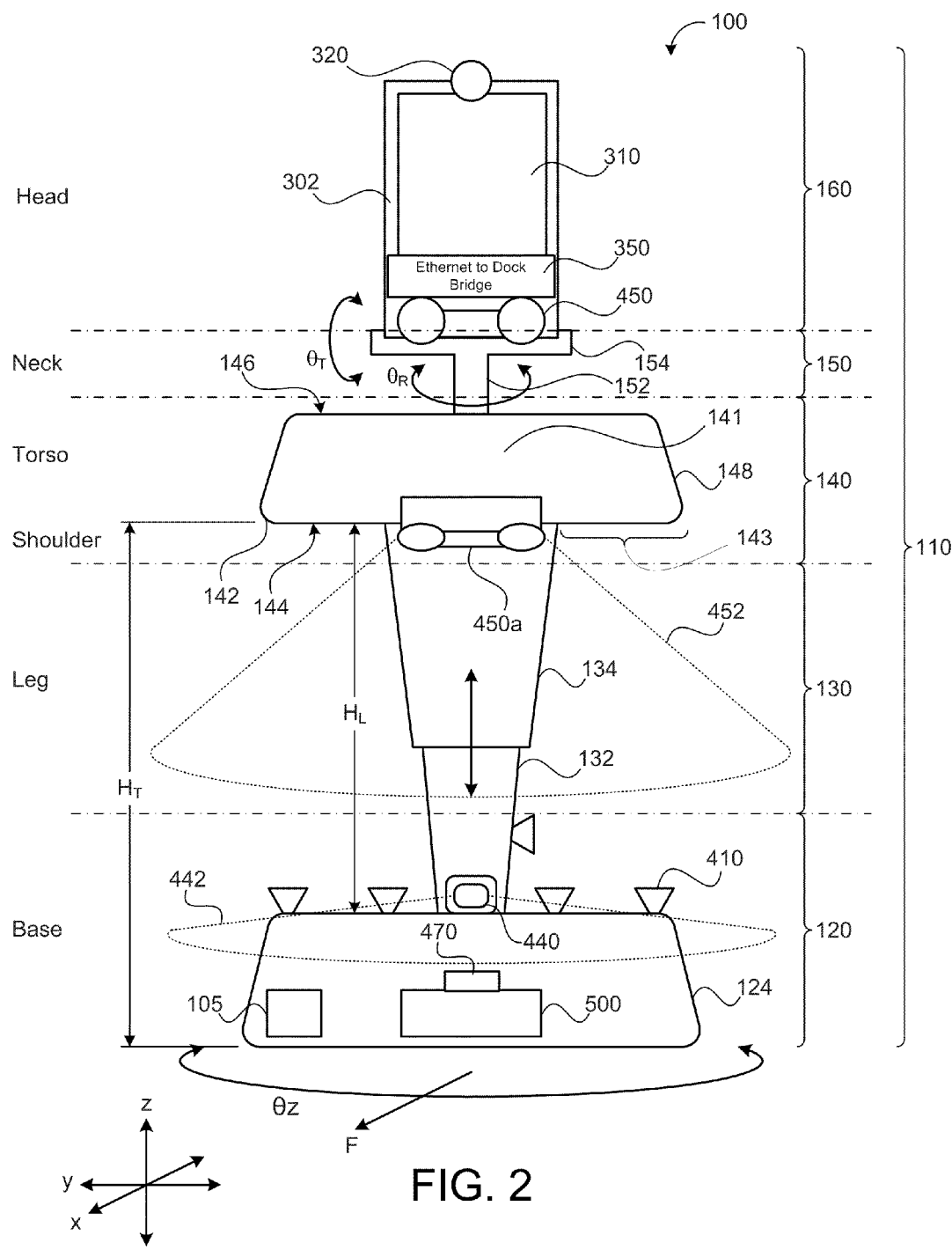
FIG. 2 is a schematic view of an exemplary mobile human interface robot.

Referring to FIGS. 1-2, in some implementations, a mobile robot 100 includes a robot body 110 (or chassis) that defines a forward drive direction F. The robot 100 also includes a drive system 200, an interfacing module 300, and a sensor system 400, each supported by the robot body 110 and in communication with a controller 500 that coordinates operation and movement of the robot 100. A power source 105 (e.g., battery or batteries) can be carried by the robot body 110 and in electrical communication with, and deliver power to, each of these components, as necessary. For example, the controller 500 may include a computer capable of >1000 MIPS (million instructions per second) and the power source 105B provides a battery sufficient to power the computer for more than three hours.

The robot body 110, in the examples shown, includes a base 120, at least one leg 130 extending upwardly from the base 120, and a torso 140 supported by the at least one leg 130. The base 120 may support at least portions of the drive system 200. The robot body 110 also includes a neck 150 supported by the torso 140. The neck 150 supports a head 160, which supports at least a portion of the interfacing module 300. The base 120 includes enough weight (e.g., by supporting the power source 105 (batteries) to maintain a low center of gravity $CG_B$ of the base 120 and a low overall center of gravity $CG_R$ of the robot 100 for maintaining mechanical stability.

Referring to FIGS. 3 and 4A-4C, in some implementations, the base 120 defines a trilaterally symmetric shape (e.g., a triangular shape from the top view). For example, the base 120 may include a base chassis 122 that supports a base body 124 having first, second, and third base body portions 124a, 124b, 124c corresponding to each leg of the trilaterally shaped base 120 (see e.g., FIG. 4A). Each base body portion 124a, 124b, 124c can be movably supported by the base chassis 122 so as to move independently with respect to the base chassis 122 in response to contact with an object.

The trilaterally symmetric shape of the base 120 allows bump detection 360° around the robot 100. Each base body portion 124a, 124b, 124c can have an associated contact sensor e.g., capacitive sensor, read switch, etc.) that detects movement of the corresponding base body portion 124a, 124b, 124c with respect to the base chassis 122.

In some implementations, the drive system 200 provides omni-directional and/or holonomic motion control of the robot 100. As used herein the term "omni-directional" refers to the ability to move in substantially any planar direction, i.e., side-to-side (lateral), forward/back, and rotational. These directions are generally referred to herein as x, y, and θz, respectively. Furthermore, the term "holonomic" is used in a manner substantially consistent with the literature use of the term and refers to the ability to move in a planar direction with three planar degrees of freedom, i.e., two translations and one rotation. Hence, a holonomic robot has the ability to move in a planar direction at a velocity made up of substantially any proportion of the three planar velocities (forward/back, lateral, and rotational), as well as the ability to change these proportions in a substantially continuous manner.

Figure 5A:
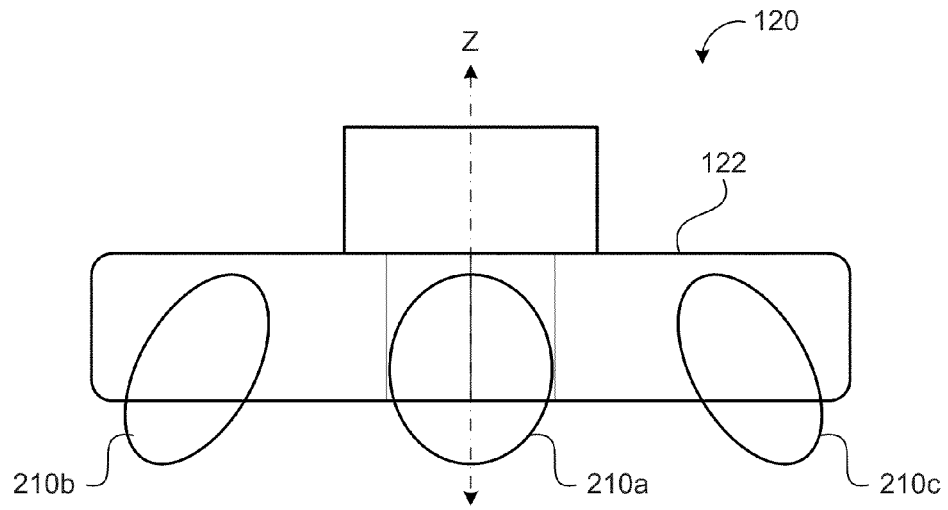
FIG. 5A is a front schematic view of an exemplary base for a mobile human interface robot.
Figure 5B:
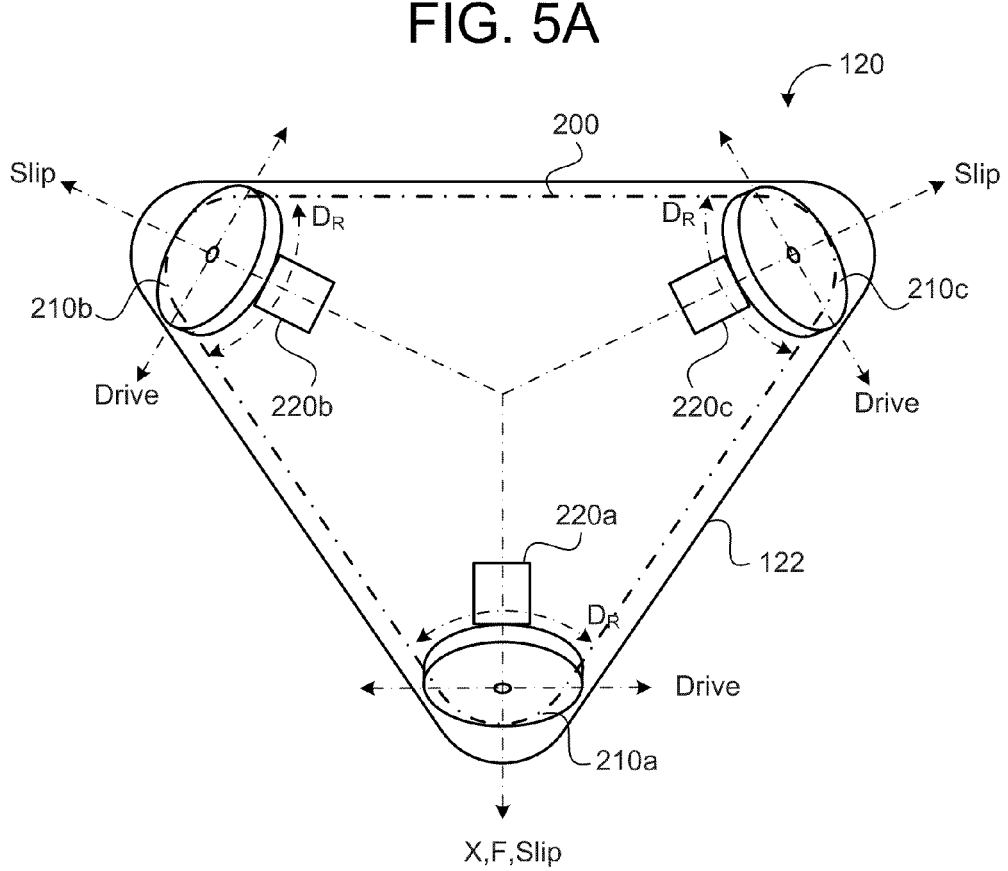
FIG. 5B is a top schematic view of an exemplary base for a mobile human interface robot.

The robot 100 can operate in human environments (e.g., environments typically designed for bipedal, walking occupants) using wheeled mobility. In some implementations, the drive system 200 includes first, second, and third drive wheels 210a, 210b, 210c equally spaced (i.e., trilaterally symmetric) about the vertical axis Z (e.g., 120 degrees apart); however, other arrangements are possible as well. Referring to FIGS. 5A and 5B, the drive wheels 210a, 210b, 210c may define a transverse arcuate rolling surface (i.e., a curved profile in a direction transverse or perpendicular to the rolling direction $D_R$), which may aid maneuverability of the holonomic drive system 200. Each drive wheel 210a, 210b, 210c is coupled to a respective drive motor 220a, 220b, 220c that can drive the drive wheel 210a, 210b, 210c in forward and/or reverse directions independently of the other drive motors 220a, 220b, 220c. Each drive motor 220a-c can have a respective encoder 212 (FIG. 8C), which provides wheel rotation feedback to the controller 500. In some examples, each drive wheels 210a, 210b, 210c is mounted on or near one of the three points of an equilateral triangle and having a drive direction (forward and reverse directions) that is perpendicular to an angle bisector of the respective triangle end. Driving the trilaterally symmetric holonomic base 120 with a forward driving direction F, allows the robot 100 to transition into non forward drive directions for autonomous escape from confinement or clutter and then rotating and/or translating to drive along the forward drive direction F after the escape has been resolved.

Figure 5D:
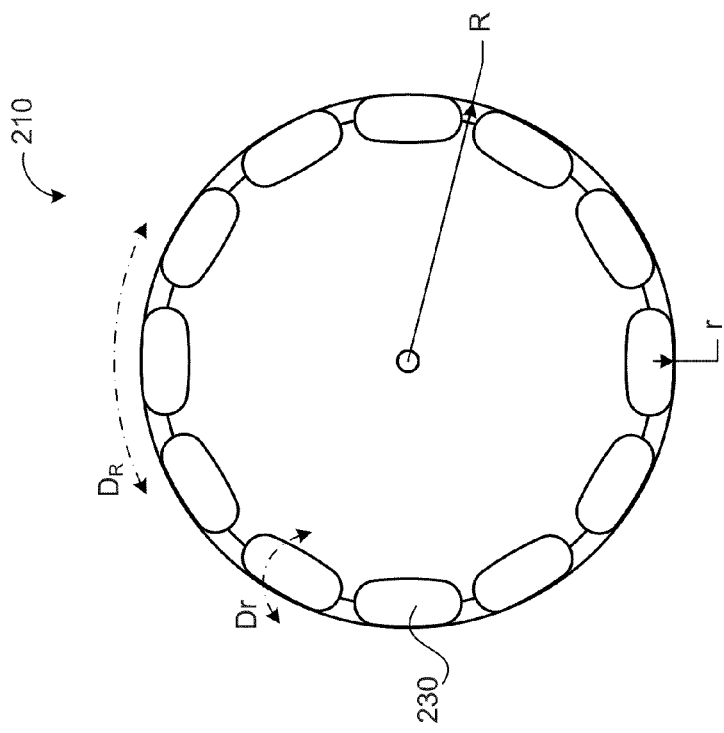
FIG. 5D is a side view of the wheel shown in FIG. 5C.
Figure 5C:
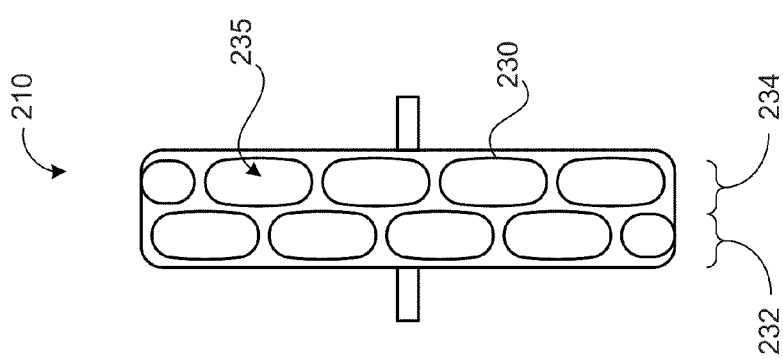
FIG. 5C is a front view of an exemplary holonomic wheel for a mobile human interface robot.

Referring to FIGS. 5C and 5D, in some implementations, each drive wheel 210 includes inboard and outboard rows 232, 234 of rollers 230, each have a rolling direction $D_r$ perpendicular to the rolling direction $D_R$ of the drive wheel 210. The rows 232, 234 of rollers 230 can be staggered (e.g., such that one roller 230 of the inboard row 232 is positioned equally between two adjacent rollers 230 of the outboard row 234. The rollers 230 provide infinite slip perpendicular to the drive direction the drive wheel 210. The rollers 230 define an arcuate (e.g., convex) outer surface 235 perpendicular to their rolling directions $D_r$, such that together the rollers 230 define the circular or substantially circular perimeter of the drive wheel 210. The profile of the rollers 230 affects the overall profile of the drive wheel 210. For example, the rollers 230 may define arcuate outer roller surfaces 235 that together define a scalloped rolling surface of the drive wheel 210 (e.g., as treads for traction). However, configuring the rollers 230 to have contours that define a circular overall rolling surface of the drive wheel 210 allows the robot 100 to travel smoothly on a flat surface instead of vibrating vertically with a wheel tread. When approaching an object at an angle, the staggered rows 232, 234 of rollers 230 (with radius r) can be used as treads to climb objects as tall or almost as tall as a wheel radius R of the drive wheel 210.

In the examples shown in FIGS. 3-5B, the first drive wheel 210a is arranged as a leading drive wheel along the forward drive direction F with the remaining two drive wheels 210b, 210c trailing behind. In this arrangement, to drive forward, the controller 500 may issue a drive command that causes the second and third drive wheels 210b, 210c to drive in a forward rolling direction at an equal rate while the first drive wheel 210a slips along the forward drive direction F. Moreover, this drive wheel arrangement allows the robot 100 to stop short (e.g., incur a rapid negative acceleration against the forward drive direction F). This is due to the natural dynamic instability of the three wheeled design. If the forward drive direction F were along an angle bisector between two forward drive wheels, stopping short would create a torque that would force the robot 100 to fall, pivoting over its two "front" wheels. Instead, travelling with one drive wheel 210a forward naturally supports or prevents the robot 100 from toppling over forward, if there is need to come to a quick stop. When accelerating from a stop, however, the controller 500 may take into account a moment of inertia I of the robot 100 from its overall center of gravity $CG_R$.

In some implementations of the drive system 200, each drive wheel 210a, 210b, 210 has a rolling direction $D_R$ radially aligned with a vertical axis Z, which is orthogonal to X and Y axes of the robot 100. The first drive wheel 210a can be arranged as a leading drive wheel along the forward drive direction F with the remaining two drive wheels 210b, 210c trailing behind. In this arrangement, to drive forward, the controller 500 may issue a drive command that causes the first drive wheel 210a to drive in a forward rolling direction and the second and third drive wheels 210b, 210c to drive at an equal rate as the first drive wheel 210a, but in a reverse direction.

In other implementations, the drive system 200 can be arranged to have the first and second drive wheels 210a, 210b positioned such that an angle bisector of an angle between the two drive wheels 210a, 210b is aligned with the forward drive direction F of the robot 100. In this arrangement, to drive forward, the controller 500 may issue a drive command that causes the first and second drive wheels 210a, 210b to drive in a forward rolling direction and an equal rate, while the third drive wheel 210c drives in a reverse direction or remains idle and is dragged behind the first and second drive wheels 210a, 210b. To turn left or right while driving forward, the controller 500 may issue a command that causes the corresponding first or second drive wheel 210a, 210b to drive at relatively quicker/slower rate. Other drive system 200 arrangements can be used as well. The drive wheels 210a, 210b, 210c may define a cylindrical, circular, elliptical, or polygonal profile.

Referring again to FIGS. 1-3, the base 120 supports at least one leg 130 extending upward in the Z direction from the base 120. The leg(s) 130 may be configured to have a variable height for raising and lowering the torso 140 with respect to the base 120. In some implementations, each leg 130 includes first and second leg portions 132, 134 that move with respect to each other (e.g., telescopic, linear, and/or angular movement). Rather than having extrusions of successively smaller diameter telescopically moving in and out of each other and out of a relatively larger base extrusion, the second leg portion 134, in the examples shown, moves telescopically over the first leg portion 132, thus allowing other components to be placed along the second leg portion 134 and potentially move with the second leg portion 134 to a relatively close proximity of the base 120. The leg 130 may include an actuator assembly 136 (FIG. 8C) for moving the second leg portion 134 with respect to the first leg portion 132. The actuator assembly 136 may include a motor driver 138a in communication with a lift motor 138b and an encoder 138c, which provides position feedback to the controller 500.

Generally, telescopic arrangements include successively smaller diameter extrusions telescopically moving up and out of relatively larger extrusions at the base 120 in order to keep a center of gravity $CG_L$ of the entire leg 130 as low as possible. Moreover, stronger and/or larger components can be placed at the bottom to deal with the greater torques that will be experienced at the base 120 when the leg 130 is fully extended. This approach, however, offers two problems. First, when the relatively smaller components are placed at the top of the leg 130, any rain, dust, or other particulate will tend to run or fall down the extrusions, infiltrating a space between the extrusions, thus obstructing nesting of the extrusions. This creates a very difficult sealing problem while still trying to maintain full mobility/articulation of the leg 130. Second, it may be desirable to mount payloads or accessories on the robot 100. One common place to mount accessories is at the top of the torso 140. If the second leg portion 134 moves telescopically in and out of the first leg portion, accessories and components could only be mounted above the entire second leg portion 134, if they need to move with the torso 140. Otherwise, any components mounted on the second leg portion 134 would limit the telescopic movement of the leg 130.

By having the second leg portion 134 move telescopically over the first leg portion 132, the second leg portion 134 provides additional payload attachment points that can move vertically with respect to the base 120. This type of arrangement causes water or airborne particulate to run down the torso 140 on the outside of every leg portion 132, 134 (e.g., extrusion) without entering a space between the leg portions 132, 134. This greatly simplifies sealing any joints of the leg 130. Moreover, payload/accessory mounting features of the torso 140 and/or second leg portion 134 are always exposed and available no matter how the leg 130 is extended.

Figure 3:
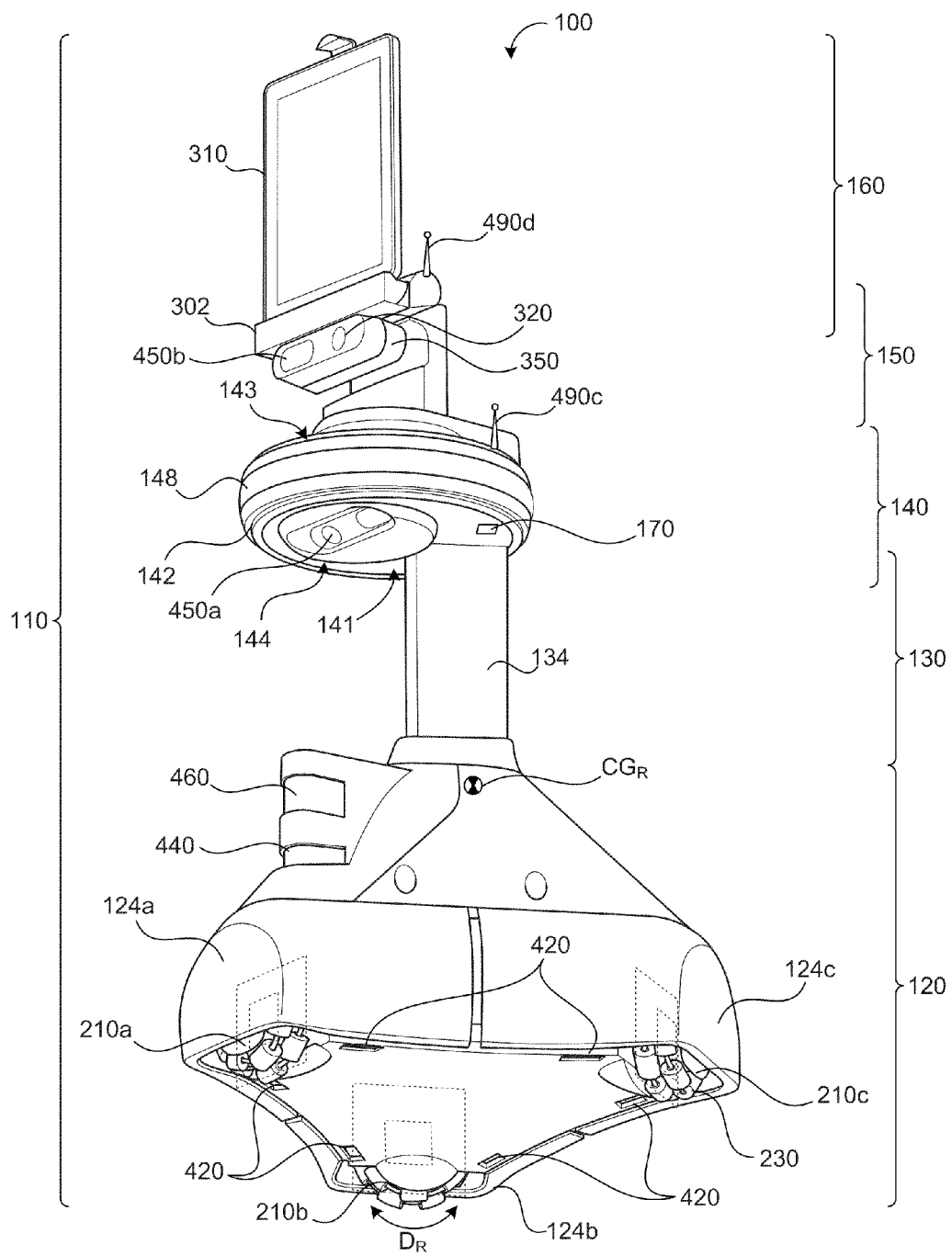
FIG. 3 is an elevated perspective view of an exemplary mobile human interface robot.
Figure 6A:
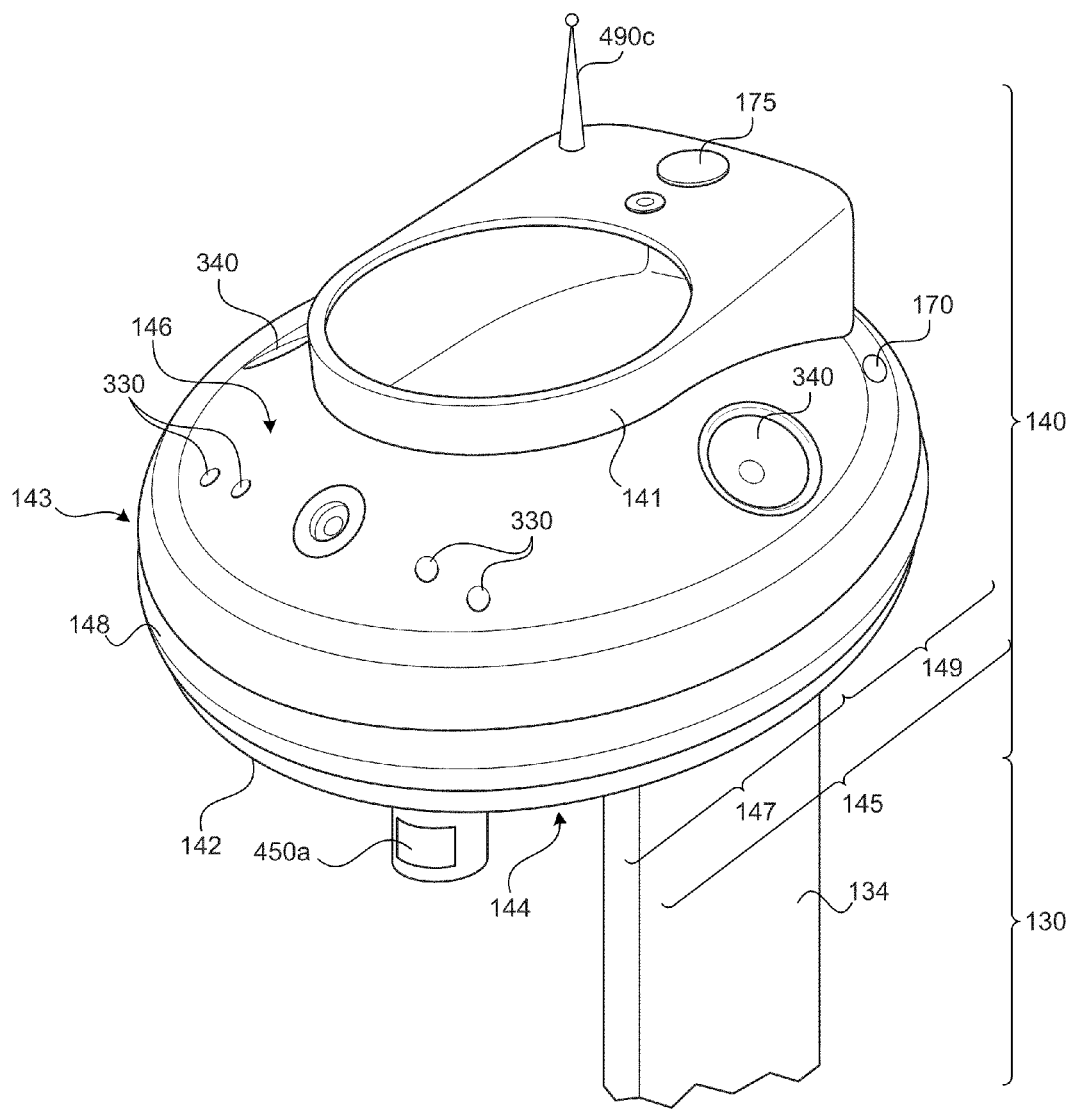
FIG. 6A is a front perspective view of an exemplary torso for a mobile human interface robot.

Referring to FIGS. 3 and 6A, the leg(s) 130 support the torso 140, which may have a shoulder 142 extending over and above the base 120. In the example shown, the torso 140 has a downward facing or bottom surface 144 (e.g., toward the base) forming at least part of the shoulder 142 and an opposite upward facing or top surface 146, with a side surface 148 extending therebetween. The torso 140 may define various shapes or geometries, such as a circular or an elliptical shape having a central portion 141 supported by the leg(s) 130 and a peripheral free portion 143 that extends laterally beyond a lateral extent of the leg(s) 130, thus providing an overhanging portion that defines the downward facing surface 144. In some examples, the torso 140 defines a polygonal or other complex shape that defines a shoulder, which provides an overhanging portion that extends beyond the leg(s) 130 over the base 120.

The robot 100 may include one or more accessory ports 170 (e.g., mechanical and/or electrical interconnect points) for receiving payloads. The accessory ports 170 can be located so that received payloads do not occlude or obstruct sensors of the sensor system 400 (e.g., on the bottom and/or top surfaces 144, 146 of the torso 140, etc.). In some implementations, as shown in FIG. 6A, the torso 140 includes one or more accessory ports 170 on a rearward portion 149 of the torso 140 for receiving a payload in the basket 340, for example, and so as not to obstruct sensors on a forward portion 147 of the torso 140 or other portions of the robot body 110.

An external surface of the torso 140 may be sensitive to contact or touching by a user, so as to receive touch commands from the user. For example, when the user touches the top surface 146 of the torso 140, the robot 100 responds by lowering a height $H_T$ of the torso with respect to the floor (e.g., by decreasing the height $H_L$ of the leg(s) 130 supporting the torso 140). Similarly, when the user touches the bottom surface 144 of the torso 140, the robot 100 responds by raising the torso 140 with respect to the floor (e.g., by increasing the height $H_L$ of the leg(s) 130 supporting the torso 140). Moreover, upon receiving a user touch on forward, rearward, right or left portions of side surface 148 of the torso 140, the robot 100 responds by moving in a corresponding direction of the received touch command (e.g., rearward, forward, left, and right, respectively). The external surface(s) of the torso 140 may include a capacitive sensor in communication with the controller 500 that detects user contact.

Figure 6B:
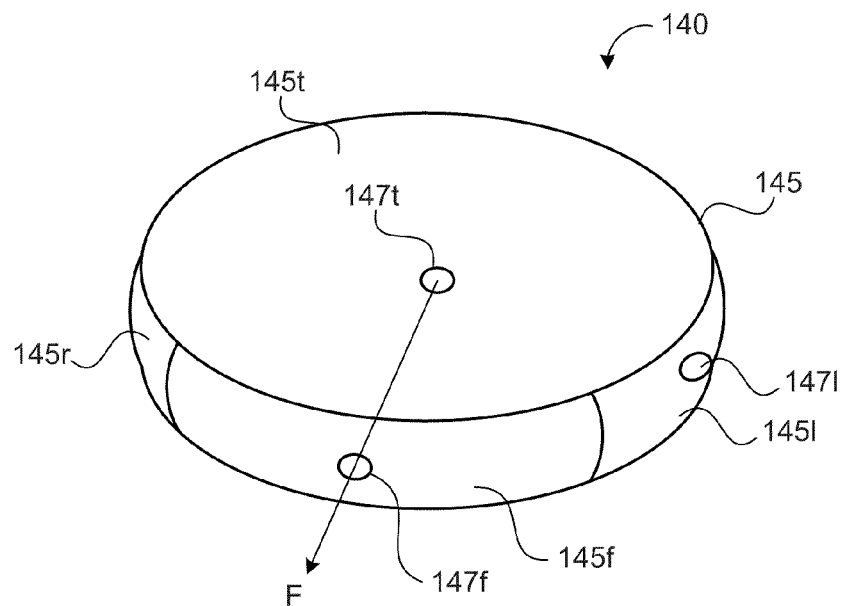
FIG. 6B is a front perspective view of an exemplary torso having touch sensing capabilities for a mobile human interface robot.
Figure 6C:
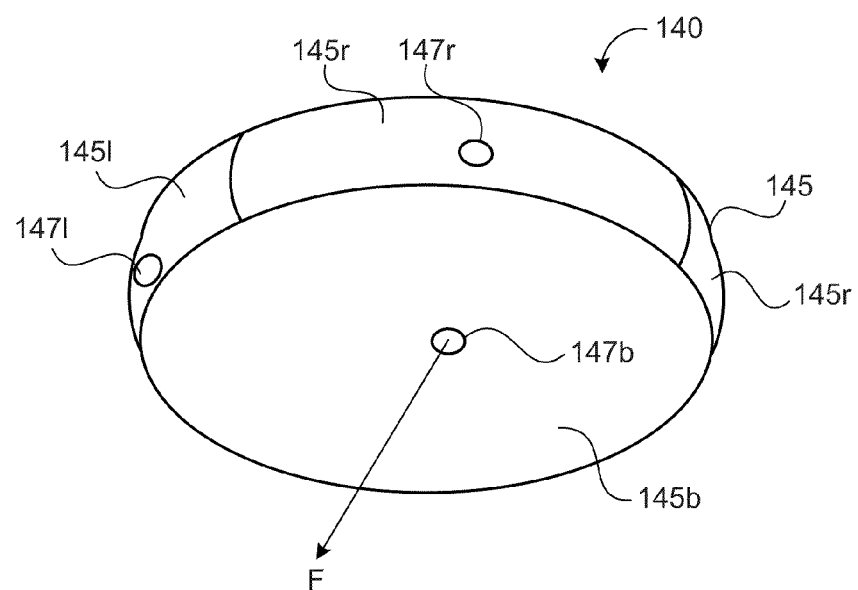
FIG. 6C is a bottom perspective view of the torso shown in FIG. 6B.
Figure 7:
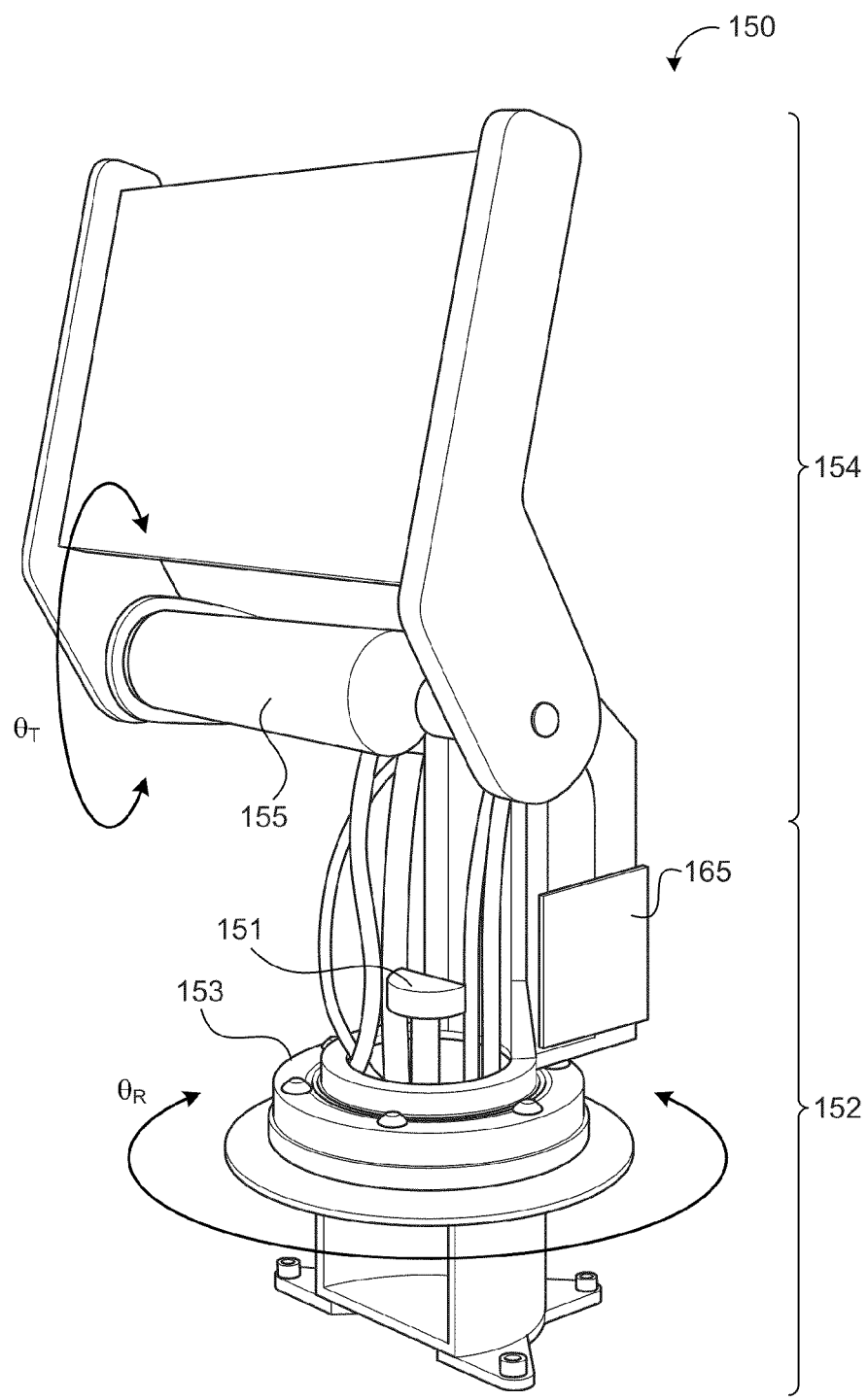
FIG. 7 is a front perspective view of an exemplary neck for a mobile human interface robot.

Referring to FIGS. 6B and 6C, in some implementations, the torso 140 includes a torso body 145 having a top panel 145t, a bottom panel 145b, a front panel 145f, a back panel 145b, a right panel 145r and a left panel 145l. Each panel 145t, 145b, 145f, 145r, 145r, 145l may move independently with respect to the other panels. Moreover, each panel 145t, 145b, 145f, 145r, 145r, 145l may have an associated motion and/or contact sensor 147t, 147b, 147f, 147r, 147r, 147l in communication with the controller 500 that detects motion and/or contact with respective panel.

Figure 10A:
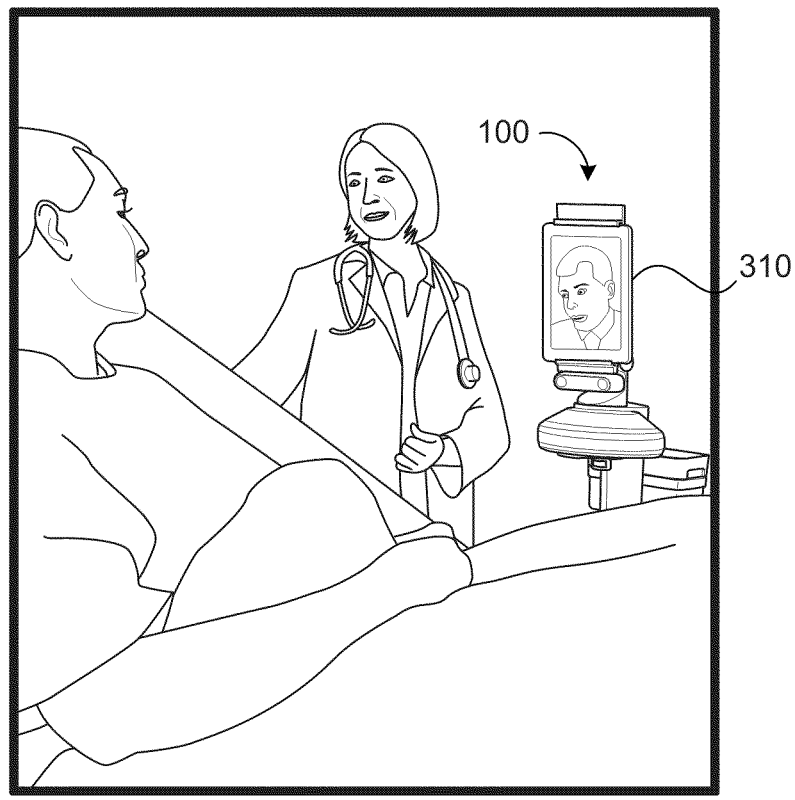
FIGS. 10A-10E perspective views of people interacting with an exemplary mobile human interface robot.

Referring again to FIGS. 1-3 and 7, the torso 140 supports the neck 150, which provides panning and tilting of the head 160 with respect to the torso 140. In the examples shown, the neck 150 includes a rotator 152 and a tilter 154. The rotator 152 may provide a range of angular movement $\theta_R$ (e.g., about the Z axis) of between about 90° and about 360°. Other ranges are possible as well. Moreover, in some examples, the rotator 152 includes electrical connectors or contacts that allow continuous 360° rotation of the head 150 with respect to the torso 140 in an unlimited number of rotations while maintaining electrical communication between the head 150 and the remainder of the robot 100. The tilter 154 may include the same or similar electrical connectors or contacts allow rotation of the head 150 with respect to the torso 140 while maintaining electrical communication between the head 150 and the remainder of the robot 100. The rotator 152 may include a rotator motor 151 coupled to or engaging a ring 153 (e.g., a toothed ring rack). The tilter 154 may move the head at an angle $\theta_T$ (e.g., about the Y axis) with respect to the torso 140 independently of the rotator 152. In some examples that tilter 154 includes a tilter motor 155, which moves the head 150 between an angle $\theta_T$ of ±90° with respect to Z-axis. Other ranges are possible as well, such as ±45°, etc. The robot 100 may be configured so that the leg(s) 130, the torso 140, the neck 150, and the head 160 stay within a perimeter of the base 120 for maintaining stable mobility of the robot 100. In the exemplary circuit schematic shown in FIG. 10F, the neck 150 includes a pan-tilt assembly 151 that includes the rotator 152 and a tilter 154 along with corresponding motor drivers 156a, 156b and encoders 158a, 158b.

The head 160 may be sensitive to contact or touching by a user, so as to receive touch commands from the user. For example, when the user pulls the head 160 forward, the head 160 tilts forward with passive resistance and then holds the position. More over, if the user pushes/pulls the head 160 vertically downward, the torso 140 may lower (via a reduction in length of the leg 130) to lower the head 160. The head 160 and/or neck 150 may include strain gauges and/or contact sensors 165 (FIG. 7) that sense user contact or manipulation.

Figure 8A:
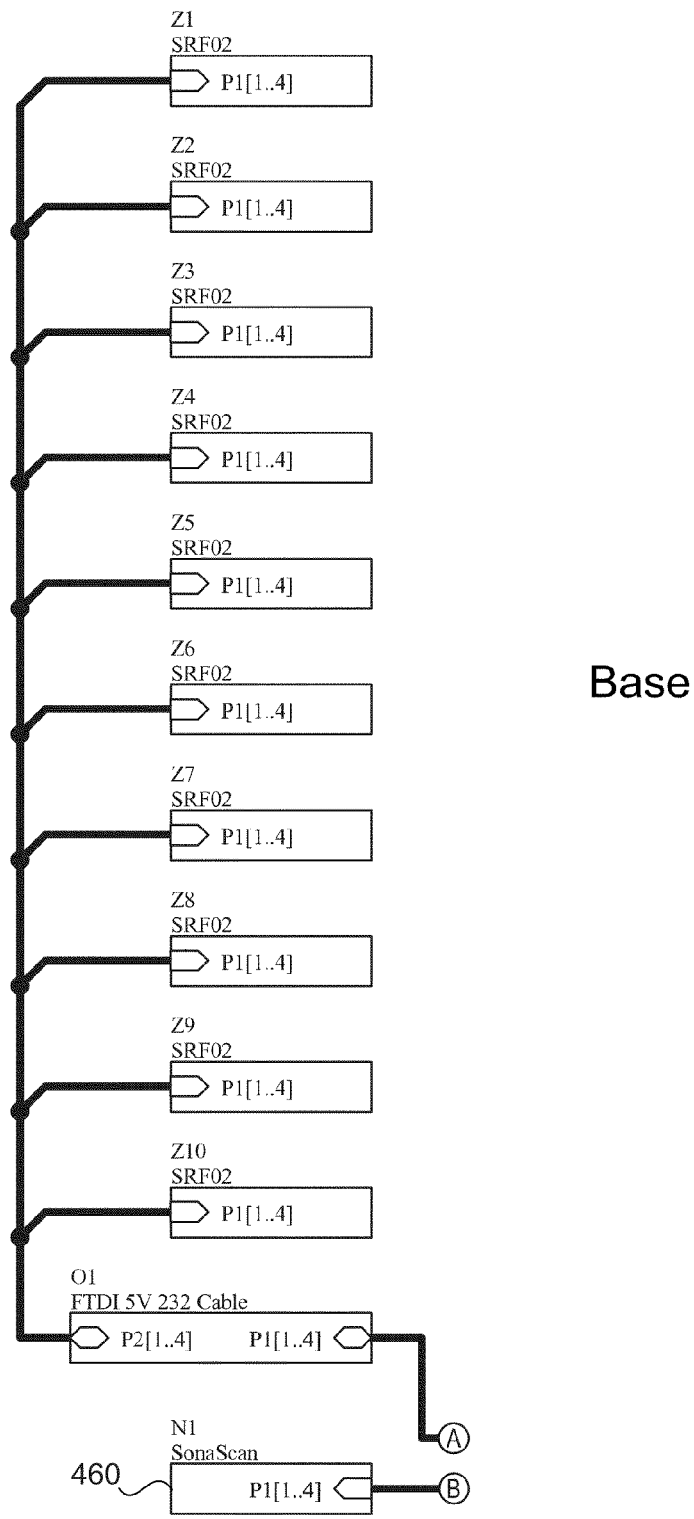
FIGS. 8A-8G are schematic views of exemplary circuitry for a mobile human interface robot.
Figure 8B:
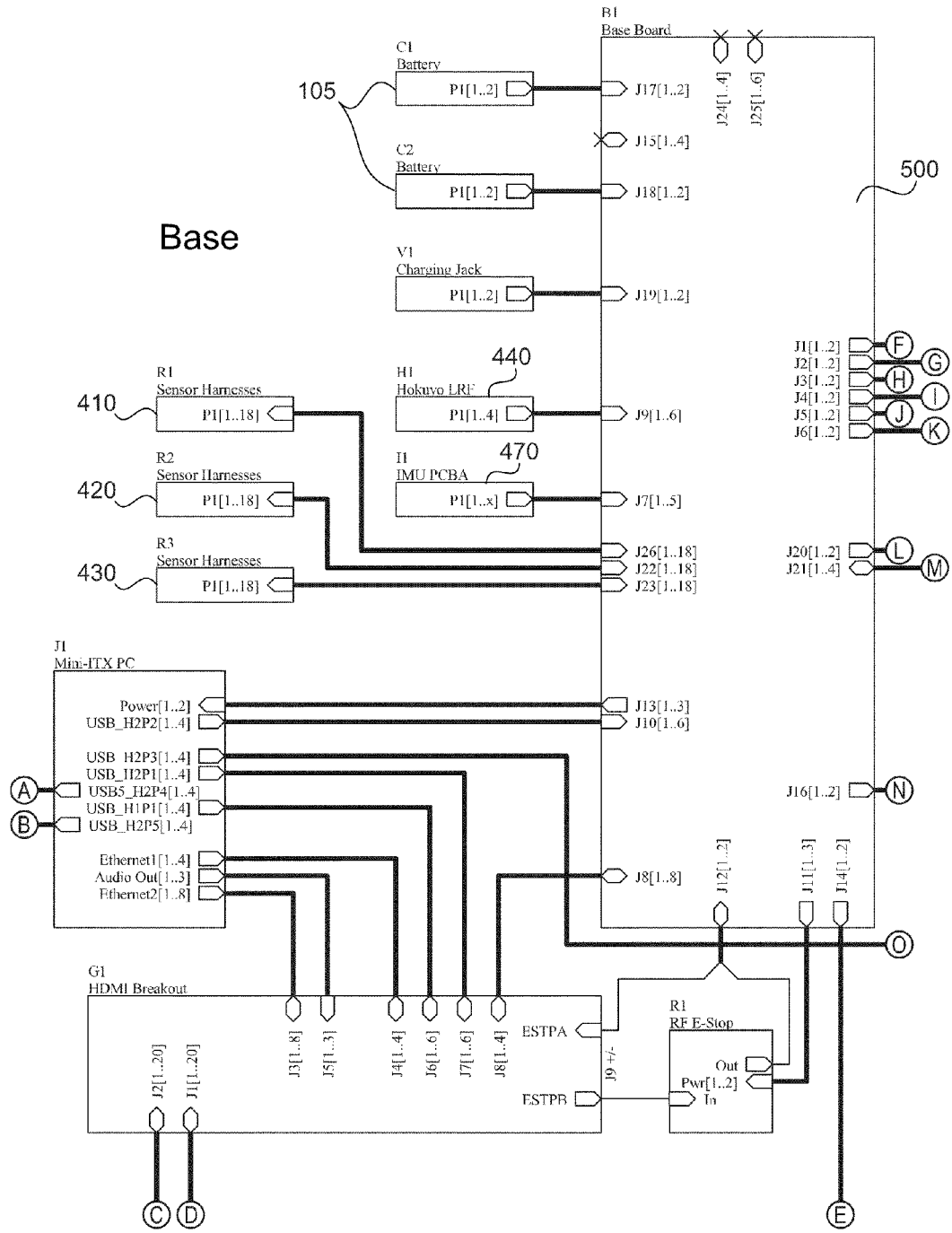
Figure 8C:
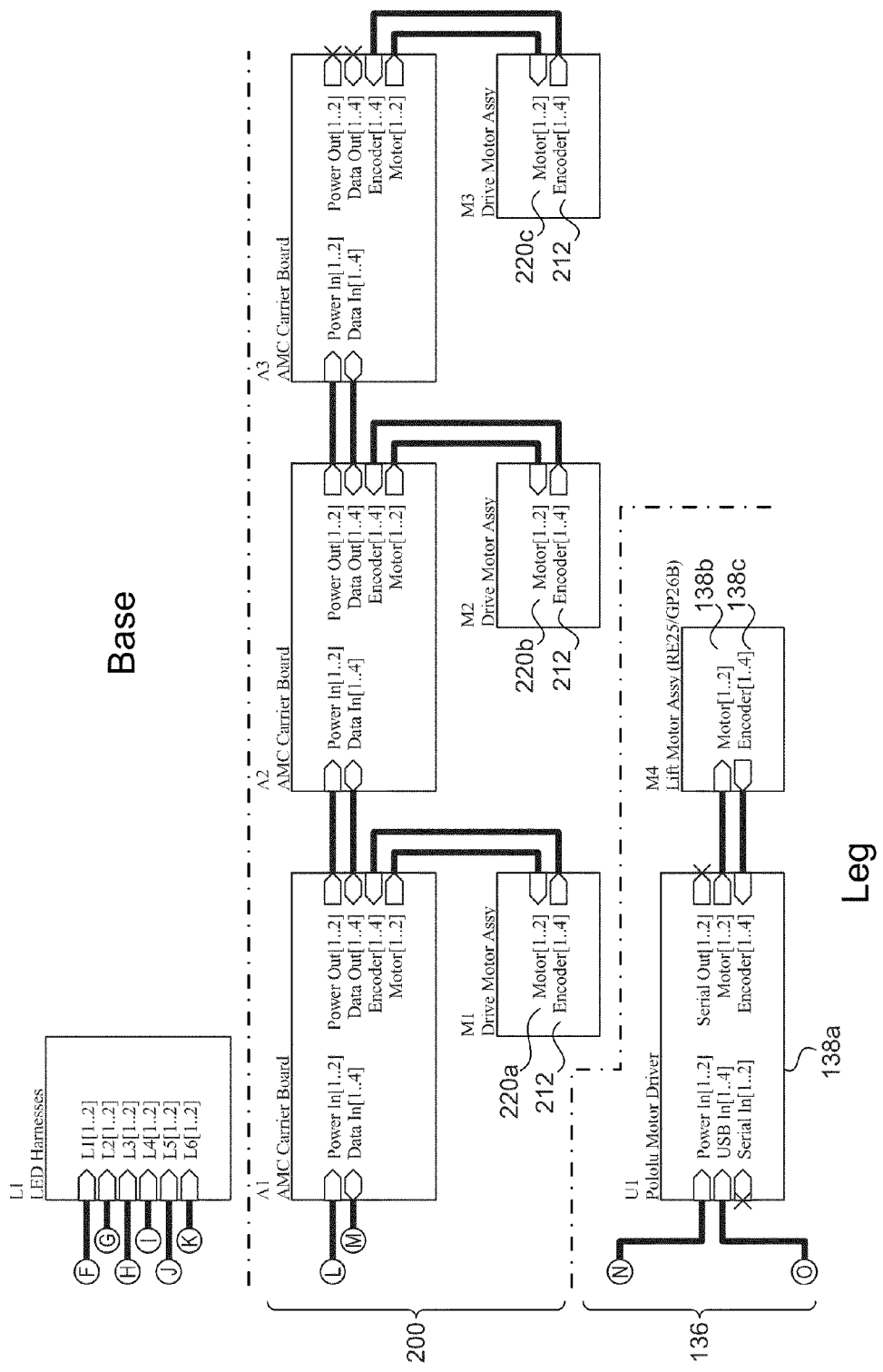
Figure 8D:
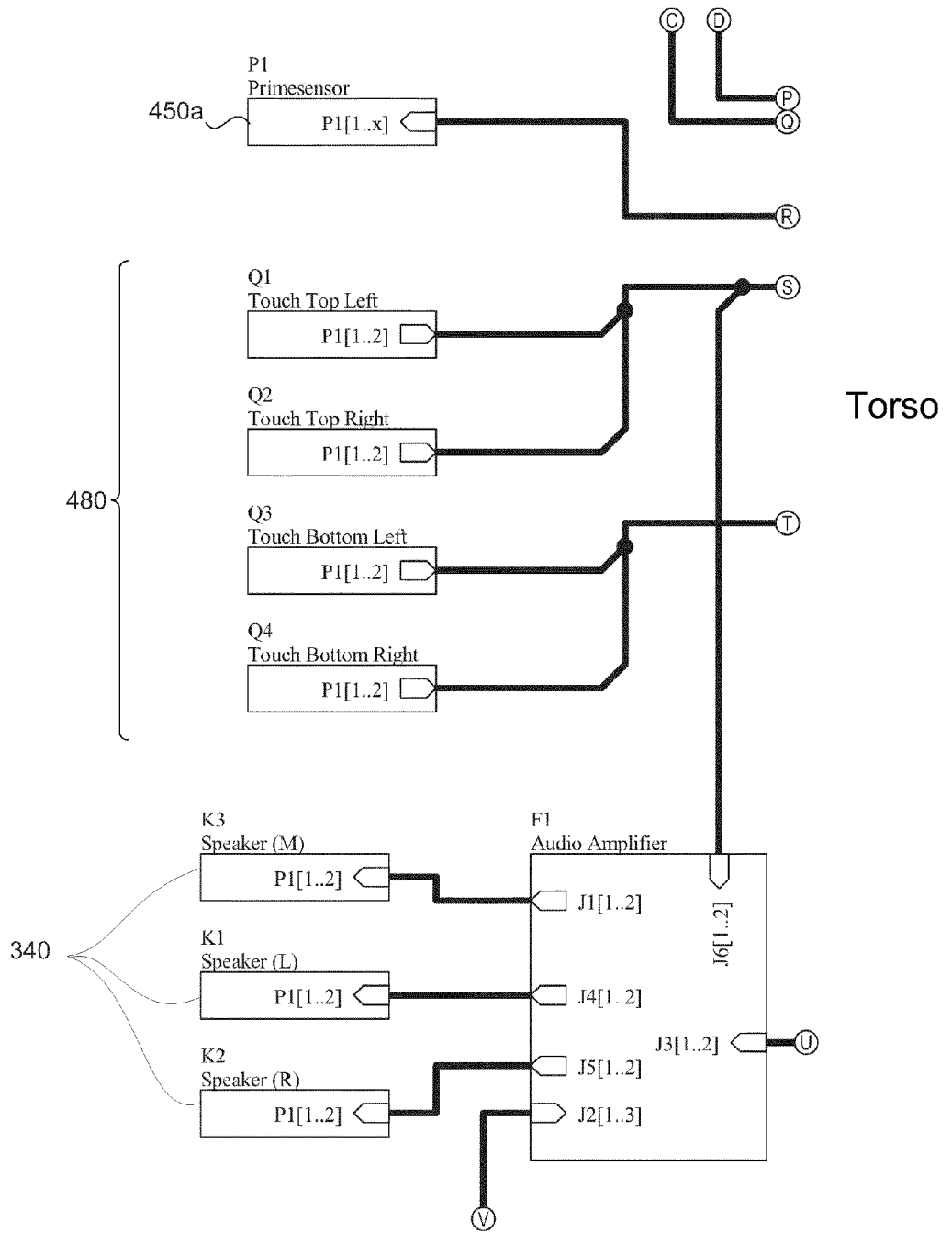
Figure 8E:
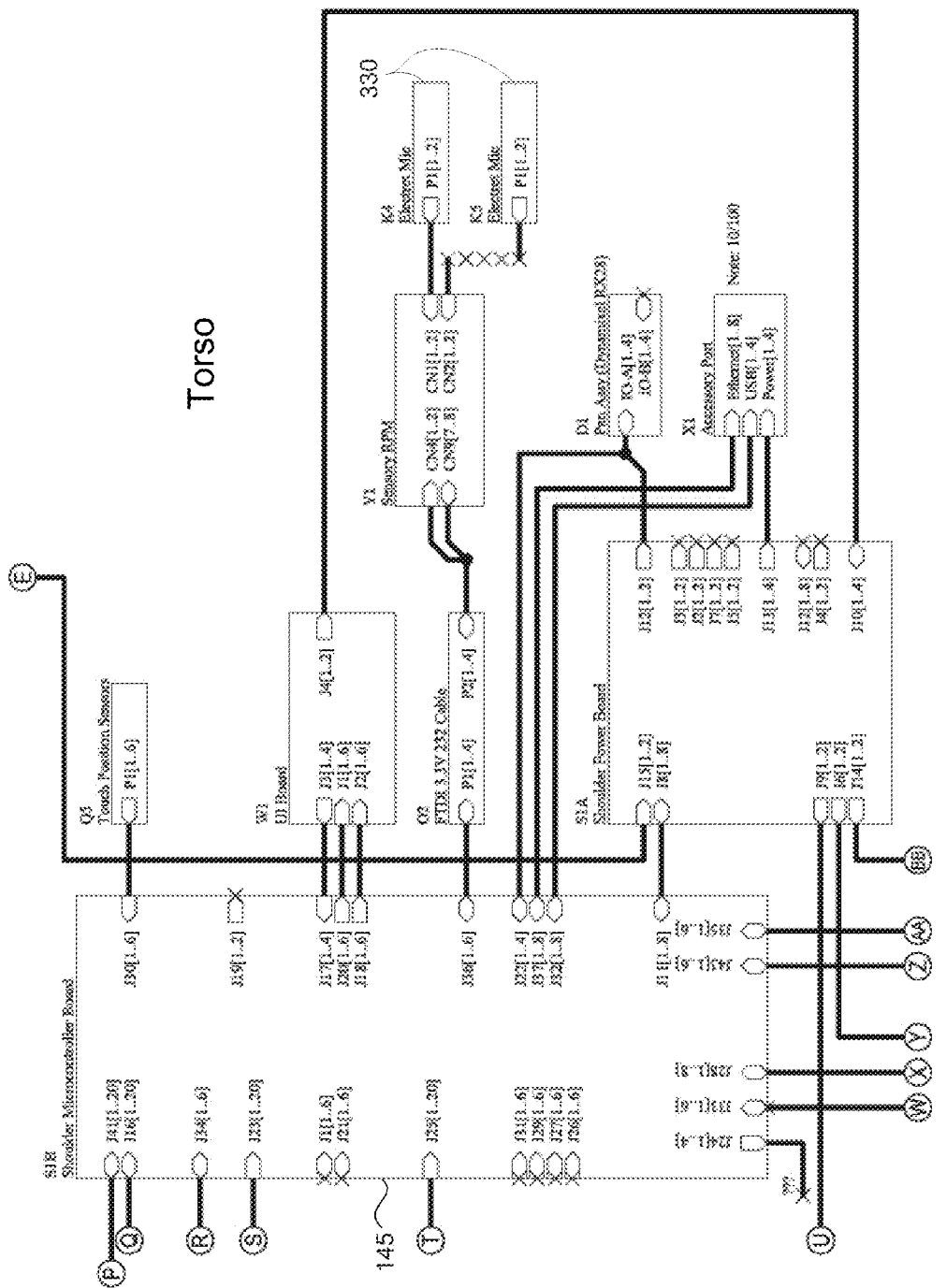
Figure 8F:
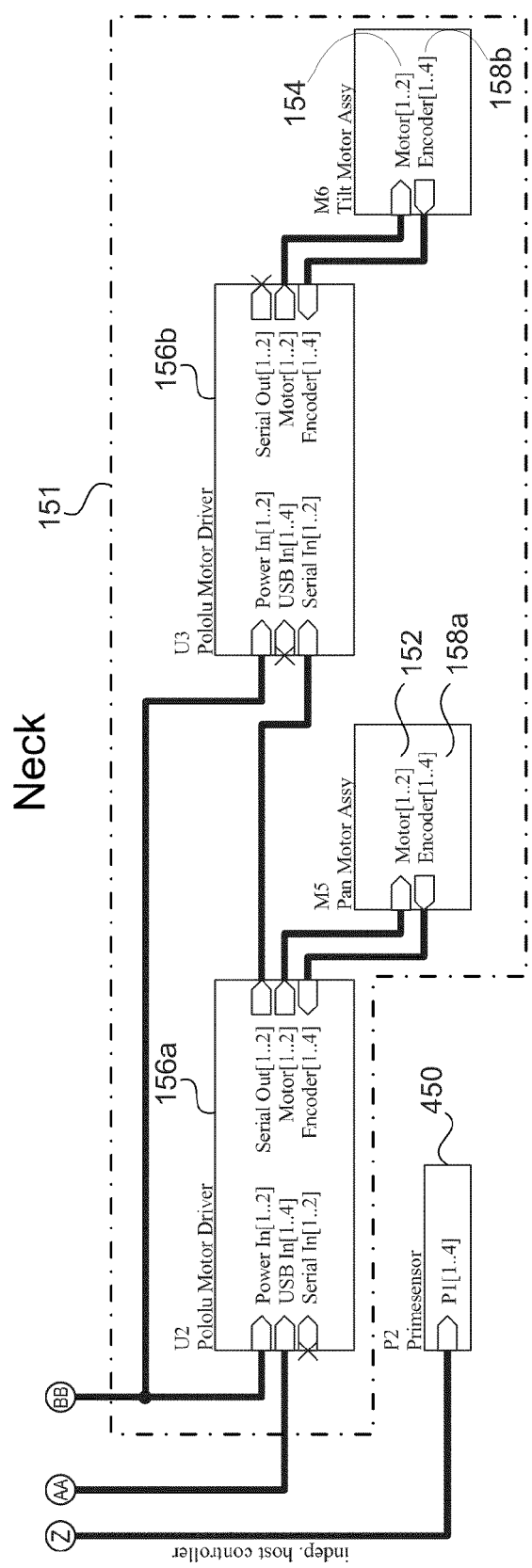
Figure 8G:
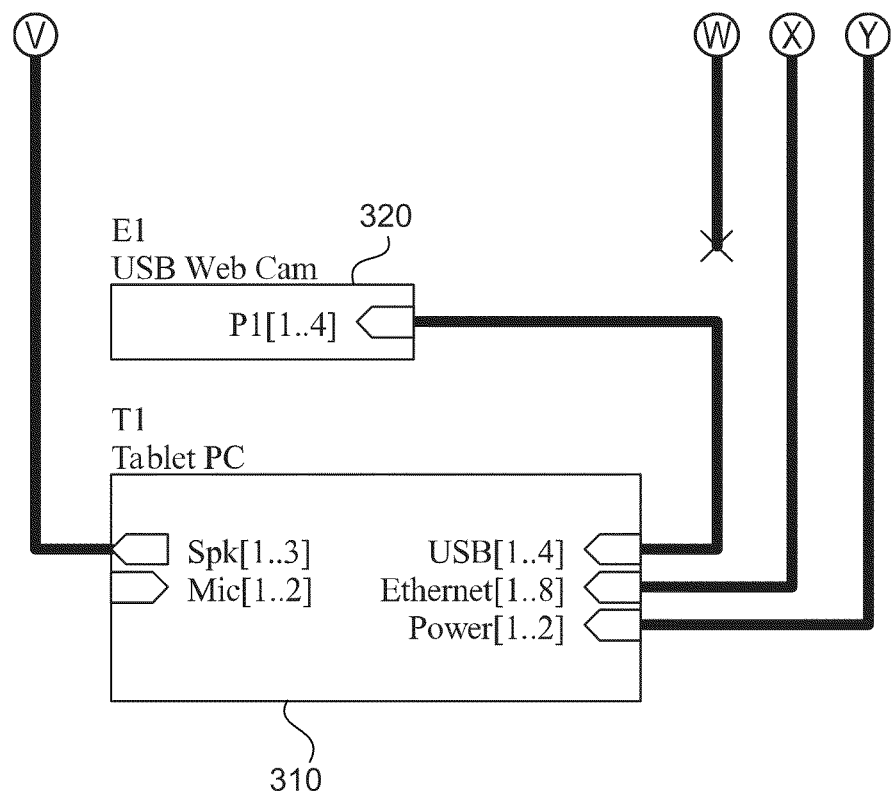

FIGS. 8A-8G provide exemplary schematics of circuitry for the robot 100. FIGS. 8A-8C provide exemplary schematics of circuitry for the base 120, which may house the proximity sensors, such as the sonar proximity sensors 410 and the cliff proximity sensors 420, contact sensors 430, the laser scanner 440, the sonar scanner 460, and the drive system 200. The base 120 may also house the controller 500, the power source 105, and the leg actuator assembly 136. The torso 140 may house a microcontroller 145, the microphone(s) 330, the speaker(s) 340, the scanning 3-D image sensor 450a, and a torso touch sensor system 480, which allows the controller 500 to receive and respond to user contact or touches (e.g., as by moving the torso 140 with respect to the base 120, panning and/or tilting the neck 150, and/or issuing commands to the drive system 200 in response thereto). The neck 150 may house a pan-tilt assembly 151 that may include a pan motor 152 having a corresponding motor driver 156a and encoder 138a, and a tilt motor 154 152 having a corresponding motor driver 156b and encoder 138b. The head 160 may house one or more web pads 310 and a camera 320.

Figure 9:
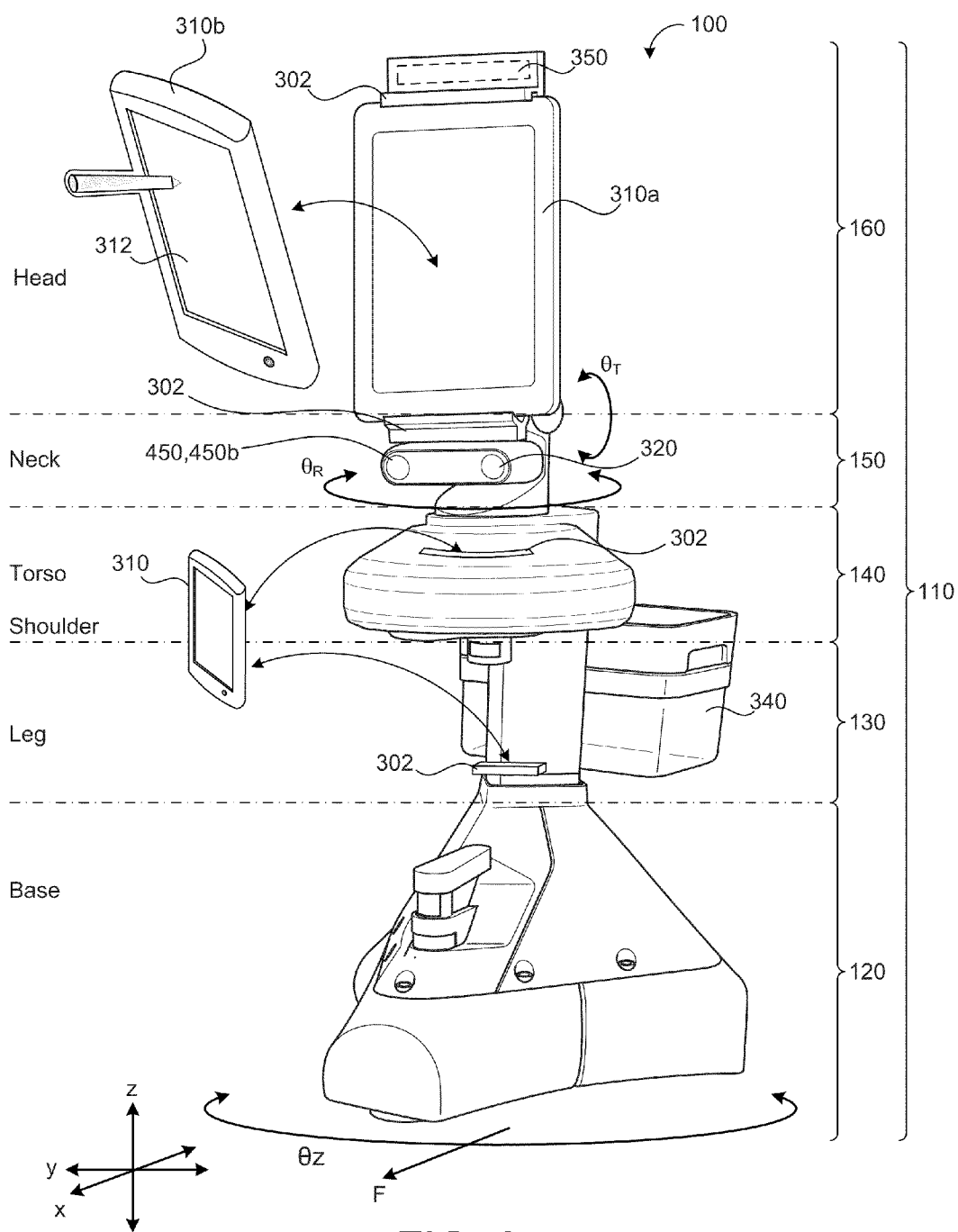
FIG. 9 is a perspective view of an exemplary mobile human interface robot having detachable web pads.

With reference to FIGS. 1-3 and 9, in some implementations, the head 160 supports one or more portions of the interfacing module 300. The head 160 may include a dock 302 for releasably receiving one or more computing tablets 310, also referred to as a web pad or a tablet PC, each of which may have a touch screen 312. The web pad 310 may be oriented forward, rearward or upward. In some implementations, web pad 310 includes a touch screen, optional I/O (e.g., buttons and/or connectors, such as micro-USB, etc.) a processor, and memory in communication with the processor. An exemplary web pad 310 includes the IPAD® by Apple, Inc. In some examples, the web pad and 10 functions as the controller 500 or assist the controller 500 and controlling the robot 100. In some examples, the dock 302 includes a first computing tablet 310a fixedly attached thereto (e.g., a wired interface for data transfer at a relatively higher bandwidth, such as a gigabit rate) and a second computing tablet 310b removably connected thereto. The second web pad 310b may be received over the first web pad 310a as shown in FIG. 9, or the second web pad 310b may be received on an opposite facing side or other side of the head 160 with respect to the first web pad 310a. In additional examples, the head 160 supports a single web pad 310, which may be either fixed or removably attached thereto. The touch screen 312 may detected, monitor, and/or reproduce points of user touching thereon for receiving user inputs and providing a graphical user interface that is touch interactive. In some examples, the web pad 310 includes a touch screen caller that allows the user to find it when it has been removed from the robot 100.

In some implementations, the robot 100 includes multiple web pad docks 302 on one or more portions of the robot body 110. In the example shown in FIG. 9, the robot 100 includes a web pad dock 302 optionally disposed on the leg 130 and/or the torso 140. This allows the user to dock a web pad 310 at different heights on the robot 100, for example, to accommodate users of different height, capture video using a camera of the web pad 310 in different vantage points, and/or to receive multiple web pads 310 on the robot 100.

The interfacing module 300 may include a camera 320 disposed on the head 160 (see e.g., FIG. 2), which can be used to capture video from elevated vantage point of the head 160 (e.g., for videoconferencing). In the example shown in FIG. 3, the camera 320 is disposed on the neck 150. In some examples, the camera 320 is operated only when the web pad 310, 310a is detached or undocked from the head 160. When the web pad 310, 310a is attached or docked on the head 160 in the dock 302 (and optionally covering the camera 320), the robot 100 may use a camera of the web pad 310a for capturing video. In such instances, the camera 320 may be disposed behind the docked web pad 310 and enters an active state when the web pad 310 is detached or undocked from the head 160 and an inactive state when the web pad 310 is attached or docked on the head 160.

The robot 100 can provide videoconferencing (e.g., at 24 fps) through the interface module 300 (e.g., using a web pad 310, the camera 320, the microphones 320, and/or the speakers 340). The videoconferencing can be multiparty. The robot 100 can provide eye contact between both parties of the videoconferencing by maneuvering the head 160 to face the user. Moreover, the robot 100 can have a gaze angle of <5 degrees (e.g., an angle away from an axis normal to the forward face of the head 160). At least one 3-D image sensor 450 and/or the camera 320 on the robot 100 can capture life size images including body language. The controller 500 can synchronize audio and video (e.g., with the difference of <50 ms). In the example shown in FIGS. 10A-10E, robot 100 can provide videoconferencing for people standing or sitting by adjusting the height of the web pad 310 on the head 160 and/or the camera 320 (by raising or lowering the torso 140) and/or panning and/or tilting the head 160. The camera 320 may be movable within at least one degree of freedom separately from the web pad 310. In some examples, the camera 320 has an objective lens positioned more than 3 feet from the ground, but no more than 10 percent of the web pad height from a top edge of a display area of the web pad 310. Moreover, the robot 100 can zoom the camera 320 to obtain close-up pictures or video about the robot 100. The head 160 may include one or more speakers 340 so as to have sound emanate from the head 160 near the web pad 310 displaying the videoconferencing.

Figure 10B:
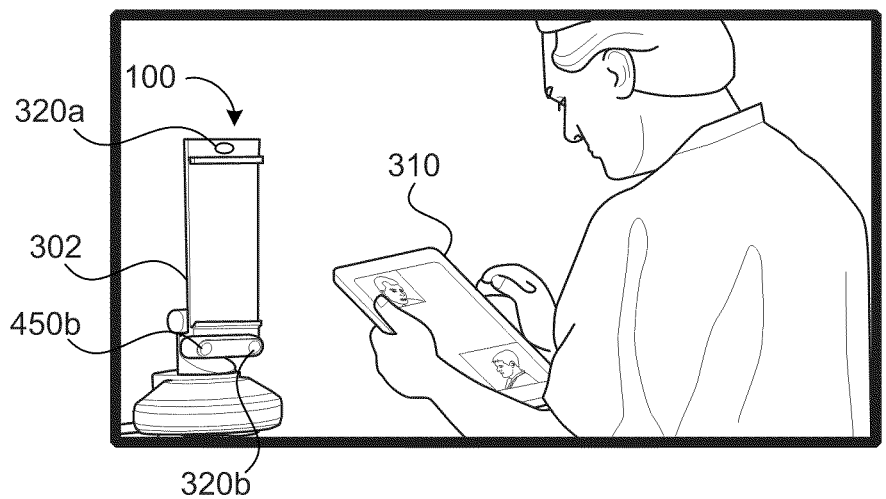
Figure 10C:
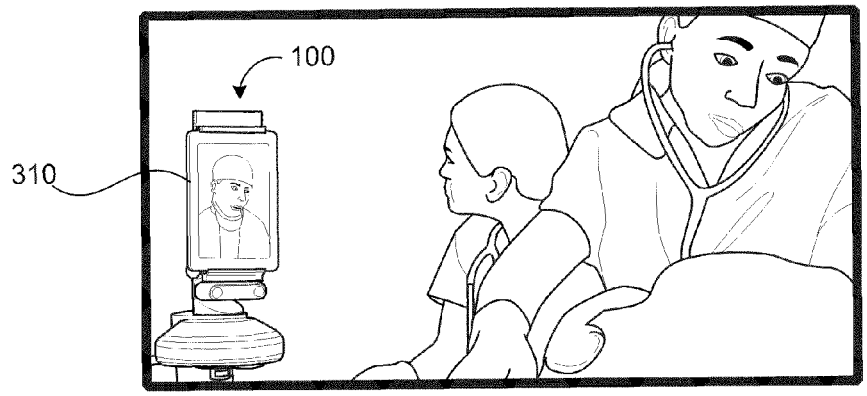
Figure 10D:
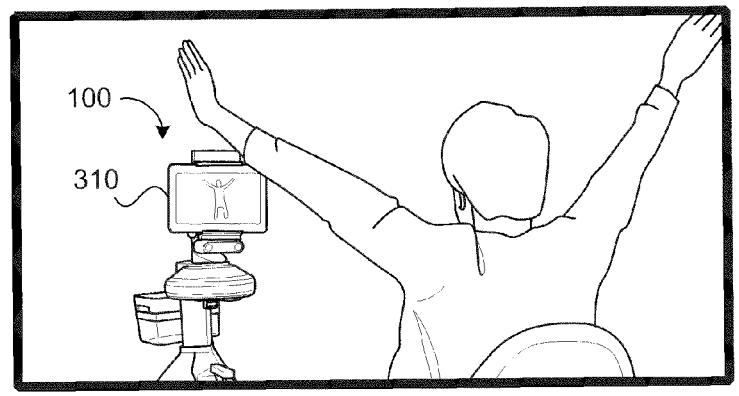
Figure 10E:
Figure 11:
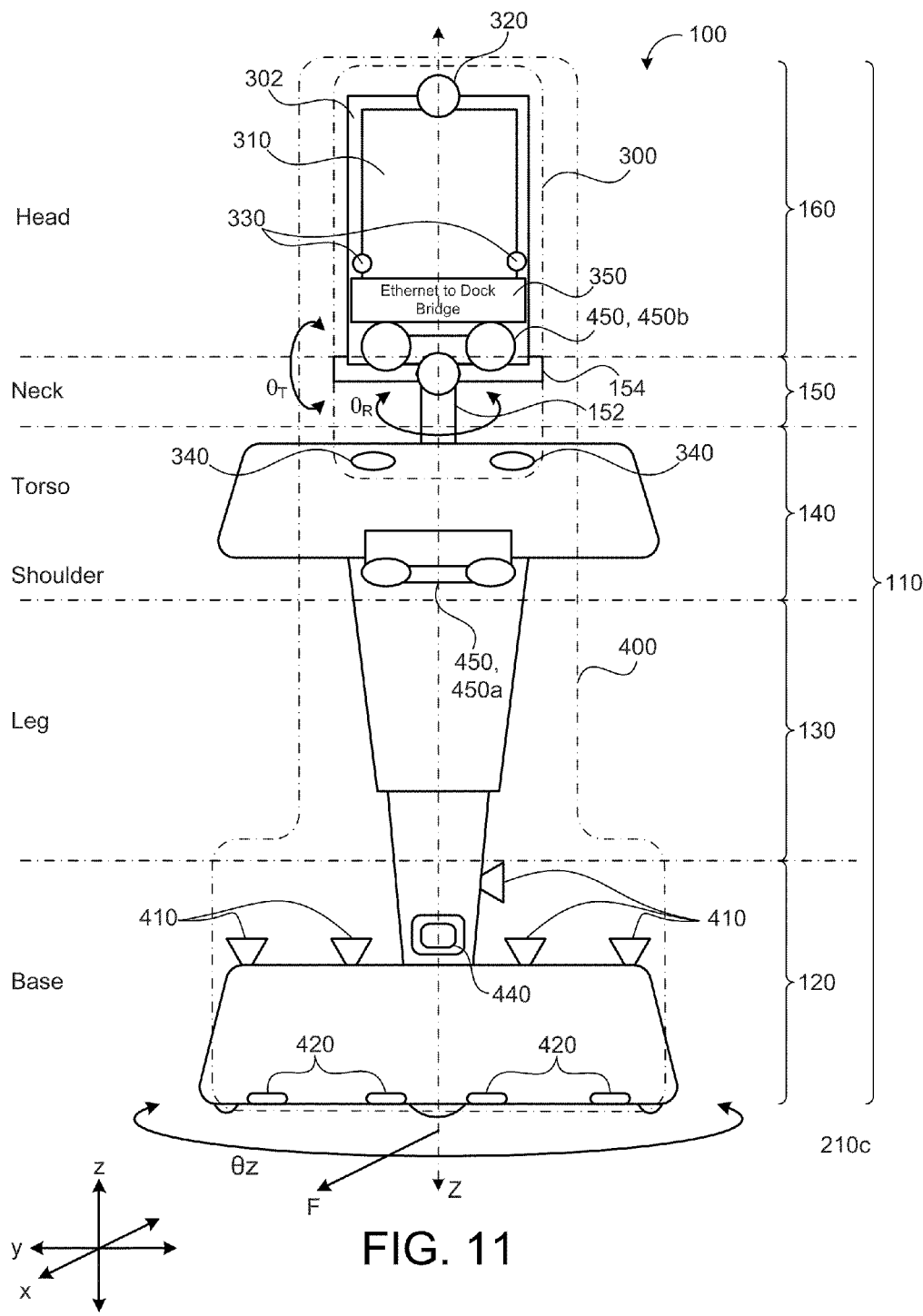
FIG. 11 is a schematic view of an exemplary mobile human interface robot.

In some examples, the robot 100 can receive user inputs into the web pad 310 (e.g., via a touch screen), as shown in FIG. 10E. In some implementations, the web pad 310 is a display or monitor, while in other implementations the web pad 310 is a tablet computer. The web pad 310 can have easy and intuitive controls, such as a touch screen, providing high interactivity. The web pad 310 may have a monitor display 312 (e.g., touch screen) having a display area of 150 square inches or greater movable with at least one degree of freedom.

The robot 100 can provide EMR integration, in some examples, by providing video conferencing between a doctor and patient and/or other doctors or nurses. The robot 100 may include pass-through consultation instruments. For example, the robot 100 may include a stethoscope configured to pass listening to the videoconferencing user (e.g., a doctor). In other examples, the robot includes connectors 170 that allow direct connection to Class II medical devices, such as electronic stethoscopes, otoscopes and ultrasound, to transmit medical data to a remote user (physician).

In the example shown in FIG. 10B, a user may remove the web pad 310 from the web pad dock 302 on the head 160 for remote operation of the robot 100, videoconferencing (e.g., using a camera and microphone of the web pad 310), and/or usage of software applications on the web pad 310. The robot 100 may include first and second cameras 320a, 320b on the head 160 to obtain different vantage points for videoconferencing, navigation, etc., while the web pad 310 is detached from the web pad dock 302.

Interactive applications executable on the controller 500 and/or in communication with the controller 500 may require more than one display on the robot 100. Multiple web pads 310 associated with the robot 100 can provide different combinations of FACETIME® (i.e., video calling) by Apple, Inc., Telestration, HD look at this-cam (e.g., for web pads 310 having built in cameras), can act as a remote operator control unit (OCU) for controlling the robot 100 remotely, and/or provide a local user interface pad.

Referring again to FIG. 6A, the interfacing module 300 may include a microphone 330 (e.g., or micro-phone array) for receiving sound inputs and one or more speakers 330 disposed on the robot body 110 for delivering sound outputs. The microphone 330 and the speaker(s) 340 may each communicate with the controller 500. In some examples, the interfacing module 300 includes a basket 360, which may be configured to hold brochures, emergency information, household items, and other items.

Referring to FIGS. 1-4C, 11 and 12, to achieve reliable and robust autonomous movement, the sensor system 400 may include several different types of sensors which can be used in conjunction with one another to create a perception of the robot's environment sufficient to allow the robot 100 to make intelligent decisions about actions to take in that environment. The sensor system 400 may include one or more types of sensors supported by the robot body 110, which may include obstacle detection obstacle avoidance (ODOA) sensors, communication sensors, navigation sensors, etc. For example, these sensors may include, but not limited to, proximity sensors, contact sensors, three-dimensional (3D) imaging/depth map sensors, a camera (e.g., visible light and/or infrared camera), sonar, radar, LIDAR (Light Detection And Ranging, which can entail optical remote sensing that measures properties of scattered light to find range and/or other information of a distant target), LADAR (Laser Detection and Ranging), etc. In some implementations, the sensor system 400 includes ranging sonar sensors 410 (e.g., nine about a perimeter of the base 120), proximity cliff detectors 420, contact sensors 430, a laser scanner 440, one or more 3-D imaging/depth sensors 450, and an imaging sonar 460.

There are several challenges involved in placing sensors on a robotic platform. First, the sensors need to be placed such that they have maximum coverage of areas of interest around the robot 100. Second, the sensors may need to be placed in such a way that the robot 100 itself causes an absolute minimum of occlusion to the sensors; in essence, the sensors cannot be placed such that they are "blinded" by the robot itself. Third, the placement and mounting of the sensors should not be intrusive to the rest of the industrial design of the platform. In terms of aesthetics, it can be assumed that a robot with sensors mounted inconspicuously is more "attractive" than otherwise. In terms of utility, sensors should be mounted in a manner so as not to interfere with normal robot operation (snagging on obstacles, etc.).

In some implementations, the sensor system 400 includes a set or an array of proximity sensors 410, 420 in communication with the controller 500 and arranged in one or more zones or portions of the robot 100 (e.g., disposed on or near the base body portion 124a, 124b, 124c of the robot body 110) for detecting any nearby or intruding obstacles. The proximity sensors 410, 420 may be converging infrared (IR) emitter-sensor elements, sonar sensors, ultrasonic sensors, and/or imaging sensors (e.g., 3D depth map image sensors) that provide a signal to the controller 500 when an object is within a given range of the robot 100.

Figure 4A:
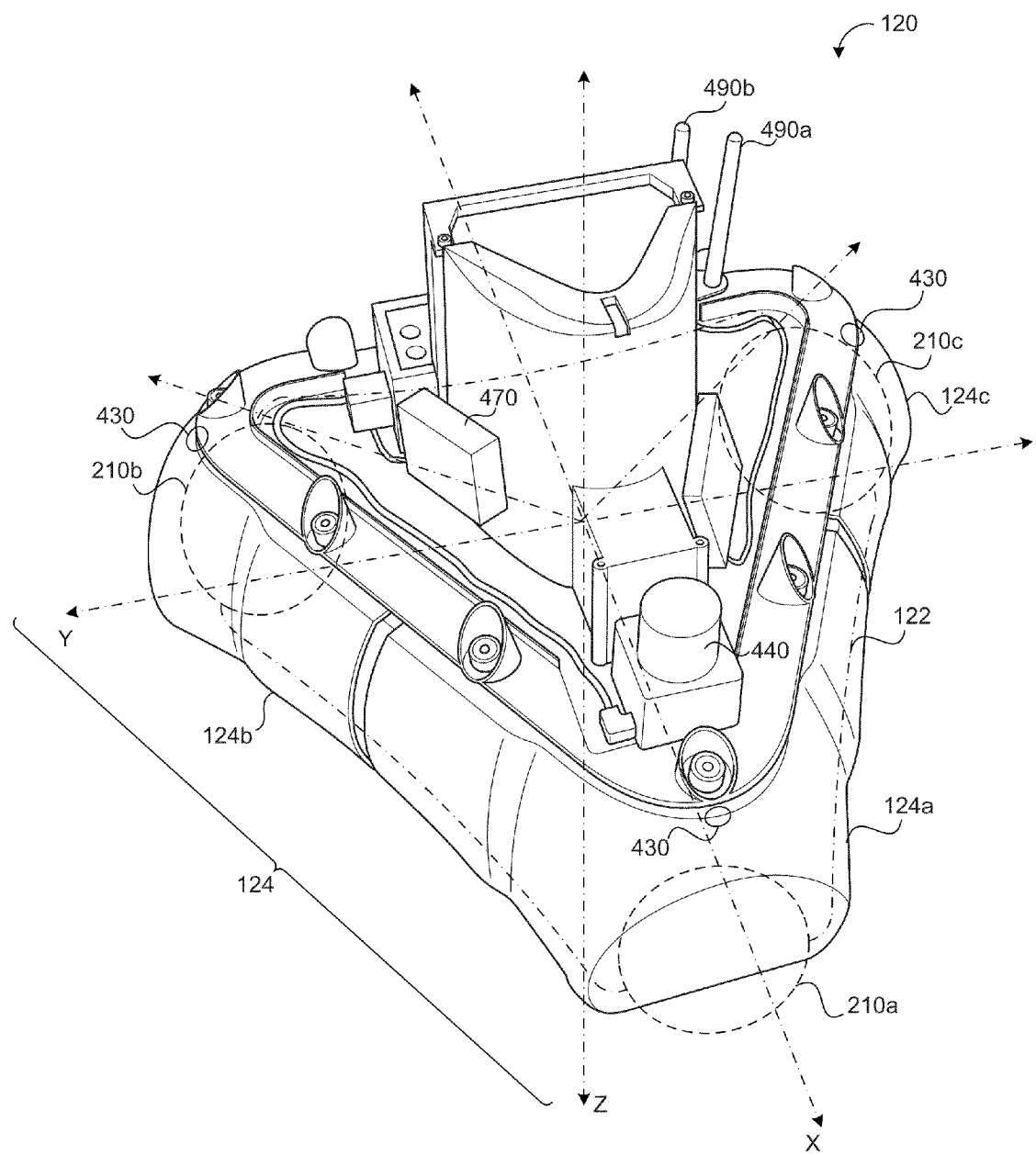
FIG. 4A is a front perspective view of an exemplary base for a mobile human interface robot.
Figure 4B:
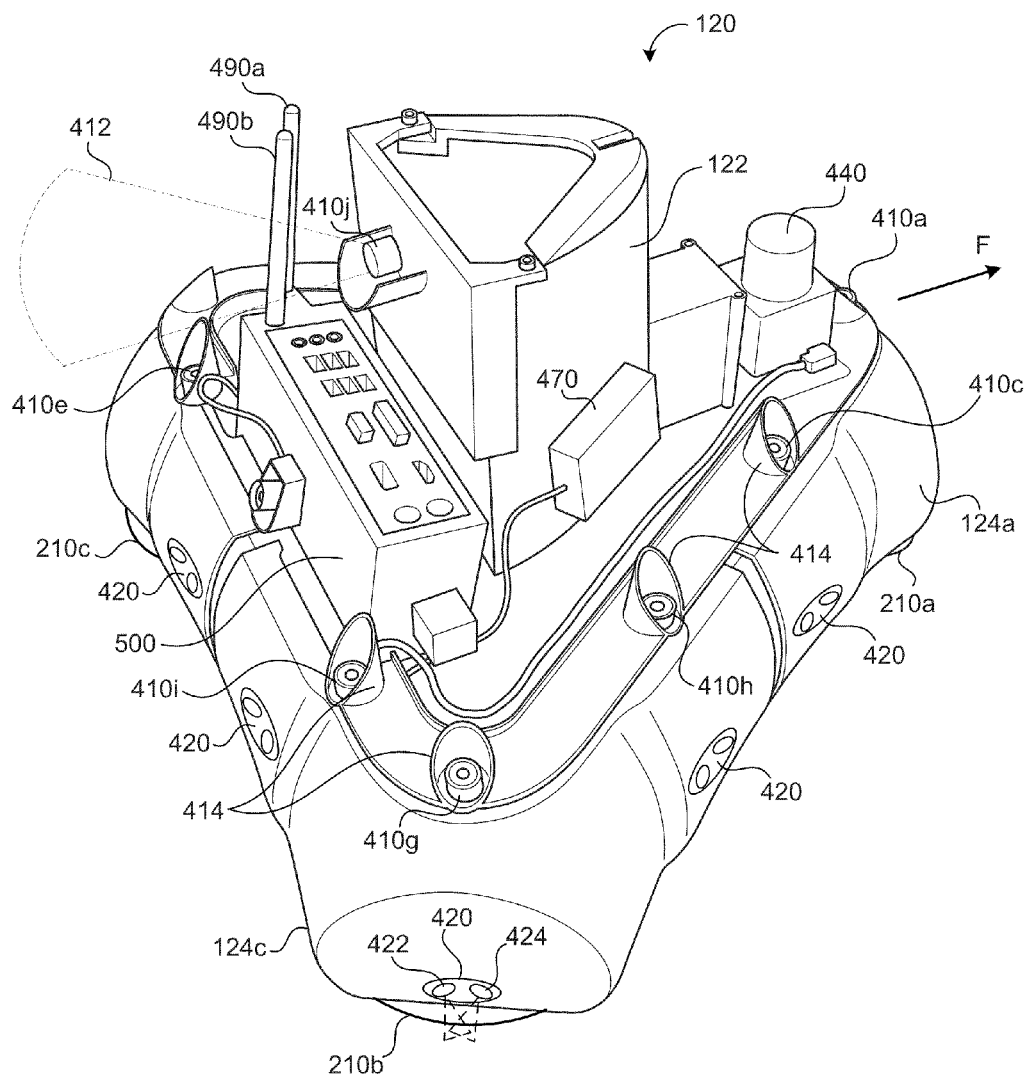
FIG. 4B is a rear perspective view of the base shown in FIG. 4A.
Figure 4C:
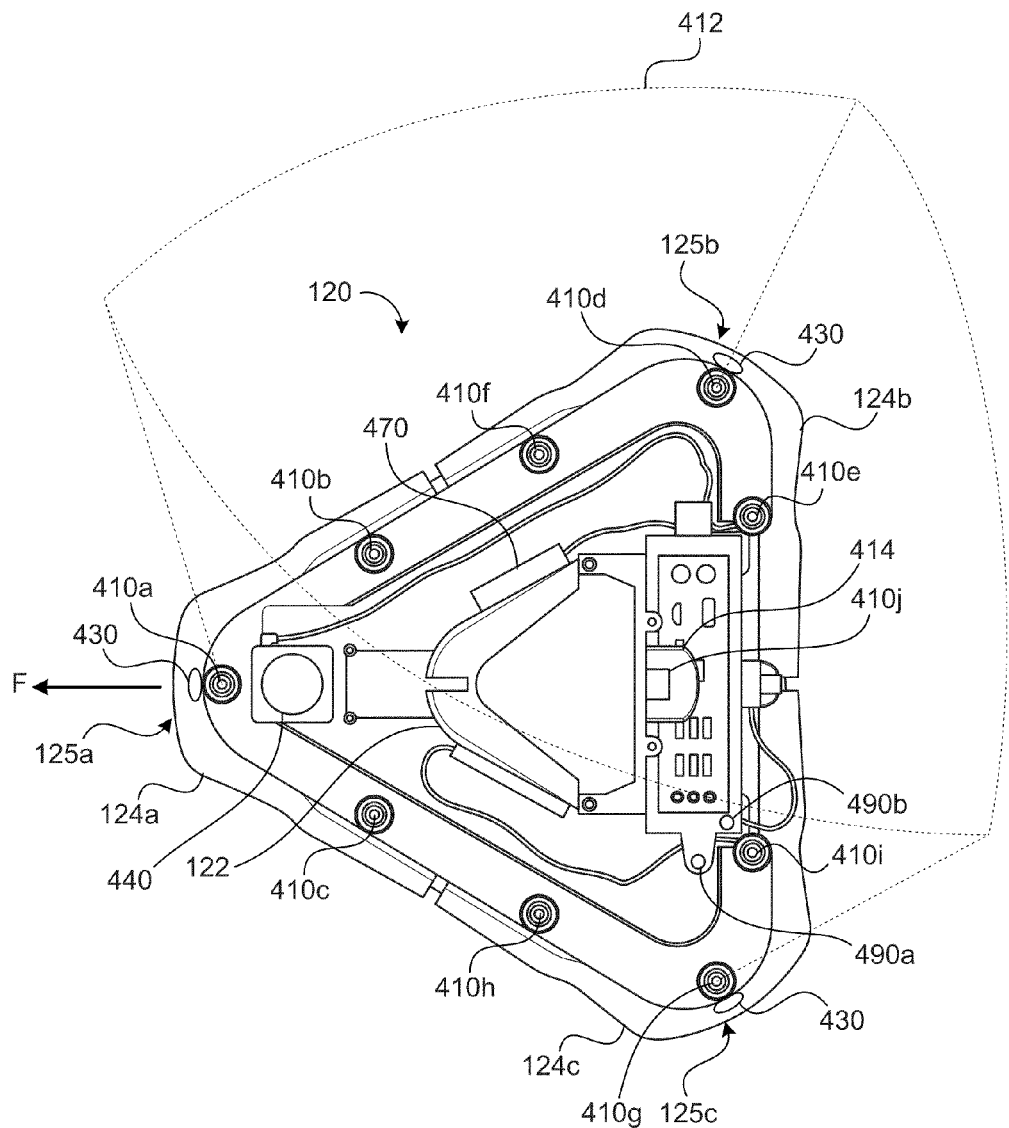
FIG. 4C is a top view of the base shown in FIG. 4A.

In the example shown in FIGS. 4A-4C, the robot 100 includes an array of sonar-type proximity sensors 410 disposed (e.g., substantially equidistant) around the base body 120 and arranged with an upward field of view. First, second, and third sonar proximity sensors 410a, 410b, 410c are disposed on or near the first (forward) base body portion 124a, with at least one of the sonar proximity sensors near a radially outer-most edge 125a of the first base body 124a. Fourth, fifth, and sixth sonar proximity sensors 410d, 410e, 410f are disposed on or near the second (right) base body portion 124b, with at least one of the sonar proximity sensors near a radially outer-most edge 125b of the second base body 124b. Seventh, eighth, and ninth sonar proximity sensors 410g, 410h, 410i are disposed on or near the third (right) base body portion 124c, with at least one of the sonar proximity sensors near a radially outer-most edge 125c of the third base body 124c. This configuration provides at least three zones of detection.

In some examples, the set of sonar proximity sensors 410 (e.g., 410a-410i) disposed around the base body 120 are arranged to point upward (e.g., substantially in the Z direction) and optionally angled outward away from the Z axis, thus creating a detection curtain 412 around the robot 100. Each sonar proximity sensor 410a-410i may have a shroud or emission guide 414 that guides the sonar emission upward or at least not toward the other portions of the robot body 110 (e.g., so as not to detect movement of the robot body 110 with respect to itself). The emission guide 414 may define a shell or half shell shape. In the example shown, the base body 120 extends laterally beyond the leg 130, and the sonar proximity sensors 410 (e.g., 410a-410i) are disposed on the base body 120 (e.g., substantially along a perimeter of the base body 120) around the leg 130. Moreover, the upward pointing sonar proximity sensors 410 are spaced to create a continuous or substantially continuous sonar detection curtain 412 around the leg 130. The sonar detection curtain 412 can be used to detect obstacles having elevated lateral protruding portions, such as table tops, shelves, etc.

The upward looking sonar proximity sensors 410 provide the ability to see objects that are primarily in the horizontal plane, such as table tops. These objects, due to their aspect ratio, may be missed by other sensors of the sensor system, such as the laser scanner 440 or imaging sensors 450, and as such, can pose a problem to the robot 100.

The upward viewing sonar proximity sensors 410 arranged around the perimeter of the base 120 provide a means for seeing or detecting those type of objects/obstacles. Moreover, the sonar proximity sensors 410 can be placed around the widest points of the base perimeter and angled slightly outwards, so as not to be occluded or obstructed by the torso 140 or head 160 of the robot 100, thus not resulting in false positives for sensing portions of the robot 100 itself. In some implementations, the sonar proximity sensors 410 are arranged (upward and outward) to leave a volume about the torso 140 outside of a field of view of the sonar proximity sensors 410 and thus free to receive mounted payloads or accessories, such as the basket 340. The sonar proximity sensors 410 can be recessed into the base body 124 to provide visual concealment and no external features to snag on or hit obstacles.

The sensor system 400 may include or more sonar proximity sensors 410 (e.g., a rear proximity sensor 410j) directed rearward (e.g., opposite to the forward drive direction F) for detecting obstacles while backing up. The rear sonar proximity sensor 410j may include an emission guide 414 to direct its sonar detection field 412.

Moreover, the rear sonar proximity sensor 410j can be used for ranging to determine a distance between the robot 100 and a detected object in the field of view of the rear sonar proximity sensor 410j (e.g., as "back-up alert"). In some examples, the rear sonar proximity sensor 410j is mounted recessed within the base body 120 so as to not provide any visual or functional irregularity in the housing form.

Referring to FIGS. 3 and 4B, in some implementations, the robot 100 includes cliff proximity sensors 420 arranged near or about the drive wheels 210a, 210b, 210c, so as to allow cliff detection before the drive wheels 210a, 210b, 210c encounter a cliff (e.g., stairs). For example, a cliff proximity sensors 420 can be located at or near each of the radially outer-most edges 125a-c of the base bodies 124a-c and in locations therebetween. In some cases, cliff sensing is implemented using infrared (IR) proximity or actual range sensing, using an infrared emitter 422 and an infrared detector 424 angled toward each other so as to have an overlapping emission and detection fields, and hence a detection zone, at a location where a floor should be expected. IR proximity sensing can have a relatively narrow field of view, may depend on surface albedo for reliability, and can have varying range accuracy from surface to surface. As a result, multiple discrete sensors can be placed about the perimeter of the robot 100 to adequately detect cliffs from multiple points on the robot 100. Moreover, IR proximity based sensors typically cannot discriminate between a cliff and a safe event, such as just after the robot 100 climbs a threshold.

The cliff proximity sensors 420 can detect when the robot 100 has encountered a falling edge of the floor, such as when it encounters a set of stairs. The controller 500 (executing a control system) may execute behaviors that cause the robot 100 to take an action, such as changing its direction of travel, when an edge is detected. In some implementations, the sensor system 400 includes one or more secondary cliff sensors (e.g., other sensors configured for cliff sensing and optionally other types of sensing). The cliff detecting proximity sensors 420 can be arranged to provide early detection of cliffs, provide data for discriminating between actual cliffs and safe events (such as climbing over thresholds), and be positioned down and out so that their field of view includes at least part of the robot body 110 and an area away from the robot body 110. In some implementations, the controller 500 executes cliff detection routine that identifies and detects an edge of the supporting work surface (e.g., floor), an increase in distance past the edge of the work surface, and/or an increase in distance between the robot body 110 and the work surface. This implementation allows: 1) early detection of potential cliffs (which may allow faster mobility speeds in unknown environments); 2) increased reliability of autonomous mobility since the controller 500 receives cliff imaging information from the cliff detecting proximity sensors 420 to know if a cliff event is truly unsafe or if it can be safely traversed (e.g., such as climbing up and over a threshold); 3) a reduction in false positives of cliffs (e.g., due to the use of edge detection versus the multiple discrete IR proximity sensors with a narrow field of view). Additional sensors arranged as "wheel drop" sensors can be used for redundancy and for detecting situations where a range-sensing camera cannot reliably detect a certain type of cliff.

Threshold and step detection allows the robot 100 to effectively plan for either traversing a climb-able threshold or avoiding a step that is too tall. This can be the same for random objects on the work surface that the robot 100 may or may not be able to safely traverse. For those obstacles or thresholds that the robot 100 determines it can climb, knowing their heights allows the robot 100 to slow down appropriately, if deemed needed, to allow for a smooth transition in order to maximize smoothness and minimize any instability due to sudden accelerations. In some implementations, threshold and step detection is based on object height above the work surface along with geometry recognition (e.g., discerning between a threshold or an electrical cable versus a blob, such as a sock). Thresholds may be recognized by edge detection. The controller 500 may receive imaging data from the cliff detecting proximity sensors 420 (or another imaging sensor on the robot 100), execute an edge detection routine, and issue a drive command based on results of the edge detection routine. The controller 500 may use pattern recognition to identify objects as well. Threshold detection allows the robot 100 to change its orientation with respect to the threshold to maximize smooth step climbing ability.

The proximity sensors 410, 420 may function alone, or as an alternative, may function in combination with one or more contact sensors 430 (e.g., bump switches) for redundancy. For example, one or more contact or bump sensors 430 on the robot body 110 can detect if the robot 100 physically encounters an obstacle. Such sensors may use a physical property such as capacitance or physical displacement within the robot 100 to determine when it has encountered an obstacle. In some implementations, each base body portion 124a, 124b, 124c of the base 120 has an associated contact sensor 430 (e.g., capacitive sensor, read switch, etc.) that detects movement of the corresponding base body portion 124a, 124b, 124c with respect to the base chassis 122 (see e.g., FIG. 4A). For example, each base body 124a-c may move radially with respect to the Z axis of the base chassis 122, so as to provide 3-way bump detection.

Referring again to FIGS. 1-4C, 11 and 12, in some implementations, the sensor system 400 includes a laser scanner 440 mounted on a forward portion of the robot body 110 and in communication with the controller 500. In the examples shown, the laser scanner 440 is mounted on the base body 120 facing forward (e.g., having a field of view along the forward drive direction F) on or above the first base body 124a (e.g., to have maximum imaging coverage along the drive direction F of the robot). Moreover, the placement of the laser scanner on or near the front tip of the triangular base 120 means that the external angle of the robotic base (e.g., 300 degrees) is greater than a field of view 442 of the laser scanner 440 (e.g., ~285 degrees), thus preventing the base 120 from occluding or obstructing the detection field of view 442 of the laser scanner 440. The laser scanner 440 can be mounted recessed within the base body 124 as much as possible without occluding its fields of view, to minimize any portion of the laser scanner sticking out past the base body 124 (e.g., for aesthetics and to minimize snagging on obstacles).

The laser scanner 440 scans an area about the robot 100 and the controller 500, using signals received from the laser scanner 440, creates an environment map or object map of the scanned area. The controller 500 may use the object map for navigation, obstacle detection, and obstacle avoidance. Moreover, the controller 500 may use sensory inputs from other sensors of the sensor system 400 for creating object map and/or for navigation.

In some examples, the laser scanner 440 is a scanning LIDAR, which may use a laser that quickly scans an area in one dimension, as a "main" scan line, and a time-of-flight imaging element that uses a phase difference or similar technique to assign a depth to each pixel generated in the line (returning a two dimensional depth line in the plane of scanning) In order to generate a three dimensional map, the LIDAR can perform an "auxiliary" scan in a second direction (for example, by "nodding" the scanner). This mechanical scanning technique can be complemented, if not supplemented, by technologies such as the "Flash" LIDAR/LADAR and "Swiss Ranger" type focal plane imaging element sensors, techniques which use semiconductor stacks to permit time of flight calculations for a full 2-D matrix of pixels to provide a depth at each pixel, or even a series of depths at each pixel (with an encoded illuminator or illuminating laser).

The sensor system 400 may include one or more three-dimensional (3-D) image sensors 450 in communication with the controller 500. If the 3-D image sensor 450 has a limited field of view, the controller 500 or the sensor system 400 can actuate the 3-D image sensor 450a in a side-to-side scanning manner to create a relatively wider field of view to perform robust ODOA. Referring to FIGS. 1-3 and 12, in some implementations, the robot 100 includes a scanning 3-D image sensor 450a mounted on a forward portion of the robot body 110 with a field of view along the forward drive direction F (e.g., to have maximum imaging coverage along the drive direction F of the robot). The scanning 3-D image sensor 450a can be used primarily for obstacle detection/obstacle avoidance (ODOA). In the example shown, the scanning 3-D image sensor 450a is mounted on the torso 140 underneath the shoulder 142 or on the bottom surface 144 and recessed within the torso 140 (e.g., flush or past the bottom surface 144), as shown in FIG. 3, for example, to prevent user contact with the scanning 3-D image sensor 450a. The scanning 3-D image sensor 450 can be arranged to aim substantially downward and away from the robot body 110, so as to have a downward field of view 452 in front of the robot 100 for obstacle detection and obstacle avoidance (ODOA) (e.g., with obstruction by the base 120 or other portions of the robot body 110). Placement of the scanning 3-D image sensor 450a on or near a forward edge of the torso 140 allows the field of view of the 3-D image sensor 450 (e.g., ~285 degrees) to be less than an external surface angle of the torso 140 (e.g., 300 degrees) with respect to the 3-D image sensor 450, thus preventing the torso 140 from occluding or obstructing the detection field of view 452 of the scanning 3-D image sensor 450a. Moreover, the scanning 3-D image sensor 450a (and associated actuator) can be mounted recessed within the torso 140 as much as possible without occluding its fields of view (e.g., also for aesthetics and to minimize snagging on obstacles). The distracting scanning motion of the scanning 3-D image sensor 450a is not visible to a user, creating a less distracting interaction experience. Unlike a protruding sensor or feature, the recessed scanning 3-D image sensor 450a will not tend to have unintended interactions with the environment (snagging on people, obstacles, etc.), especially when moving or scanning, as virtually no moving part extends beyond the envelope of the torso 140.

In some implementations, the sensor system 400 includes additional 3-D image sensors 450 disposed on the base body 120, the leg 130, the neck 150, and/or the head 160. In the example shown in FIG. 1, the robot 100 includes 3-D image sensors 450 on the base body 120, the torso 140, and the head 160. In the example shown in FIG. 2, the robot 100 includes 3-D image sensors 450 on the base body 120, the torso 140, and the head 160. In the example shown in FIG. 11, the robot 100 includes 3-D image sensors 450 on the leg 130, the torso 140, and the neck 150. Other configurations are possible as well. One 3-D image sensor 450 (e.g., on the neck 150 and over the head 160) can be used for people recognition, gesture recognition, and/or videoconferencing, while another 3-D image sensor 450 (e.g., on the base 120 and/or the leg 130) can be used for navigation and/or obstacle detection and obstacle avoidance.

A forward facing 3-D image sensor 450 disposed on the neck 150 and/or the head 160 can be used for person, face, and/or gesture recognition of people about the robot 100. For example, using signal inputs from the 3-D image sensor 450 on the head 160, the controller 500 may recognize a user by creating a three-dimensional map of the viewed/captured user's face and comparing the created three-dimensional map with known 3-D images of people's faces and determining a match with one of the known 3-D facial images. Facial recognition may be used for validating users as allowable users of the robot 100. Moreover, one or more of the 3-D image sensors 450 can be used for determining gestures of person viewed by the robot 100, and optionally reacting based on the determined gesture(s) (e.g., hand pointing, waving, and or hand signals). For example, the controller 500 may issue a drive command in response to a recognized hand point in a particular direction.

The 3-D image sensors 450 may be capable of producing the following types of data: (i) a depth map, (ii) a reflectivity based intensity image, and/or (iii) a regular intensity image. The 3-D image sensors 450 may obtain such data by image pattern matching, measuring the flight time and/or phase delay shift for light emitted from a source and reflected off of a target.

In some implementations, reasoning or control software, executable on a processor (e.g., of the robot controller 500), uses a combination of algorithms executed using various data types generated by the sensor system 400. The reasoning software processes the data collected from the sensor system 400 and outputs data for making navigational decisions on where the robot 100 can move without colliding with an obstacle, for example. By accumulating imaging data over time of the robot's surroundings, the reasoning software can in turn apply effective methods to selected segments of the sensed image(s) to improve depth measurements of the 3-D image sensors 450. This may include using appropriate temporal and spatial averaging techniques.

The reliability of executing robot collision free moves may be based on: (i) a confidence level built by high level reasoning over time and (ii) a depth-perceptive sensor that accumulates three major types of data for analysis—(a) a depth image, (b) an active illumination image and (c) an ambient illumination image. Algorithms cognizant of the different types of data can be executed on each of the images obtained by the depth-perceptive imaging sensor 450. The aggregate data may improve the confidence level a compared to a system using only one of the kinds of data.

The 3-D image sensors 450 may obtain images containing depth and brightness data from a scene about the robot 100 (e.g., a sensor view portion of a room or work area) that contains one or more objects. The controller 500 may be configured to determine occupancy data for the object based on the captured reflected light from the scene. Moreover, the controller 500, in some examples, issues a drive command to the drive system 200 based at least in part on the occupancy data to circumnavigate obstacles (i.e., the object in the scene). The 3-D image sensors 450 may repeatedly capture scene depth images for real-time decision making by the controller 500 to navigate the robot 100 about the scene without colliding into any objects in the scene. For example, the speed or frequency in which the depth image data is obtained by the 3-D image sensors 450 may be controlled by a shutter speed of the 3-D image sensors 450. In addition, the controller 500 may receive an event trigger (e.g., from another sensor component of the sensor system 400, such as proximity sensor 410, 420, notifying the controller 500 of a nearby object or hazard. The controller 500, in response to the event trigger, can cause the 3-D image sensors 450 to increase a frequency at which depth images are captured and occupancy information is obtained.

In some implementations, the robot includes a sonar scanner 460 for acoustic imaging of an area surrounding the robot 100. In the examples shown in FIGS. 1 and 3, the sonar scanner 460 is disposed on a forward portion of the base body 120.

Figure 12:
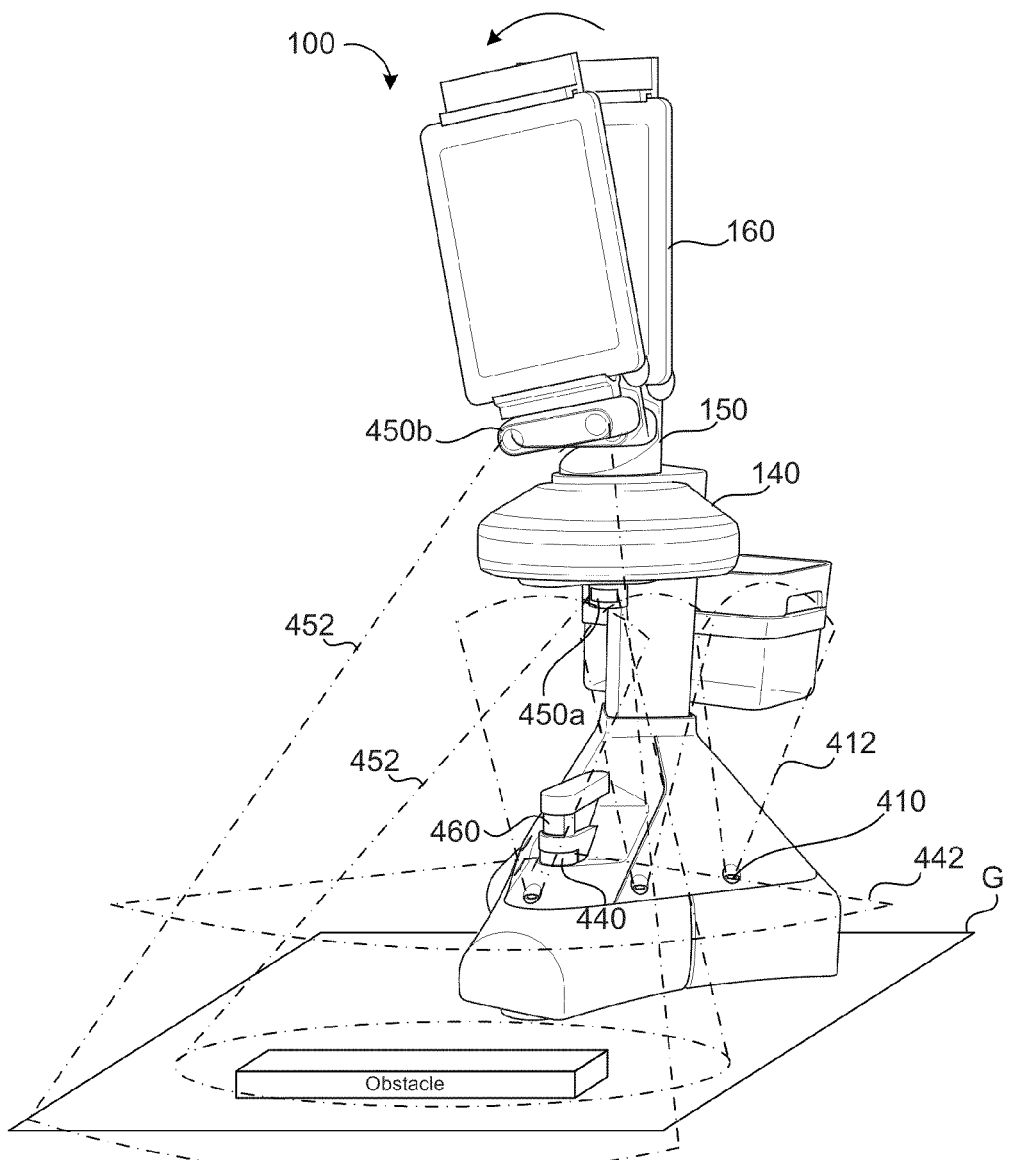
FIG. 12 is a perspective view of an exemplary mobile human interface robot having multiple sensors pointed toward the ground.

Referring to FIGS. 1, 3B and 12, in some implementations, the robot 100 uses the laser scanner or laser range finder 440 for redundant sensing, as well as a rear-facing sonar proximity sensor 410j for safety, both of which are oriented parallel to the ground G. The robot 100 may include first and second 3-D image sensors 450a, 450b (depth cameras) to provide robust sensing of the environment around the robot 100. The first 3-D image sensor 450a is mounted on the torso 140 and pointed downward at a fixed angle to the ground G. By angling the first 3-D image sensor 450a downward, the robot 100 receives dense sensor coverage in an area immediately forward or adjacent to the robot 100, which is relevant for short-term travel of the robot 100 in the forward direction. The rear-facing sonar 410j provides object detection when the robot travels backward. If backward travel is typical for the robot 100, the robot 100 may include a third 3D image sensor 450 facing downward and backward to provide dense sensor coverage in an area immediately rearward or adjacent to the robot 100.

The second 3-D image sensor 450b is mounted on the head 160, which can pan and tilt via the neck 150. The second 3-D image sensor 450b can be useful for remote driving since it allows a human operator to see where the robot 100 is going. The neck 150 enables the operator tilt and/or pan the second 3-D image sensor 450b to see both close and distant objects. Panning the second 3-D image sensor 450b increases an associated horizontal field of view. During fast travel, the robot 100 may tilt the second 3-D image sensor 450b downward slightly to increase a total or combined field of view of both 3-D image sensors 450a, 450b, and to give sufficient time for the robot 100 to avoid an obstacle (since higher speeds generally mean less time to react to obstacles). At slower speeds, the robot 100 may tilt the second 3-D image sensor 450b upward or substantially parallel to the ground G to track a person that the robot 100 is meant to follow. Moreover, while driving at relatively low speeds, the robot 100 can pan the second 3-D image sensor 450b to increase its field of view around the robot 100. The first 3-D image sensor 450a can stay fixed (e.g., not moved with respect to the base 120) when the robot is driving to expand the robot's perceptual range.

In some implementations, at least one of 3-D image sensors 450 can be a volumetric point cloud imaging device (such as a speckle or time-of-flight camera) positioned on the robot 100 at a height of greater than 1 or 2 feet above the ground (or at a height of about 1 or 2 feet above the ground) and directed to be capable of obtaining a point cloud from a volume of space including a floor plane in a direction of movement of the robot (via the omni-directional drive system 200). In the examples shown in FIGS. 1 and 3, the first 3-D image sensor 450a can be positioned on the base 120 at height of greater than 1 or 2 feet above the ground and aimed along the forward drive direction F to capture images (e.g., volumetric point cloud) of a volume including the floor while driving (e.g., for obstacle detection and obstacle avoidance). The second 3-D image sensor 450b is shown mounted on the head 160 (e.g., at a height greater than about 3 or 4 feet above the ground), so as to be capable of obtaining skeletal recognition and definition point clouds from a volume of space adjacent the robot 100. The controller 500 may execute skeletal/digital recognition software to analyze data of the captured volumetric point clouds.

Referring again to FIGS. 2 and 4A-4C, the sensor system 400 may include an inertial measurement unit (IMU) 470 in communication with the controller 500 to measure and monitor a moment of inertia of the robot 100 with respect to the overall center of gravity $CG_R$ of the robot 100.

The controller 500 may monitor any deviation in feedback from the IMU 470 from a threshold signal corresponding to normal unencumbered operation. For example, if the robot begins to pitch away from an upright position, it may be "clothes lined" or otherwise impeded, or someone may have suddenly added a heavy payload. In these instances, it may be necessary to take urgent action (including, but not limited to, evasive maneuvers, recalibration, and/or issuing an audio/visual warning) in order to assure safe operation of the robot 100.

Since robot 100 may operate in a human environment, it may interact with humans and operate in spaces designed for humans (and without regard for robot constraints). The robot 100 can limit its drive speeds and accelerations when in a congested, constrained, or highly dynamic environment, such as at a cocktail party or busy hospital. However, the robot 100 may encounter situations where it is safe to drive relatively fast, as in a long empty corridor, but yet be able to decelerate suddenly, as when something crosses the robots' motion path.

When accelerating from a stop, the controller 500 may take into account a moment of inertia of the robot 100 from its overall center of gravity $CG_R$ to prevent robot tipping. The controller 500 may use a model of its pose, including its current moment of inertia. When payloads are supported, the controller 500 may measure a load impact on the overall center of gravity $CG_R$ and monitor movement of the robot moment of inertia. For example, the torso 140 and/or neck 150 may include strain gauges to measure strain. If this is not possible, the controller 500 may apply a test torque command to the drive wheels 210 and measure actual linear and angular acceleration of the robot using the IMU 470, in order to experimentally determine safe limits.

During a sudden deceleration, a commanded load on the second and third drive wheels 210b, 210c (the rear wheels) is reduced, while the first drive wheel 210a (the front wheel) slips in the forward drive direction and supports the robot 100. If the loading of the second and third drive wheels 210b, 210c (the rear wheels) is asymmetrical, the robot 100 may "yaw" which will reduce dynamic stability. The IMU 470 (e.g., a gyro) can be used to detect this yaw and command the second and third drive wheels 210b, 210c to reorient the robot 100.

Referring to FIGS. 3-4C and 6A, in some implementations, the robot 100 includes multiple antennas. In the examples shown, the robot 100 includes a first antenna 490a and a second antenna 490b both disposed on the base 120 (although the antennas may be disposed at any other part of the robot 100, such as the leg 130, the torso 140, the neck 150, and/or the head 160). The use of multiple antennas provide robust signal reception and transmission. The use of multiple antennas provides the robot 100 with multiple-input and multiple-output, or MIMO, which is the use of multiple antennas for a transmitter and/or a receiver to improve communication performance. MIMO offers significant increases in data throughput and link range without additional bandwidth or transmit power. It achieves this by higher spectral efficiency (more bits per second per hertz of bandwidth) and link reliability or diversity (reduced fading). Because of these properties, MIMO is an important part of modern wireless communication standards such as IEEE 802.11n (Wifi), 4G, 3GPP Long Term Evolution, WiMAX and HSPA+. Moreover, the robot 100 can act as a Wi-Fi bridge, hub or hotspot for other electronic devices nearby. The mobility and use of MIMO of the robot 100 can allow the robot to come a relatively very reliable Wi-Fi bridge.

MIMO can be sub-divided into three main categories, pre-coding, spatial multiplexing or SM, and diversity coding. Pre-coding is a type of multi-stream beam forming and is considered to be all spatial processing that occurs at the transmitter. In (single-layer) beam forming, the same signal is emitted from each of the transmit antennas with appropriate phase (and sometimes gain) weighting such that the signal power is maximized at the receiver input. The benefits of beam forming are to increase the received signal gain, by making signals emitted from different antennas add up constructively, and to reduce the multipath fading effect. In the absence of scattering, beam forming can result in a well defined directional pattern. When the receiver has multiple antennas, the transmit beam forming cannot simultaneously maximize the signal level at all of the receive antennas, and pre-coding with multiple streams can be used. Pre-coding may require knowledge of channel state information (CSI) at the transmitter.

Spatial multiplexing requires a MIMO antenna configuration. In spatial multiplexing, a high rate signal is split into multiple lower rate streams and each stream is transmitted from a different transmit antenna in the same frequency channel. If these signals arrive at the receiver antenna array with sufficiently different spatial signatures, the receiver can separate these streams into (almost) parallel channels. Spatial multiplexing is a very powerful technique for increasing channel capacity at higher signal-to-noise ratios (SNR). The maximum number of spatial streams is limited by the lesser in the number of antennas at the transmitter or receiver. Spatial multiplexing can be used with or without transmit channel knowledge. Spatial multiplexing can also be used for simultaneous transmission to multiple receivers, known as space-division multiple access. By scheduling receivers with different spatial signatures, good separability can be assured.

Diversity Coding techniques can be used when there is no channel knowledge at the transmitter. In diversity methods, a single stream (unlike multiple streams in spatial multiplexing) is transmitted, but the signal is coded using techniques called space-time coding. The signal is emitted from each of the transmit antennas with full or near orthogonal coding. Diversity coding exploits the independent fading in the multiple antenna links to enhance signal diversity. Because there is no channel knowledge, there is no beam forming or array gain from diversity coding. Spatial multiplexing can also be combined with pre-coding when the channel is known at the transmitter or combined with diversity coding when decoding reliability is in trade-off.

In some implementations, the robot 100 includes a third antenna 490c and/or a fourth antenna 490d and the torso 140 and/or the head 160, respectively (see e.g., FIG. 3). In such instances, the controller 500 can determine an antenna arrangement (e.g., by moving the antennas 490a-d, as by raising or lowering the torso 140 and/or rotating and/or tilting the head 160) that achieves a threshold signal level for robust communication. For example, the controller 500 can issue a command to elevate the third and fourth antennas 490c, 490d by raising a height of the torso 140. Moreover, the controller 500 can issue a command to rotate and/or the head 160 to further orient the fourth antenna 490d with respect to the other antennas 490a-c.

Figure 13:
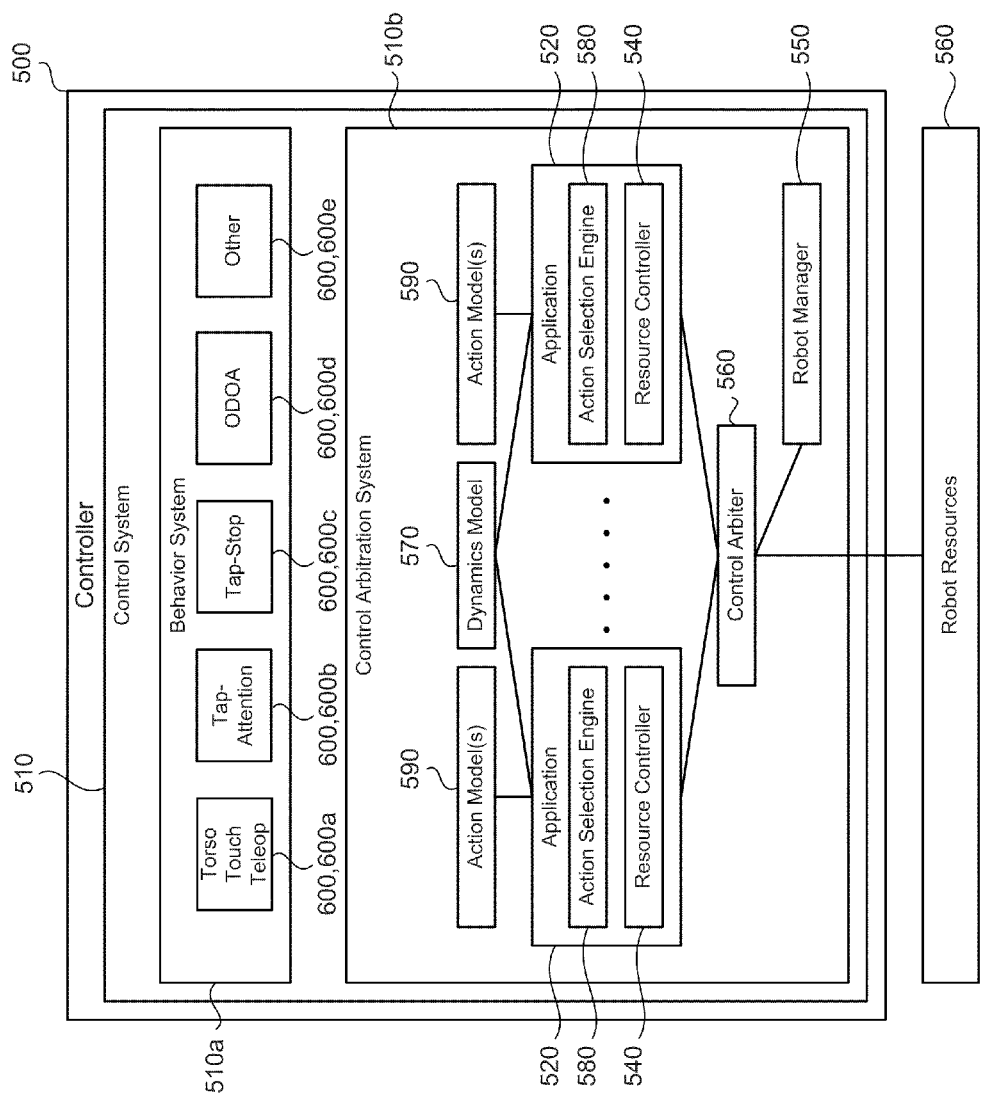
FIG. 13 is a schematic view of an exemplary control system executed by a controller of a mobile human interface robot.

Referring to FIG. 13, in some implementations, the controller 500 executes a control system 510, which includes a control arbitration system 510a and a behavior system 510b in communication with each other. The control arbitration system 510a allows applications 520 to be dynamically added and removed from the control system 510, and facilitates allowing applications 520 to each control the robot 100 without needing to know about any other applications 520. In other words, the control arbitration system 510a provides a simple prioritized control mechanism between applications 520 and resources 530 of the robot 100. The resources 530 may include the drive system 200, the sensor system 400, and/or any payloads or controllable devices in communication with the controller 500.

The applications 520 can be stored in memory of or communicated to the robot 100, to run concurrently on (e.g., a processor) and simultaneously control the robot 100. The applications 520 may access behaviors 600 of the behavior system 510b. The independently deployed applications 520 are combined dynamically at runtime and to share robot resources 530 (e.g., drive system 200, arm(s), head(s), etc.) of the robot 100. A low-level policy is implemented for dynamically sharing the robot resources 530 among the applications 520 at run-time. The policy determines which application 520 has control of the robot resources 530 required by that application 520 (e.g. a priority hierarchy among the applications 520). Applications 520 can start and stop dynamically and run completely independently of each other. The control system 510 also allows for complex behaviors 600 which can be combined together to assist each other.

The control arbitration system 510a includes one or more resource controllers 540, a robot manager 550, and one or more control arbiters 560. These components do not need to be in a common process or computer, and do not need to be started in any particular order. The resource controller 540 component provides an interface to the control arbitration system 510a for applications 520. There is an instance of this component for every application 520. The resource controller 540 abstracts and encapsulates away the complexities of authentication, distributed resource control arbiters, command buffering, and the like. The robot manager 550 coordinates the prioritization of applications 520, by controlling which application 520 has exclusive control of any of the robot resources 530 at any particular time. Since this is the central coordinator of information, there is only one instance of the robot manager 550 per robot. The robot manager 550 implements a priority policy, which has a linear prioritized order of the resource controllers 540, and keeps track of the resource control arbiters 560 that provide hardware control. The control arbiter 560 receives the commands from every application 520 and generates a single command based on the applications' priorities and publishes it for its associated resources 530. The control arbiter 560 also receives state feedback from its associated resources 530 and sends it back up to the applications 520. The robot resources 530 may be a network of functional modules (e.g. actuators, drive systems, and groups thereof) with one or more hardware controllers. The commands of the control arbiter 560 are specific to the resource 530 to carry out specific actions.

A dynamics model 570 executable on the controller 500 can be configured to compute the center for gravity (CG), moments of inertia, and cross products of inertia of various portions of the robot 100 for the assessing a current robot state. The dynamics model 570 may also model the shapes, weight, and/or moments of inertia of these components. In some examples, the dynamics model 570 communicates with the inertial moment unit 470 (IMU) or portions of one (e.g., accelerometers and/or gyros) disposed on the robot 100 and in communication with the controller 500 for calculating the various center of gravities of the robot 100. The dynamics model 570 can be used by the controller 500, along with other programs 520 or behaviors 600 to determine operating envelopes of the robot 100 and its components.

Each application 520 has an action selection engine 580 and a resource controller 540, one or more behaviors 600 connected to the action selection engine 580, and one or more action models 590 connected to action selection engine 580. The behavior system 510b provides predictive modeling and allows the behaviors 600 to collaboratively decide on the robot's actions by evaluating possible outcomes of robot actions. In some examples, a behavior 600 is a plug-in component that provides a hierarchical, state-full evaluation function that couples sensory feedback from multiple sources with a-priori limits and information into evaluation feedback on the allowable actions of the robot. Since the behaviors 600 are pluggable into the application 520 (e.g., residing inside or outside of the application 520), they can be removed and added without having to modify the application 520 or any other part of the control system 510. Each behavior 600 is a standalone policy. To make behaviors 600 more powerful, it is possible to attach the output of multiple behaviors 600 together into the input of another so that you can have complex combination functions. The behaviors 600 are intended to implement manageable portions of the total cognizance of the robot 100.

The action selection engine 580 is the coordinating element of the control system 510 and runs a fast, optimized action selection cycle (prediction/correction cycle) searching for the best action given the inputs of all the behaviors 600. The action selection engine 580 has three phases: nomination, action selection search, and completion. In the nomination phase, each behavior 600 is notified that the action selection cycle has started and is provided with the cycle start time, the current state, and limits of the robot actuator space. Based on internal policy or external input, each behavior 600 decides whether or not it wants to participate in this action selection cycle. During this phase, a list of active behavior primitives is generated whose input will affect the selection of the commands to be executed on the robot 100.

In the action selection search phase, the action selection engine 580 generates feasible outcomes from the space of available actions, also referred to as the action space. The action selection engine 580 uses the action models 590 to provide a pool of feasible commands (within limits) and corresponding outcomes as a result of simulating the action of each command at different time steps with a time horizon in the future. The action selection engine 580 calculates a preferred outcome, based on the outcome evaluations of the behaviors 600, and sends the corresponding command to the control arbitration system 510a and notifies the action model 590 of the chosen command as feedback.

In the completion phase, the commands that correspond to a collaborative best scored outcome are combined together as an overall command, which is presented to the resource controller 540 for execution on the robot resources 530. The best outcome is provided as feedback to the active behaviors 600, to be used in future evaluation cycles.

Received sensor signals from the sensor system 400 can cause interactions with one or more behaviors 600 to execute actions. For example, using the control system 510, the controller 500 selects an action (or move command) for each robotic component (e.g., motor or actuator) from a corresponding action space (e.g., a collection of possible actions or moves for that particular component) to effectuate a coordinated move of each robotic component in an efficient manner that avoids collisions with itself and any objects about the robot 100, which the robot 100 is aware of. The controller 500 can issue a coordinated command over robot network, such as an EtherIO network, as described in U.S. Ser. No. 61/305,069, filed Feb. 16, 2010, the entire contents of which are hereby incorporated by reference.

The control system 510 may provide adaptive speed/acceleration of the drive system 200 (e.g., via one or more behaviors 600) in order to maximize stability of the robot 100 in different configurations/positions as the robot 100 maneuvers about an area.

In some implementations, the controller 500 issues commands to the drive system 200 that propels the robot 100 according to a heading setting and a speed setting. One or behaviors 600 may use signals received from the sensor system 400 to evaluate predicted outcomes of feasible commands, one of which may be elected for execution (alone or in combination with other commands as an overall robot command) to deal with obstacles. For example, signals from the proximity sensors 410 may cause the control system 510 to change the commanded speed or heading of the robot 100. For instance, a signal from a proximity sensor 410 due to a nearby wall may result in the control system 510 issuing a command to slow down. In another instance, a collision signal from the contact sensor(s) due to an encounter with a chair may cause the control system 510 to issue a command to change heading. In other instances, the speed setting of the robot 100 may not be reduced in response to the contact sensor; and/or the heading setting of the robot 100 may not be altered in response to the proximity sensor 410.

The behavior system 510b may include a speed behavior 600 (e.g., a behavioral routine executable on a processor) configured to adjust the speed setting of the robot 100 and a heading behavior 600 configured to alter the heading setting of the robot 100. The speed and heading behaviors 600 may be configured to execute concurrently and mutually independently. For example, the speed behavior 600 may be configured to poll one of the sensors (e.g., the set(s) of proximity sensors 410, 420), and the heading behavior 600 may be configured to poll another sensor (e.g., the kinetic bump sensor).

Figure 14:
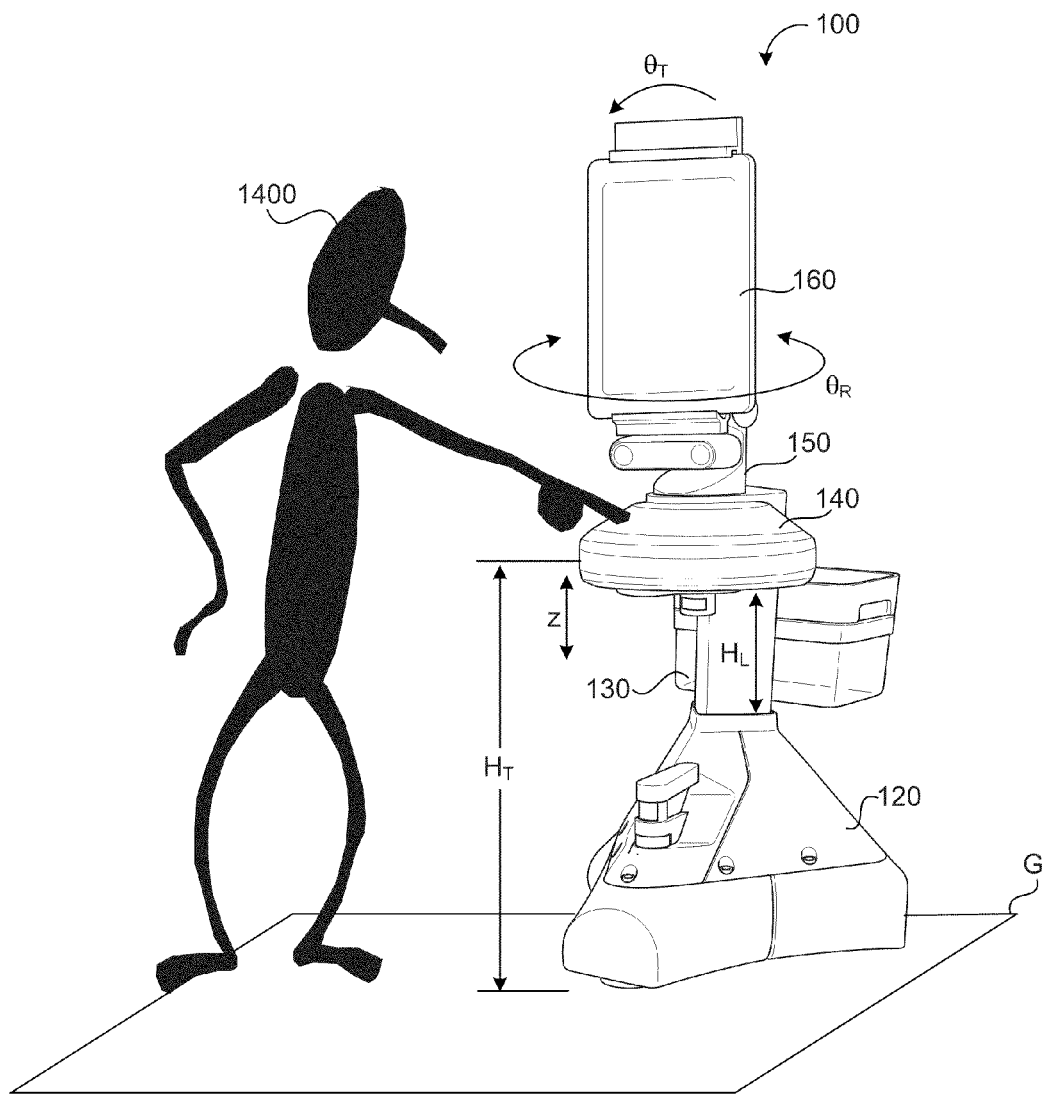
FIG. 14 is a perspective view of an exemplary mobile human interface robot receiving a human touch command.

Referring to FIGS. 13 and 14, the behavior system 510b may include a torso touch teleoperation behavior 600a (e.g., a behavioral routine executable on a processor) configured to react to a user 1400 touching the torso 140 for teleoperation (e.g., guiding the robot 100). The torso touch teleoperation behavior 600a may become active when the sensor system 400 detects that the torso has received contact (e.g., human contact) for at least a threshold time period (e.g., 0.25 seconds). For example, the motion and/or contact sensor 147t, 147b, 147f, 147r, 147r, 147l in communication with the controller 500 and associated with the corresponding top panel 145t, a bottom panel 145b, a front panel 145f, a back panel 145b, a right panel 145r and a left panel 145l of the torso body 145 can detect motion and/or contact with the respective panel, as shown in FIGS. 6B and 6C. Once active, the torso touch teleoperation behavior 600a receives a contact force direction (e.g., as sensed and computed from an ellipse location of the touch) and issues a velocity command to the drive system 200 in local X/Y coordinates (taking advantage of the holonomic mobility). Obstacle detection and obstacle avoidance behaviors may be turned off for while the torso touch teleoperation behavior 600a is active. If the sensed touch location, force, or direction changes, the torso touch teleoperation behavior 600a changes the velocity command to correspond with the sensed contact force direction. The torso touch teleoperation behavior 600a may execute a stop routine when the sensor system 400 no longer senses contact with the robot 100 for a threshold period of time (e.g., 2 seconds). The stop routine may cause the drive system 200 to stop driving after about 0.5 seconds if the sensor system 400 no longer senses contact with the robot 100 (e.g., with the torso 140). The torso touch teleoperation behavior 600a may provide a delay in stopping the robot 100 to allow moving the touch point without having to wait for a trigger period of time.

The torso touch teleoperation behavior 600a may issue assisted drive commands to the drive system 200 that allow the user to push the robot 100 while receiving drive assistance from the drive system 200 (e.g., partial velocity commands that by themselves cannot move the robot 100, but assist movement of the robot 100 by the user).

The torso touch teleoperation behavior 600a may receive sensor signals from the touch sensor system 480 (e.g., buttons, capacitive sensors, contact sensors, etc.), a portion of which may be disposed on the torso 140 (and elsewhere on the robot 100, such as the head 160). The torso touch teleoperation behavior 600a may position the torso 140 at a height $H_T$ of between 3 and 5 feet from the ground G, so as to place at least a portion of the touch sensor system 480 at an accessible height for a typical user.

In some implementations, the torso touch teleoperation behavior 600a recognizes user touching to place the robot 100 and particular pose. For example, when the user 1400 pushes down on the torso 140, the sensor system 400 detects the downward force on the torso 140 and sends corresponding signals to the controller 500. The torso touch teleoperation behavior 600a receives indication of the downward force on the torso 140 and causes the control system 510 to issue a command to decrease the length $H_L$ of the leg 130, thereby lowering the height $H_T$ of the torso 140. Similarly, when the user 1400 pushes/pulls up on the torso 140, the torso touch teleoperation behavior 600a receives indication of the upward force on the torso 140 from the sensor system 400 and causes the control system 510 to issue a command to increase the length $H_L$ of the leg 130, thereby increasing the height $H_T$ of the torso 140.

When the user 1400 pushes, pulls and/or rotates the head 160, the torso touch teleoperation behavior 600a may receive indication from the sensor system 400 (e.g., from strain gages/motion/contact sensors 165 on the neck 150) of the user action and may respond by causing the control system 510 to issue a command to move the head 160 accordingly and thereafter hold the pose.

In some implementations, the robot 100 provides passive resistance and/or active assistance to user manipulation of the robot 100. For example, the motors 138b, 152, 154 actuating the leg 130 and the neck 150 passive resistance and/or active assistance to user manipulation of the robot 100 to provide feedback to the user of the manipulation as well as assistance for moving relatively heavy components such as raising the torso 140. This allows the user to move various robotic components without having to bear the entire weight of the corresponding components.

The behavior system 510b may include a tap-attention behavior 600b (e.g., a behavioral routine executable on a processor) configured to focus attention of the robot 100 toward a user. The tap-attention behavior 600b may become active when the sensor system 400 detects that the torso 140 (or some other portion of the robot 100) has received contact (e.g., human contact) for less than a threshold time period (e.g., 0.25 seconds). Moreover, the tap-attention behavior 600b may only become active when the torso touch teleoperation behavior 600a is inactive. For example, a sensed touch on the torso 140 for 0.2 seconds will not trigger the torso touch teleoperation behavior 600a, but will trigger the tap-attention behavior 600b. The tap-attention behavior 600b may use a contact location on the torso 140 and cause the head 160 to tilt and/or pan (via actuation of the neck 150) to look at the user. A stop criteria for the behavior 600b can be reached when the head 160 reaches a position where it is looking in the direction of the touch location.

In some implementations, the behavior system 510b includes a tap-stop behavior 600c (e.g., a behavioral routine executable on a processor) configured to stop the drive system 200 from driving (e.g., bring the robot 100 to a stop). The tap-stop behavior 600c may become active when the sensor system 400 detects that the torso 140 has received contact (e.g., human contact) and issues a zero velocity drive command to the drive system 200, cancelling any previous drive commands. If the robot is driving and the user wants it to stop, the user can tap the torso 140 (or some other portion of the robot 100) or a touch sensor. In some examples, the tap-stop behavior 600c can only be activated if higher priority behaviors, such as the torso touch teleoperation behavior 600a and the tap-attention behavior 600b, are not active. The tap-stop behavior 600c may end with the sensor system 400 no longer detects touching on the torso 140 (or elsewhere on the robot 100).

In some implementations, the robot 100 includes a mediating security device 350 (FIG. 9), also referred to as a bridge, for allowing communication between a web pad 310 and the controller 500 (and/or other components of the robot 100). For example, the bridge 350 may convert communications of the web pad 310 from a web pad communication protocol to a robot communication protocol (e.g., Ethernet having a gigabit capacity). The bridge 350 may authenticate the web pad 310 and provided communication conversion between the web pad 310 and the controller 500. In some examples, the bridge 350 includes an authorization chip which authorizes/validates any communication traffic between the web pad 310 and the robot 100. The bridge 350 may notify the controller 500 when it has checked an authorized a web pad 310 trying to communicate with the robot 100. Moreover, after authorization, the bridge 350 notify the web pad 310 of the communication authorization. The bridge 350 may be disposed on the neck 150 or head (as shown in FIGS. 2 and 3) or elsewhere on the robot 100.

The Session Initiation Protocol (SIP) is an IETF-defined signaling protocol, widely used for controlling multimedia communication sessions such as voice and video calls over Internet Protocol (IP). The protocol can be used for creating, modifying and terminating two-party (unicast) or multiparty (multicast) sessions including one or several media streams. The modification can involve changing addresses or ports, inviting more participants, and adding or deleting media streams. Other feasible application examples include video conferencing, streaming multimedia distribution, instant messaging, presence information, file transfer, etc. Voice over Internet Protocol (Voice over IP, VoIP) is part of a family of methodologies, communication protocols, and transmission technologies for delivery of voice communications and multimedia sessions over Internet Protocol (IP) networks, such as the Internet. Other terms frequently encountered and often used synonymously with VoIP are IP telephony, Internet telephony, voice over broadband (VoBB), broadband telephony, and broadband phone.

Figure 15:
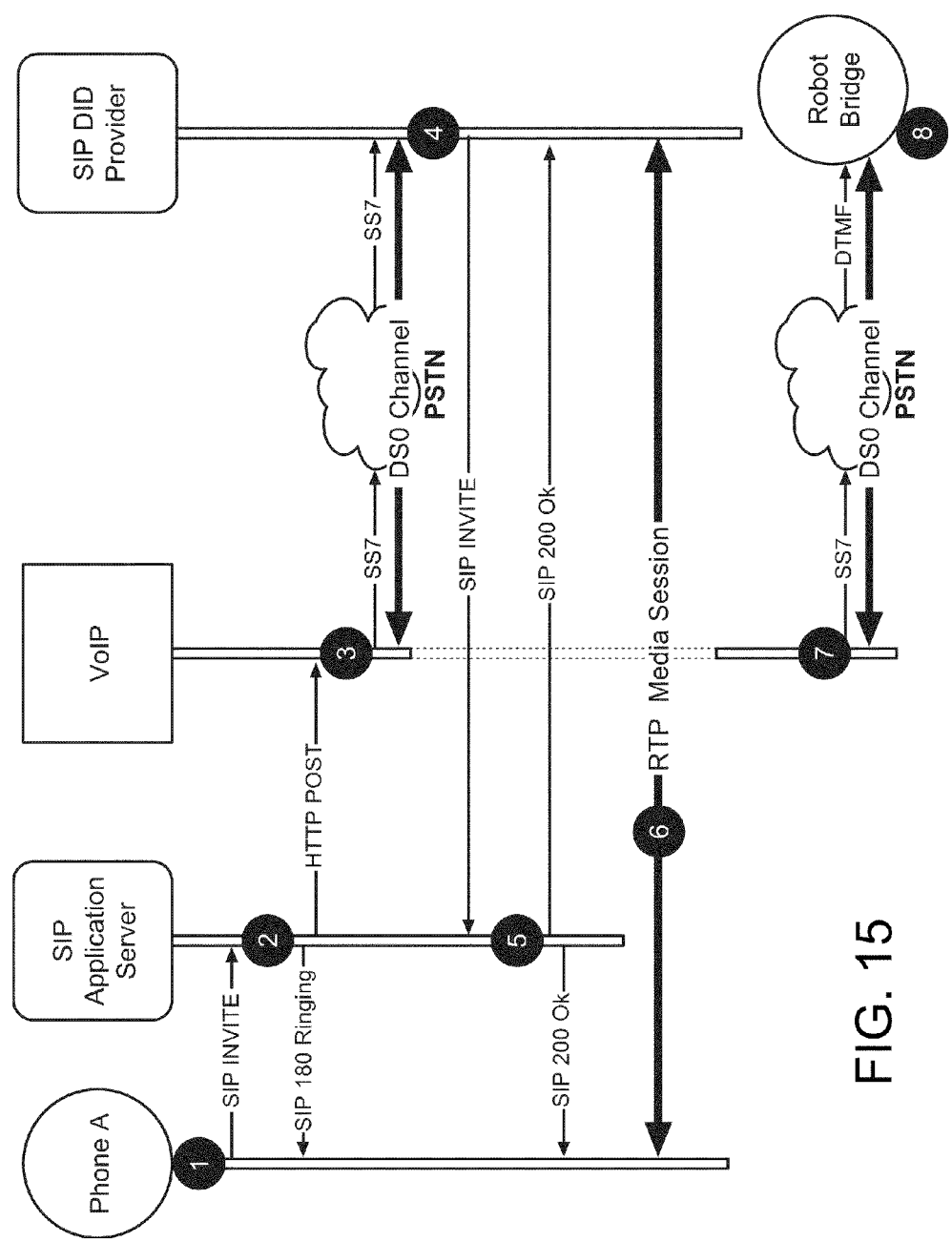
FIG. 15 provides an exemplary telephony schematic for initiating and conducting communication with a mobile human interface robot.

FIG. 15 provides a telephony example that includes interaction with the bridge 350 for initiating and conducting communication through the robot 100. An SIP of Phone A places a call with the SIP application server. The SIP invokes a dial function of the VoIP, which causes a HTTP post request to be sent to a VoIP web server. The HTTP Post request may behave like a callback function. The SIP application server sends a ringing to phone A, indicating that the call has been initiated. A VoIP server initiates a call via a PSTN to a callback number contained in the HTTP post request. The callback number terminates on a SIP DID provider which is configured to route calls back to the SIP application server. The SIP application server matches an incoming call with the original call of phone A and answers both calls with an OK response. A media session is established between phone A and the SIP DID provider. Phone A may hear an artificial ring generated by the VoIP. Once the VoIP has verified that the callback leg has been answered, it initiates the PSTN call to the destination, such as the robot 100 (via the bridge 350). The robot 100 answers the call and the VoIP server bridges the media from the SIP DID provider with the media from the robot 100.

Figure 16A:
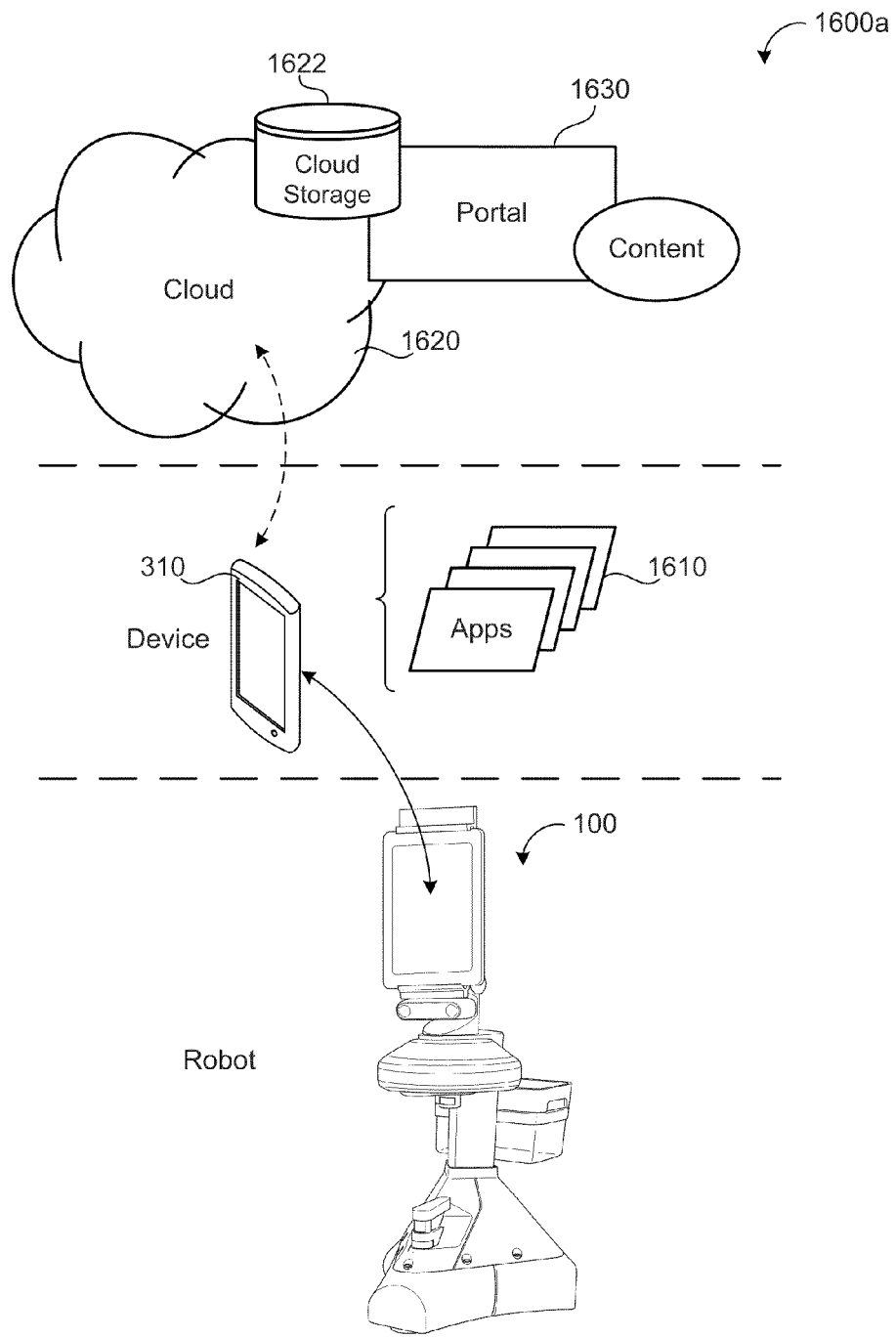
FIGS. 16A-16C provide schematic views of exemplary robot system architectures.
Figure 16B:
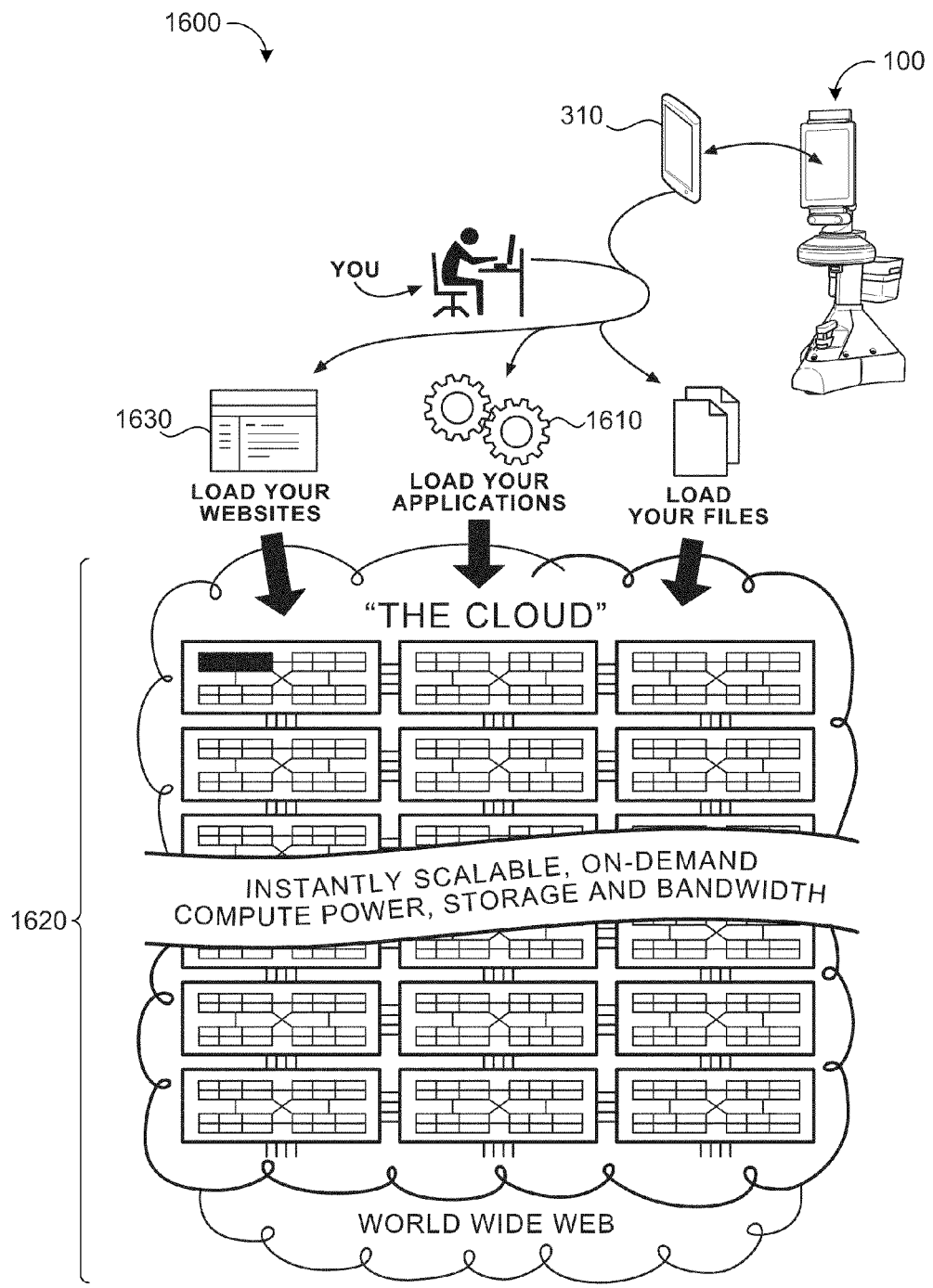

FIGS. 16A and 16B provide schematic views of exemplary robot system architectures 1600a, 1600b, which may include the robot 100 (or a portion thereof, such as the controller 500 or drive system 200), a computing device 310 (detachable or fixedly attached to the head 160), a cloud 1620 (for cloud computing), and a portal 1630.

The robot 100 can provide various core robot features, which may include: mobility (e.g., the drive system 200); a reliable, safe, secure robot intelligence system, such as a control system executed on the controller 500, the power source 105, the sensing system 400, and optional manipulation with a manipulator in communication with the controller 500. The control system can provide heading and speed control, body pose control, navigation, and core robot applications. The sensing system 400 can provide vision (e.g., via a camera 320), depth map imaging (e.g., via a 3-D imaging sensor 450), collision detection, obstacle detection and obstacle avoidance, and/or inertial measurement (e.g., via an inertial measurement unit 470).

The computing device 310 may be a tablet computer, portable electronic device, such as phone or personal digital assistant, or a dumb tablet or display (e.g., a tablet that acts as a monitor for an atom-scale PC in the robot body 110). In some examples, the tablet computer can have a touch screen for displaying a user interface and receiving user inputs. The computing device 310 may execute one or more robot applications 1610, which may include software applications (e.g., stored in memory and executable on a processor) for security, medicine compliance, telepresence, behavioral coaching, social networking, active alarm, home management, etc. The computing device 310 may provide communication capabilities (e.g., secure wireless connectivity and/or cellular communication), refined application development tools, speech recognition, and person or object recognition capabilities. The computing device 310, in some examples utilizes an interaction/COMS featured operating system, such as ANDROID® provided by Google Inc., IPAD OS® provided by Apple, Inc., other smart phone operating systems, or government systems, such as RSS A2.

The cloud 1620 provides cloud computing and/or cloud storage capabilities. Cloud computing may provide Internet-based computing, whereby shared servers provide resources, software, and data to computers and other devices on demand. For example, the cloud 1620 may be a cloud computing service that includes at least one server computing device, which may include a service abstraction layer and a hypertext transfer protocol wrapper over a server virtual machine instantiated thereon. The server computing device may be configured to parse HTTP requests and send HTTP responses. Cloud computing may be a technology that uses the Internet and central remote servers to maintain data and applications. Cloud computing can allow users to access and use applications 1610 without installation and access personal files at any computer with internet access. Cloud computing allows for relatively more efficient computing by centralizing storage, memory, processing and bandwidth. The cloud 1620 can provide scalable, on-demand computing power, storage, and bandwidth, while reducing robot hardware requirements (e.g., by freeing up CPU and memory usage). Robot connectivity to the cloud 1620 allows automatic data gathering of robot operation and usage histories without requiring the robot 100 to return to a base station. Moreover, continuous data collection over time can yields a wealth of data that can be mined for marketing, product development, and support.

Cloud storage 1622 can be a model of networked computer data storage where data is stored on multiple virtual servers, generally hosted by third parties. By providing communication between the robot 100 and the cloudy 1620, information gathered by the robot 100 can be securely viewed by authorized users via a web based information portal.

The portal 1630 may be a web-based user portal for gathering and/or providing information, such as personal information, home status information, anger robot status information. Information can be integrated with third-party information to provide additional functionality and resources to the user and/or the robot 100. The robot system architecture 1600 can facilitate proactive data collection. For example, applications 1610 executed on the computing device 310 may collect data and report on actions performed by the robot 100 and/or a person or environment viewed by the robot 100 (using the sensing system 400). This data can be a unique property of the robot 100.

In some examples, the portal 1630 is a personal portal web site on the World Wide Web. The portal 1630 may provide personalized capabilities and a pathway to other content. The portal 1630 may use distributed applications, different numbers and types of middleware and hardware, to provide services from a number of different sources. In addition, business portals 1630 may share collaboration in workplaces and provide content usable on multiple platforms such as personal computers, personal digital assistants (PDAs), and cell phones/mobile phones. Information, news, and updates are examples of content that may be delivered through the portal 1630. Personal portals 1630 can be related to any specific topic such as providing friend information on a social network or providing links to outside content that may help others.

Figure 16C:
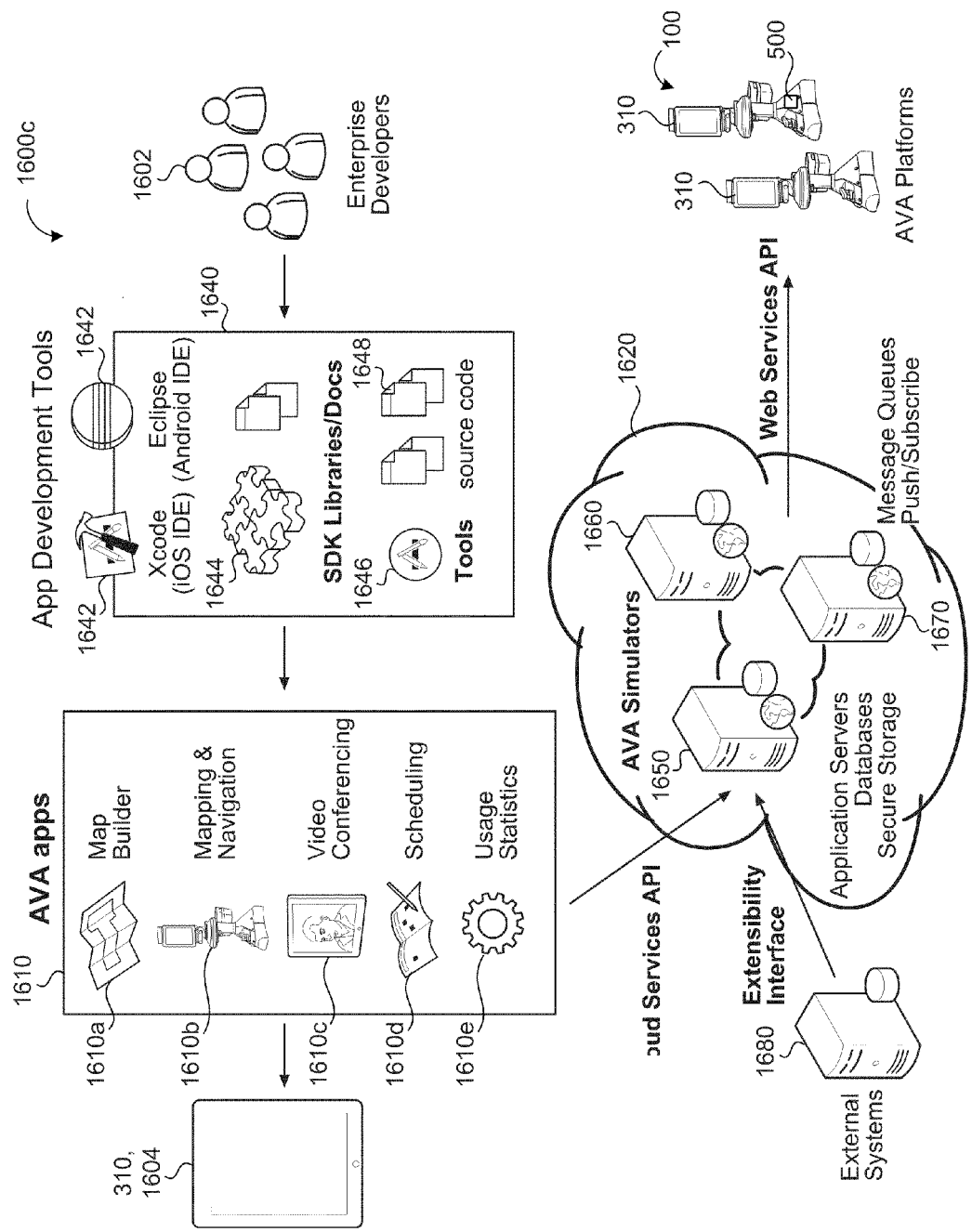

FIG. 16C is a schematic view of an exemplary mobile human interface robot system architecture 1600c. In the example shown, application developers 1602 can access and use application development tools 1640 to produce applications 1610 executable on the web pad 310 or a computing device 1604 (e.g., desktop computer, tablet computer, mobile device, etc.) in communication with the cloud 1620. Exemplary application development tools 1640 may include, but are not limited to, an integrated development environment 1642, a software development kit (SDK) libraries 1644, development or SDK tools 1646 (e.g., modules of software code, a simulator, a cloud usage monitor and service configurator, and a cloud services extension uploader/deployer), and/or source code 1648. The SDK libraries 1644 may allow enterprise developers 1602 to leverage mapping, navigation, scheduling and conferencing technologies of the robot 100 in the applications 1610. Exemplary applications 1610 may include, but are not limited to, a map builder 1610a, a mapping and navigation application 1610b, a video conferencing application 1610c, a scheduling application 1610d, and a usage application 1610e. The applications 1610 may be stored on one or more applications servers 1650 (e.g., cloud storage 1622) in the cloud 1620 and can be accessed through a cloud services application programming interface (API). The cloud 1620 may include one or more databases 1660 and a simulator 1670. A web services API can allow communication between the robot 100 and the cloud 1620 (e.g., and the application server(s) 1650, database(s) 1660, and the simulator 1670). External systems 1680 may interact with the cloud 1620 as well, for example, to access the applications 1610.

In some examples, the map builder application 1610a can build a map of an environment around the robot 100 by linking together pictures or video captured by the camera 320 or 3-D imaging sensor 450 using reference coordinates, as provided by odometry, a global positioning system, and/or way-point navigation. The map may provide an indoor or outside street or path view of the environment. For malls or shopping centers, the map can provide a path tour through-out the mall with each store marked as a reference location with additional linked images or video and/or promotional information. The map and/or constituent images or video can be stored in the database 1660.

The applications 1610 may seamlessly communicate with the cloud services, which may be customized and extended based on the needs of each user entity. Enterprise developers 1602 may upload cloud-side extensions to the cloud 1620 that fetch data from external proprietary systems for use by an application 1610. The simulator 1670 allows the developers 1602 to build enterprise-scale applications without the robot 100 or associated robot hardware. Users may use the SDK tools 1646 (e.g., usage monitor and service configurator) to add or disable cloud services.

Figure 17A:
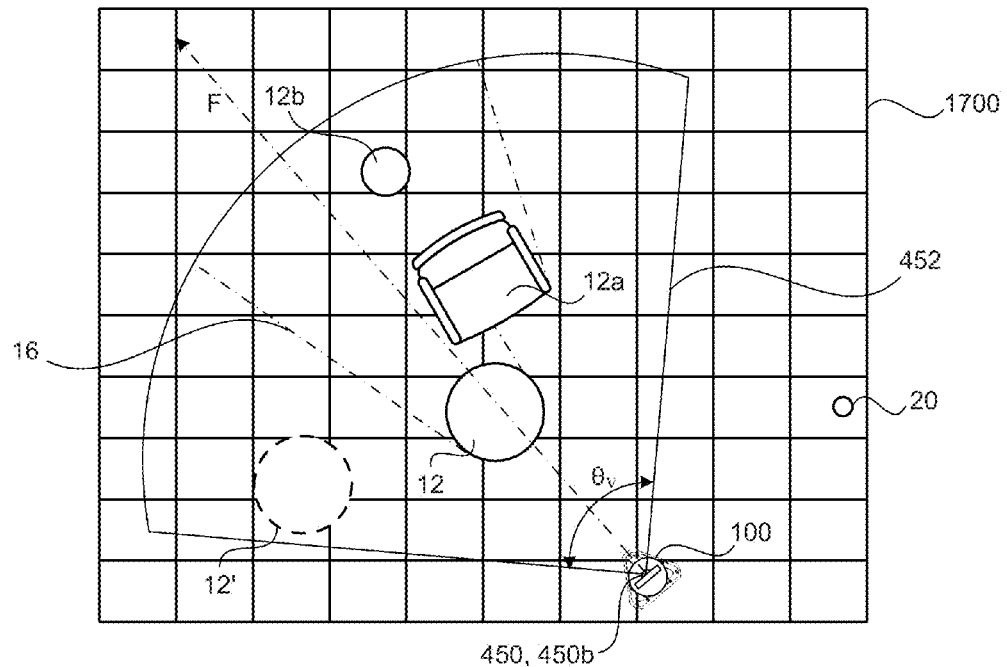
FIG. 17A is a schematic view of an exemplary occupancy map.
Figure 17B:
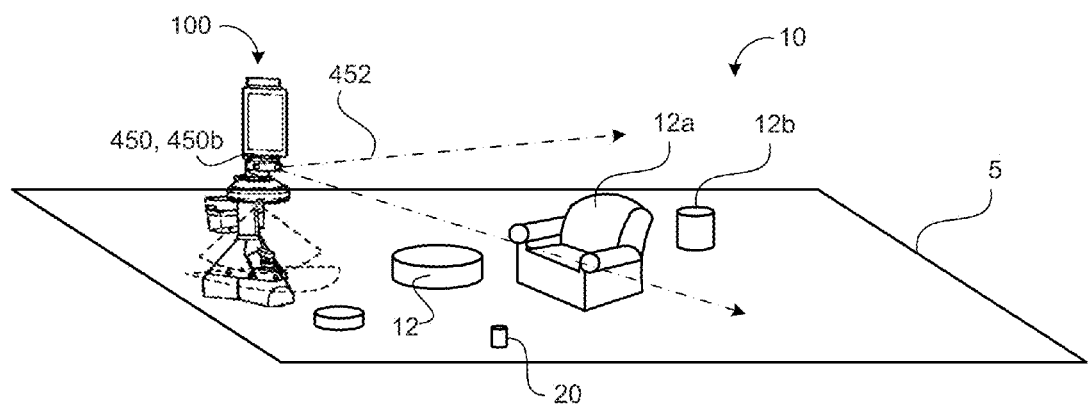
FIG. 17B is a schematic view of a mobile robot having a field of view of a scene in a working area.

Referring to FIGS. 17A and 17B, in some circumstances, the robot 100 receives an occupancy map 1700 of objects 12 in a scene 10 and/or work area 5, or the robot controller 500 produces (and may update) the occupancy map 1700 based on image data and/or image depth data received from an imaging sensor 450 (e.g., the second 3-D image sensor 450b) over time. In addition to localization of the robot 100 in the scene 10 (e.g., the environment about the robot 100), the robot 100 may travel to other points in a connected space (e.g., the work area 5) using the sensor system 400. The robot 100 may include a short range type of imaging sensor 450a (e.g., mounted on the underside of the torso 140, as shown in FIGS. 1 and 3) for mapping a nearby area about the robot 110 and discerning relatively close objects 12, and a long range type of imaging sensor 450b (e.g., mounted on the head 160, as shown in FIGS. 1 and 3) for mapping a relatively larger area about the robot 100 and discerning relatively far away objects 12. The robot 100 can use the occupancy map 1700 to identify known objects 12 in the scene 10 as well as occlusions 16 (e.g., where an object 12 should or should not be, but cannot be confirmed from the current vantage point). The robot 100 can register an occlusion 16 or new object 12 in the scene 10 and attempt to circumnavigate the occlusion 16 or new object 12 to verify the location of new object 12 or any objects 12 in the occlusion 16. Moreover, using the occupancy map 1700, the robot 100 can determine and track movement of an object 12 in the scene 10. For example, the imaging sensor 450, 450a, 450b may detect a new position 12' of the object 12 in the scene 10 while not detecting a mapped position of the object 12 in the scene 10. The robot 100 can register the position of the old object 12 as an occlusion 16 and try to circumnavigate the occlusion 16 to verify the location of the object 12. The robot 100 may compare new image depth data with previous image depth data (e.g., the map 1700) and assign a confidence level of the location of the object 12 in the scene 10. The location confidence level of objects 12 within the scene 10 can time out after a threshold period of time. The sensor system 400 can update location confidence levels of each object 12 after each imaging cycle of the sensor system 400. In some examples, a detected new occlusion 16 (e.g., a missing object 12 from the occupancy map 1700) within an occlusion detection period (e.g., less than ten seconds), may signify a "live" object 12 (e.g., a moving object 12) in the scene 10.

In some implementations, a second object 12b of interest, located behind a detected first object 12a in the scene 10, may be initially undetected as an occlusion 16 in the scene 10. An occlusion 16 can be area in the scene 10 that is not readily detectable or viewable by the imaging sensor 450, 450a, 450b. In the example shown, the sensor system 400 (e.g., or a portion thereof, such as imaging sensor 450, 450a, 450b) of the robot 100 has a field of view 452 with a viewing angle $\theta_V$ (which can be any angle between 0 degrees and 360 degrees) to view the scene 10. In some examples, the imaging sensor 170 includes omni-directional optics for a 360 degree viewing angle $\theta_V$; while in other examples, the imaging sensor 450, 450a, 450b has a viewing angle $\theta_V$ of less than 360 degrees (e.g., between about 45 degrees and 180 degrees). In examples, where the viewing angle $\theta_V$ is less than 360 degrees, the imaging sensor 450, 450a, 450b (or components thereof) may rotate with respect to the robot body 110 to achieve a viewing angle $\theta_V$ of 360 degrees. In some implementations, the imaging sensor 450, 450a, 450b or portions thereof, can move with respect to the robot body 110 and/or drive system 120. Moreover, in order to detect the second object 12b, the robot 100 may move the imaging sensor 450, 450a, 450b by driving about the scene 10 in one or more directions (e.g., by translating and/or rotating on the work surface 5) to obtain a vantage point that allows detection of the second object 10b. Robot movement or independent movement of the imaging sensor 450, 450a, 450b, or portions thereof, may resolve monocular difficulties as well.

A confidence level may be assigned to detected locations or tracked movements of objects 12 in the working area 5. For example, upon producing or updating the occupancy map 1700, the controller 500 may assign a confidence level for each object 12 on the map 1700. The confidence level can be directly proportional to a probability that the object 12 actually located in the working area 5 as indicated on the map 1700. The confidence level may be determined by a number of factors, such as the number and type of sensors used to detect the object 12. For example, the contact sensor 430 may provide the highest level of confidence, as the contact sensor 430 senses actual contact with the object 12 by the robot 100. The imaging sensor 450 may provide a different level of confidence, which may be higher than the proximity sensor 430. Data received from more than one sensor of the sensor system 400 can be aggregated or accumulated for providing a relatively higher level of confidence over any single sensor.

Odometry is the use of data from the movement of actuators to estimate change in position over time (distance traveled). In some examples, an encoder is disposed on the drive system 200 for measuring wheel revolutions, therefore a distance traveled by the robot 100. The controller 500 may use odometry in assessing a confidence level for an object location. In some implementations, the sensor system 400 includes an odometer and/or an angular rate sensor (e.g., gyroscope or the IMU 470) for sensing a distance traveled by the robot 100. A gyroscope is a device for measuring or maintaining orientation, based on the principles of conservation of angular momentum. The controller 500 may use odometry and/or gyro signals received from the odometer and/or angular rate sensor, respectively, to determine a location of the robot 100 in a working area 5 and/or on an occupancy map 1700. In some examples, the controller 500 uses dead reckoning. Dead reckoning is the process of estimating a current position based upon a previously determined position, and advancing that position based upon known or estimated speeds over elapsed time, and course. By knowing a robot location in the working area 5 (e.g., via odometry, gyroscope, etc.) as well as a sensed location of one or more objects 12 in the working area 5 (via the sensor system 400), the controller 500 can assess a relatively higher confidence level of a location or movement of an object 12 on the occupancy map 1700 and in the working area 5 (versus without the use of odometry or a gyroscope).

Odometry based on wheel motion can be electrically noisy. The controller 500 may receive image data from the imaging sensor 450 of the environment or scene 10 about the robot 100 for computing robot motion, independently of wheel based odometry of the drive system 200, through visual odometry. Visual odometry may entail using optical flow to determine the motion of the imaging sensor 450. The controller 500 can use the calculated motion based on imaging data of the imaging sensor 450 for correcting any errors in the wheel based odometry, thus allowing for improved mapping and motion control. Visual odometry may have limitations with low-texture or low-light scenes 10, if the imaging sensor 450 cannot track features within the captured image(s).

Other details and features on odometry and imaging systems, which may combinable with those described herein, can be found in U.S. Pat. No. 7,158,317 (describing a "depth-of field" imaging system), and U.S. Pat. No. 7,115,849 (describing wavefront coding interference contrast imaging systems), the contents of which are hereby incorporated by reference in their entireties.

When a robot is new to a building that it will be working in, the robot may need to be shown around or provided with a map of the building (e.g., room and hallway locations) for autonomous navigation. For example, in a hospital, the robot may need to know the location of each patient room, nursing stations, etc. In some implementations, the robot 100 receives a layout map 1810, such as the one shown in FIG. 18A, and can be trained to learn the layout map 1810. For example, while leading the robot 100 around the building, the robot 100 may record specific locations corresponding to locations on the layout map 1810. The robot 100 may display the layout map 1810 on the web pad 310 and when the user takes the robot 100 to a specific location, the user can tag that location on the layout map 1810 (e.g., using a touch screen or other pointing device of the web pads 310). The user may choose to enter a label for a tagged location, like a room name or a room number. At the time of tagging, the robot 100 may store the tag, with a point on the layout map 1810 and a corresponding point on a robot map 1220, such as the one shown in FIG. 12D.

Using the sensor system 400, the robot 100 may build the robot map 1820 as it moves around. For example, the sensor system 400 can provide information on how far the robot 100 has moved and a direction of travel. The robot map 1820 may include fixed obstacles in addition to the walls provided in the layout map 1810. The robot 100 may use the robot map 1820 to execute autonomous navigation. In the robot map at 1820, the "walls" may not look perfectly straight, for example, due to detected packing creates along the wall in the corresponding hallway and/or furniture detected inside various cubicles. Moreover, rotational and resolution differences may exist between the layout map 1810 and the robot map 1820.

After map training, when a user wants to send the robot 100 to a location, the user can either refer to a label/tag (e.g., enter a label or tag into a location text box displayed on the web pad 310) or the robot 100 can display the layout map 1810 to the user on the web pad 310 and the user may select the location on the layout map 1810. If the user selects a tagged layout map location, the robot 100 can easily determine the location on the robot map 1820 that corresponds to the selected location on the layout map 1810 and can proceed to navigate to the selected location.

If the selected location on the layout map 1810 is not a tagged location, the robot 100 determines a corresponding location on the robot map 1820. In some implementations, the robot 100 computes a scaling size, origin mapping, and rotation between the layout map 1810 and the robot map 1820 using existing tagged locations, and then applies the computed parameters to determine the robot map location (e.g., using an affine transformation or coordinates).

The robot map 1820 may not be the same orientation and scale as the layout map 1810. Moreover, the layout map may not be to scale and may have distortions that vary by map area. For example, a layout map 1810 created by scanning a fire evacuation map typically seen in hotels, offices, and hospitals is usually not to drawn scale and can even have different scales in different regions of the map. The robot map 1820 may have its own distortions. For example, locations on the robot map 1820 may been computed by counting wheel turns as a measure of distance, and if the floor was slightly slippery or turning of corners caused extra wheel, inaccurate rotation calculations may cause the robot 100 to determine inaccurate locations of mapped objects.

A method of mapping a given point 1814 on the layout map 1810 to a corresponding point 1824 on the robot map 1820 may include using existing tagged 1812 points to compute a local distortion between the layout map 1810 and the robot map 1820 in a region (e.g., within a threshold radius) containing the layout map point. The method further includes applying a distortion calculation to the layout map point 1814 in order to find a corresponding robot map point 1824. The reverse can be done if you are starting with a given point on the robot map 1820 and want to find a corresponding point on the layout map 1810, for example, for asking the robot for its current location.

Figure 18B:
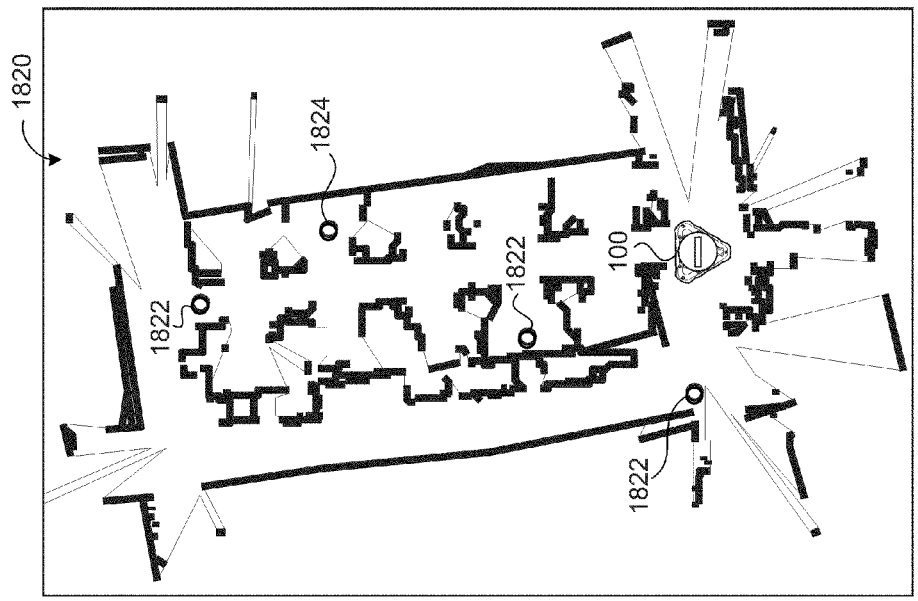
FIG. 18B is a schematic view of an exemplary robot map corresponding to the layout map shown in FIG. 18A.
Figure 18A:
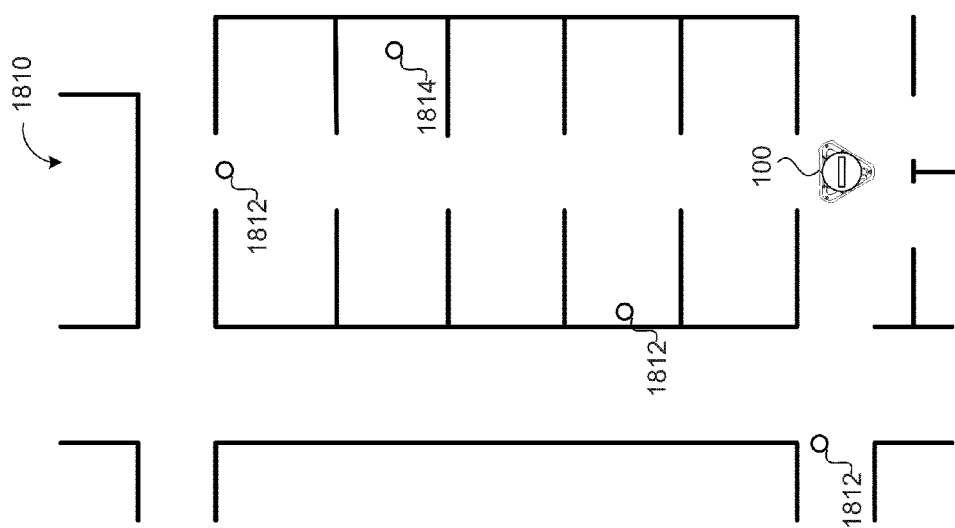
FIG. 18A is a schematic view of an exemplary layout map.
Figure 18C:
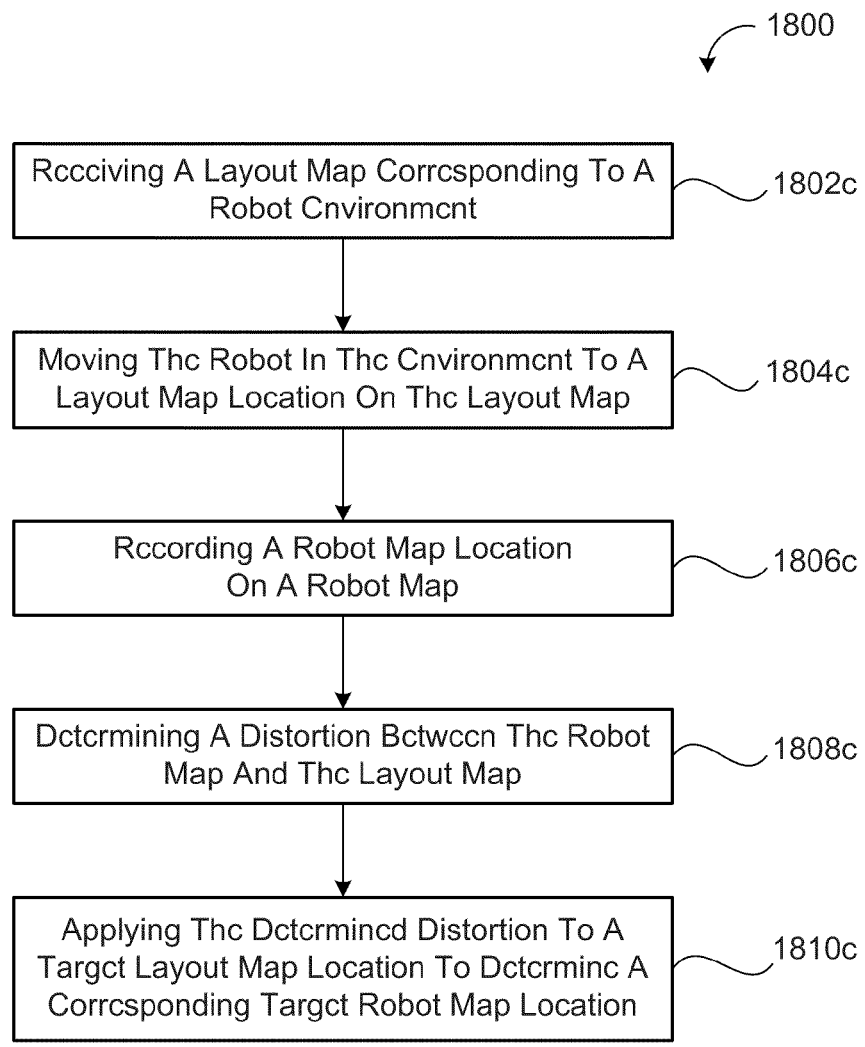
FIG. 18C provide an exemplary arrangement of operations for operating a mobile robot to navigate about an environment using a layout map and a robot map.

FIG. 18C provide an exemplary arrangement 1800 of operations for operating the robot 100 to navigate about an environment using the layout map 1810 and the robot map 1820. With reference to FIGS. 18B and 18C, the operations include receiving 1802c a layout map 1810 corresponding to an environment of the robot 100, moving 1804c the robot 100 in the environment to a layout map location 1812 on the layout map 1810, recording 1806c a robot map location 1822 on a robot map 1820 corresponding to the environment and produced by the robot 100, determining 1808c a distortion between the robot map 1820 and the layout map 1810 using the recorded robot map locations 1822 and the corresponding layout map locations 1812, and applying 1810c the determined distortion to a target layout map location 1814 to determine a corresponding target robot map location 1824, thus allowing the robot to navigate to the selected location 1814 on the layout map 1810. In some implementations it operations include determining a scaling size, origin mapping, and rotation between the layout map and the robot map using existing tagged locations and resolving a robot map location corresponding to the selected layout map location 1814. The operations may include applying an affine transformation to the determined scaling size, origin mapping, and rotation to resolve the robot map location.

Figure 19B:
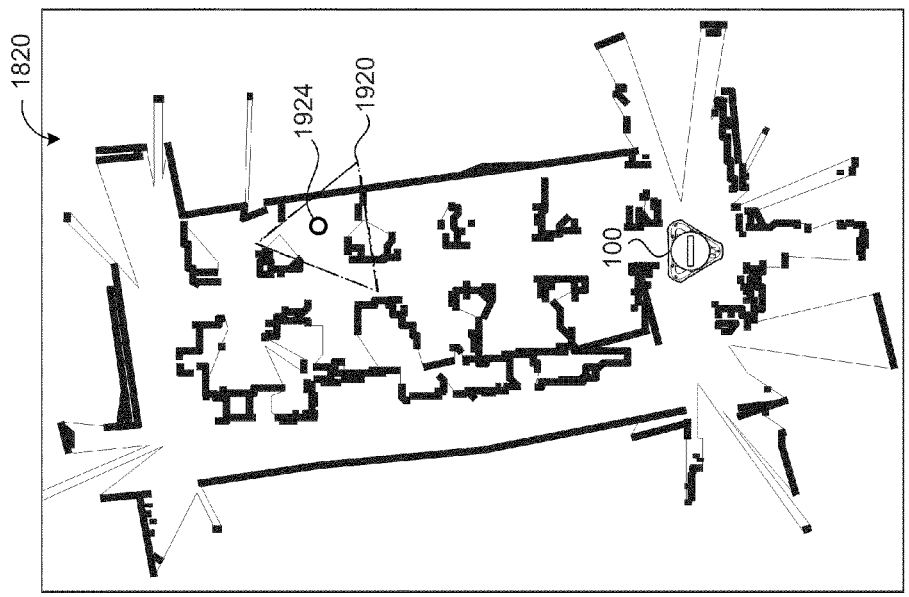
FIG. 19B is a schematic view of an exemplary robot map corresponding to the layout map shown in FIG. 19A.
Figure 19A:
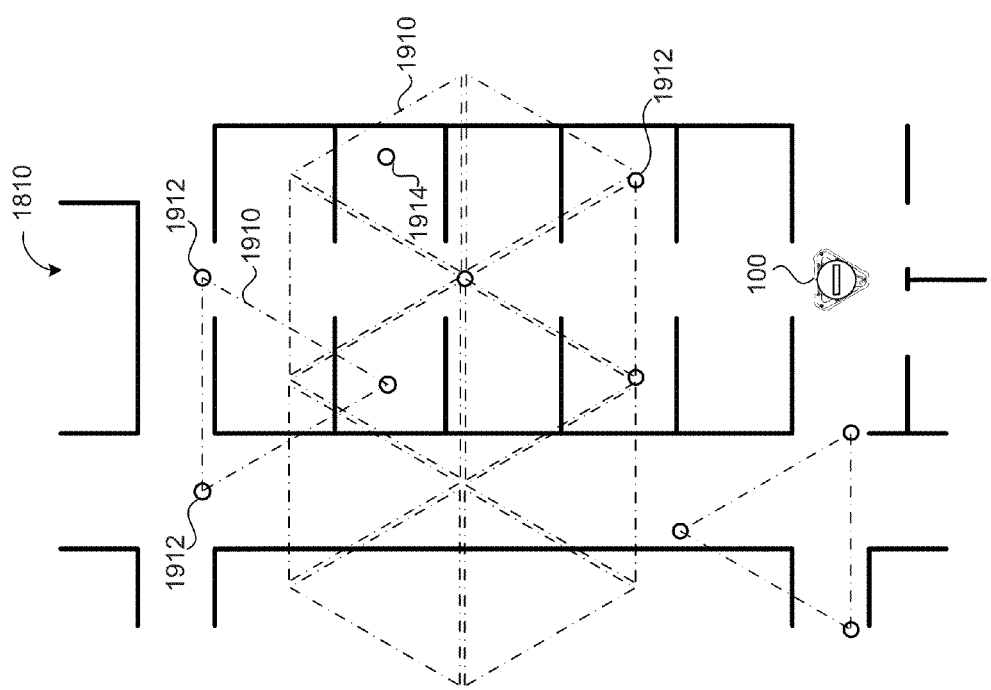
FIG. 19A is a schematic view of an exemplary layout map with triangulation of type layout points.
Figure 19C:
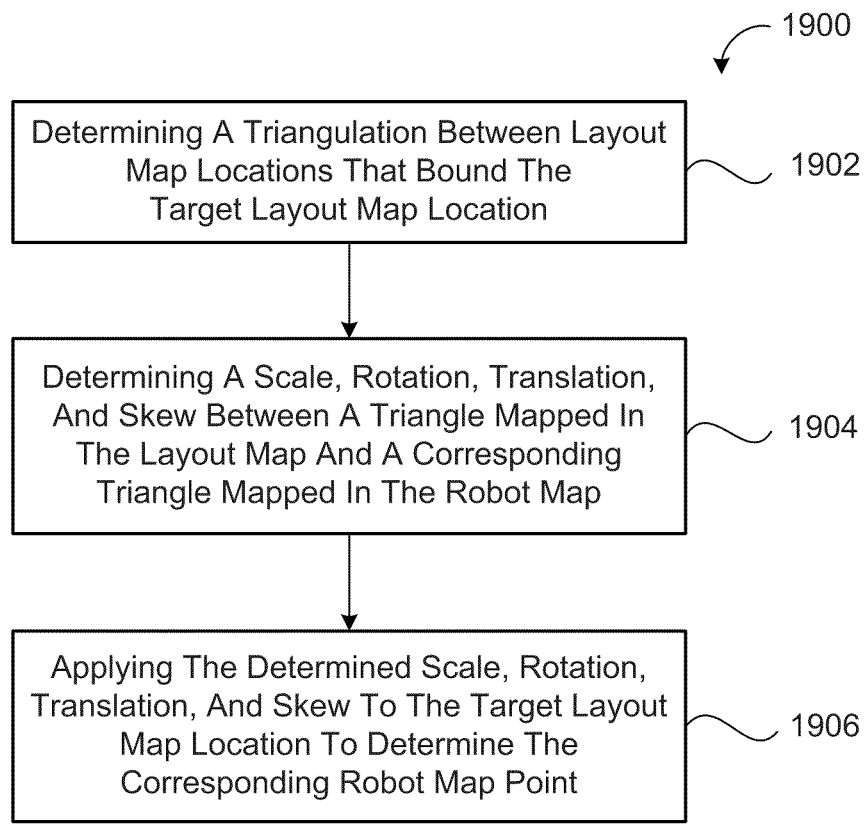
FIG. 19C provide an exemplary arrangement of operations for determining a target robot map location using a layout map and a robot map.

Referring to FIGS. 19A-19C, in some implementations, the method includes using tagged layout map points 1912 (also referred to recorded layout map locations) to derive a triangulation of an area inside a bounding shape containing the tagged layout map points 1912, such that all areas of the layout map 1810 are covered by at least one triangle 1910 whose vertices are at a tagged layout map points 1912. The method further includes finding the triangle 1910 that contains the selected layout map point 1914 and determining a scale, rotation, translation, and skew between the triangle 1910 mapped in the layout map 1810 and a corresponding triangle 1920 mapped in the robot map 1820 (i.e., the robot map triangle with the same tagged vertices). The method includes applying the determined scale, rotation, translation, and skew to the selected layout map point 1914 in order to find a corresponding robot map point 1924.

FIG. 19C provide an exemplary arrangement 1900 of operations for determining the target robot map location 1924. The operations include determining 1902 a triangulation between layout map locations that bound the target layout map location, determining 1904 a scale, rotation, translation, and skew between a triangle mapped in the layout map and a corresponding triangle mapped in the robot map and applying 1906 the determined scale, rotation, translation, and skew to the target layout map location to determine the corresponding robot map point.

Figure 20B:
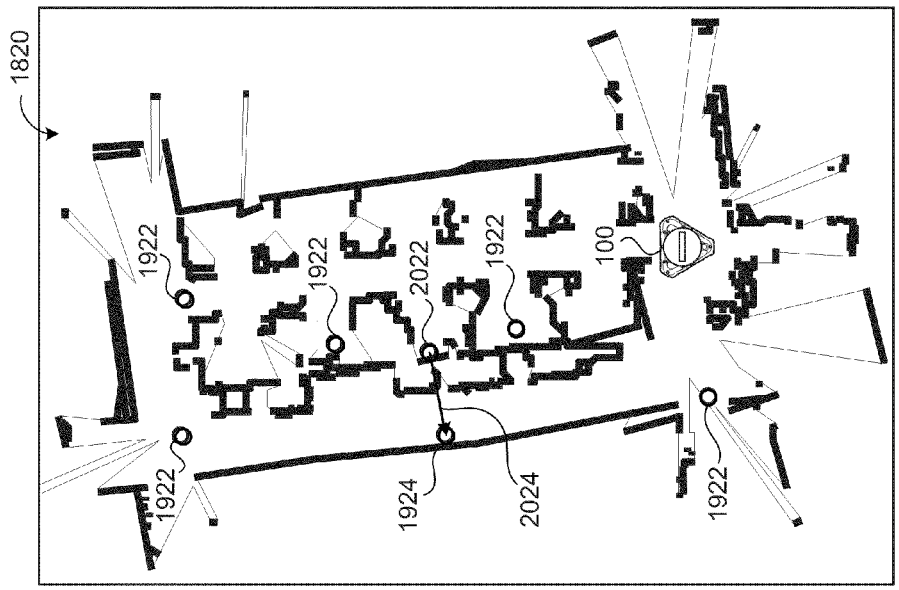
FIG. 20B is a schematic view of an exemplary robot map corresponding to the layout map shown in FIG. 20A.
Figure 20A:
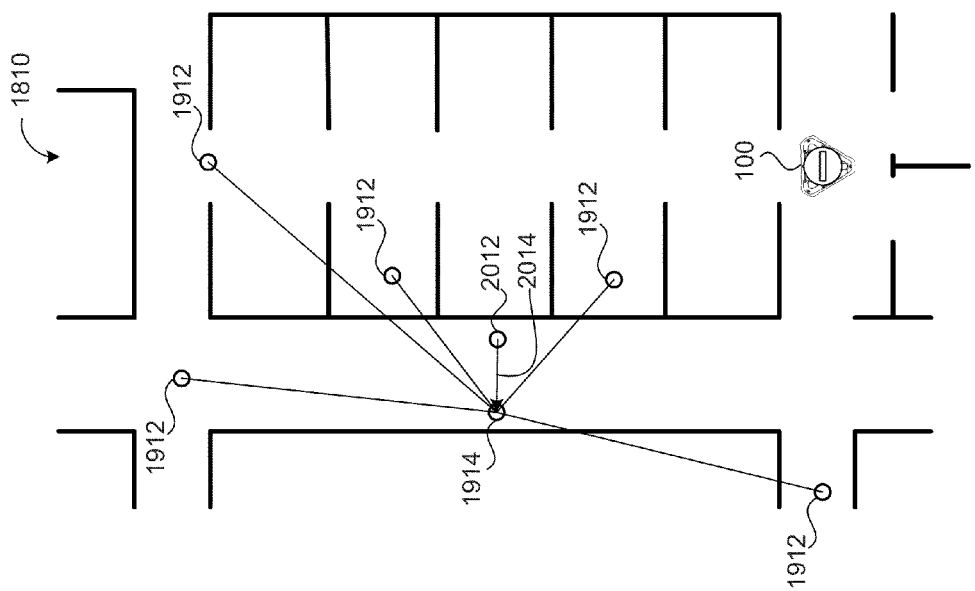
FIG. 20A is a schematic view of an exemplary layout map with a centroid of tight layout points.

Referring to FIGS. 20A and 20B, in another example, the method includes determining the distances of all tagged points 1912 in the layout map 1810 to the selected layout map point 1914 and determining a centroid 2012 of the layout map tagged points 1912. The method also includes determining a centroid 2022 of all tagged points 1922 on the robot map 1820. For each tagged layout map point 1912, the method includes determining a rotation and a length scaling needed to transform a vector 2014 that runs from the layout map centroid 2012 to the selected layout point 1914 into a vector 2024 that runs from the robot map centroid 2022 to the robot map point 1924. Using this data, the method further includes determining an average rotation and scale. For each tagged layout map point 1912, the method further includes determining an "ideal robot map coordinate" point 1924i by applying the centroid translations, the average rotation, and the average scale to the selected layout map point 1914. Moreover, for each tagged layout map point 1912, the method includes determining a distance from that layout map point 1912 to the selected layout map point 1914 and sorting the tagged layout map points 1912 by these distances, shortest distance to longest. The method includes determining an "influence factor" for each tagged layout map point 1912, using either the inverse square of the distance between each tagged layout map point 1912 and the selected layout map point 1914. Then for each tagged layout map point 1912, the method includes determining a vector which is the difference between the "ideal robot map coordinate" point 1924*i* and robot map point 1924, prorated by using the influence factors of the tagged layout map points 1912. The method includes summing the prorated vectors and adding them to "ideal robot map coordinate" point 1924*i* for the selected layout map point 1914. The result is the corresponding robot map point 1924 on the robot map 1820. In some examples, this method/algorithm includes only the closest N tagged layout map point 1912 rather than all tagged layout map point 1912.

Figure 20C:
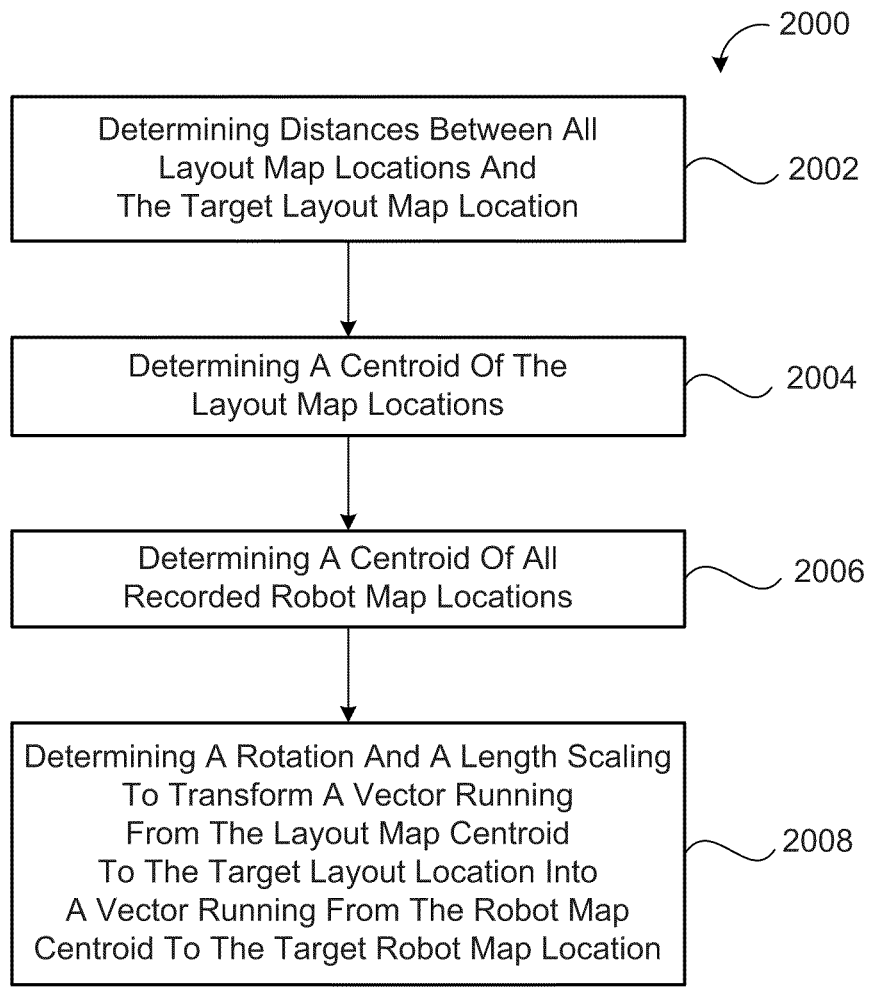
FIG. 20C provide an exemplary arrangement of operations for determining a target robot map location using a layout map and a robot map.

FIG. 20C provide an exemplary arrangement 2000 of operations for determining a target robot map location 1924 using the layout map 1810 and the robot map 1820. The operations include determining 2002 distances between all layout map locations and the target layout map location, determining 2004 a centroid of the layout map locations, determining 2006 a centroid of all recorded robot map locations, and for each layout map location, determining 2006 a rotation and a length scaling to transform a vector running from the layout map centroid to the target layout location into a vector running from the robot map centroid to the target robot map location.

Referring again to FIG. 16C, although the robot 100 may operate autonomously, a user may wish to control or manage the robot 100 through an application 1610. For example, a user may wish to control or define movement of the robot 100 within an environment or scene 10, as by providing navigation points on a map. In some implementations, the map builder application 1610*a* allows the user to create an occupancy map 1700 (FIG. 17A) or a layout map 1810 (FIG. 18A) of a scene 10 based on sensor data generated by the sensor system 400 of one or more robots 100 in the scene 10. In some examples, robot maps 1810 can be post-processed to produce one or more vector-based layout maps 1810. The map builder application 1610*a* may allow the user to customize the maps 1700, 1810 (e.g., lining up walls that should look parallel, etc). Moreover, annotations recognizable by the robot 100 and by the application 1610*a* (and/or other applications 1610) can be added to the maps 1700, 1810. In some implementations, the map builder application 1610*a* may store robot map data, layout map data, user-defined objects, and annotations securely in the cloud storage 1622 on the cloud 1620, using a cloud service. Relevant data sets may be pushed from the cloud services to the appropriate robots 100 and applications 1610.

In some implementations, the mapping and navigation application 1610*b* (FIG. 16C) allows users to specifying a destination location on a layout map 1810 and request the robot 100 to drive to the destination location. For example, a user may execute the mapping and navigation application 1610*b* on a computing device, such as a computer, tablet computer, mobile device, etc, which is in communication with the cloud 1620. The user can access a layout map 1810 of the environment about the robot 100, mark or otherwise set a destination location on the layout map 1810, and request the robot 100 to move to the destination location. The robot 100 may then autonomously navigate to the destination location using the layout map 1810 and/or a corresponding robot map 1820. To navigate to the destination location, the robot 100 may rely on its ability to discern its local perceptual space (i.e., the space around the robot 100 as perceived through the sensor system 400) and execute an object detection obstacle avoidance (ODOA) strategy.

Figure 21A:
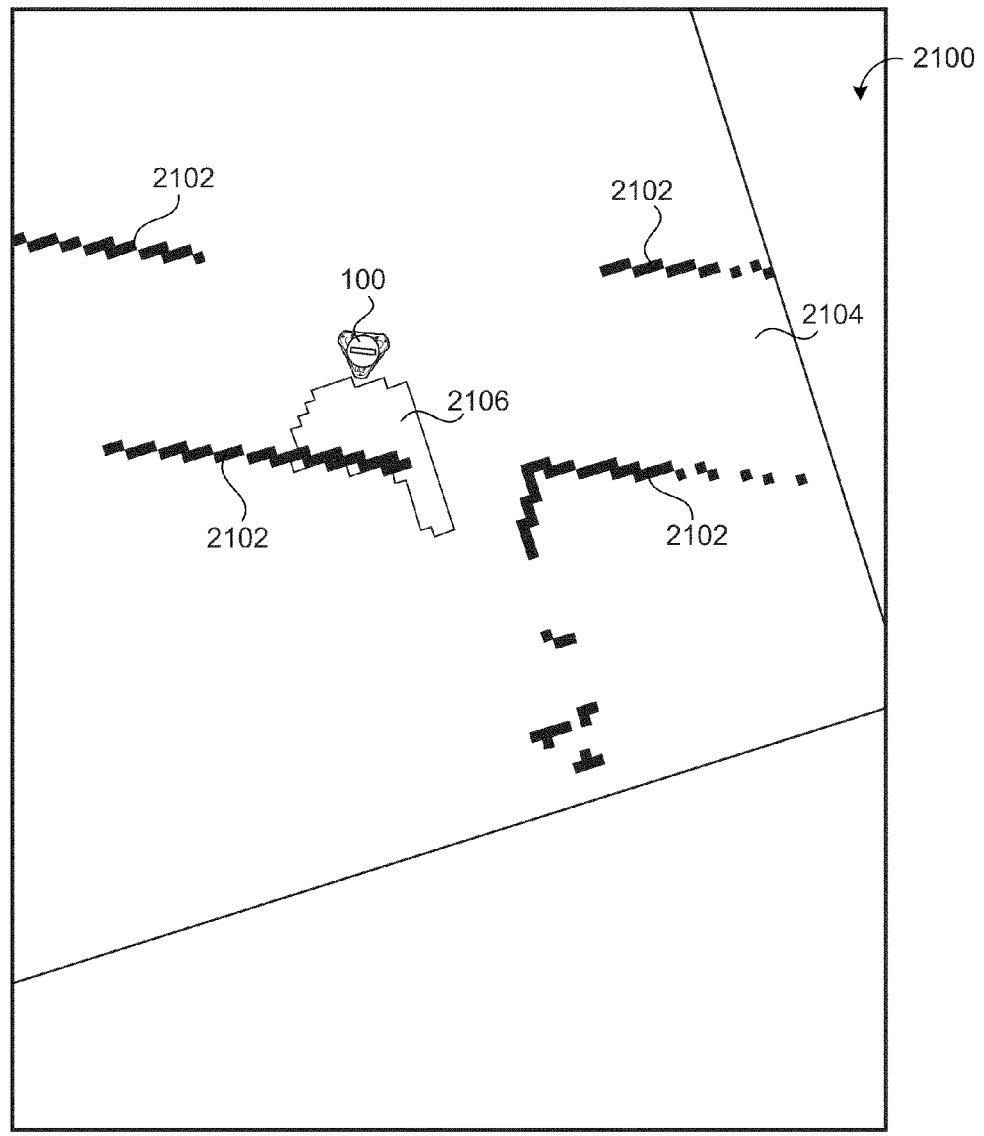
FIG. 21A provides an exemplary schematic view of the local perceptual space of a mobile human interface robot while stationary.

Referring to FIGS. 12 and 21A-21D, in some implementations, the robot 100 (e.g., the control system 510 shown in FIG. 22) classifies its local perceptual space into three categories: obstacles (black) 2102, unknown (gray) 2104, and known free (white) 2106. Obstacles 2102 are observed (i.e., sensed) points above the ground G that are below a height of the robot 100 and observed points below the ground G (e.g., holes, steps down, etc.). Known free 2106 corresponds to areas where the 3-D image sensors 450 can see the ground G. Data from all sensors in the sensor system 400 can be combined into a discretized 3-D voxel grid. The 3-D grid can then be analyzed and converted into a 2-D grid 2100 with the three local perceptual space classifications. FIG. 21A provides an exemplary schematic view of the local perceptual space of the robot 100 while stationary. The information in the 3-D voxel grid has persistence, but decays over time if it is not reinforced. When the robot 100 is moving, it has more known free area 2106 to navigate in because of persistence.

Figure 21B:
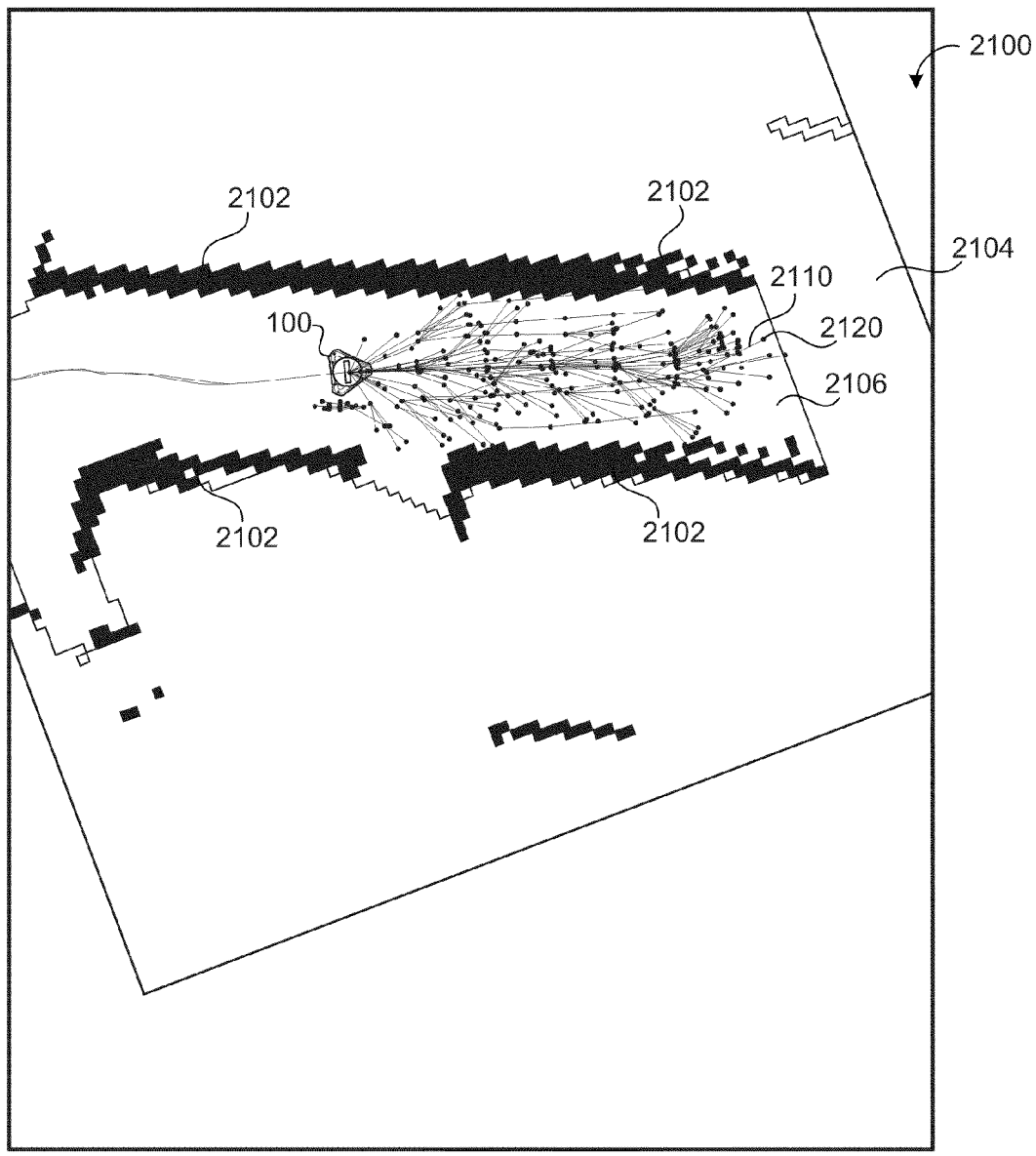
FIG. 21B provides an exemplary schematic view of the local perceptual space of a mobile human interface robot while moving.

An object detection obstacle avoidance (ODOA) navigation strategy for the control system 510 may include either accepting or rejecting potential robot positions that would result from commands. Potential robot paths 2110 can be generated many levels deep with different commands and resulting robot positions at each level. FIG. 21B provides an exemplary schematic view of the local perceptual space of the robot 100 while moving. An ODOA behavior 600*b* (FIG. 15) can evaluate each predicted robot path 2110. These evaluations can be used by the action selection engine 580 to determine a preferred outcome and a corresponding robot command. For example, for each robot position 2120 in the robot path 2110, the ODOA behavior 600*b* can execute a method for object detection and obstacle avoidance that includes identifying each cell in the grid 2100 that is in a bounding box around a corresponding position of the robot 100, receiving a classification of each cell. For each cell classified as an obstacle or unknown, retrieving a grid point corresponding to the cell and executing a collision check by determining if the grid point is within a collision circle about a location of the robot 100. If the grid point is within the collision circle, the method further includes executing a triangle test of whether the grid point is within a collision triangle (e.g., the robot 100 can be modeled as triangle). If the grid point is within the collision triangle, the method includes rejecting the grid point. If the robot position is inside of a sensor system field of view of parent grid points on the robot path 2110, then the "unknown" grid points are ignored because it is assumed that by the time the robot 100 reaches those grid points, it will be known.

The method may include determining whether any obstacle collisions are present within a robot path area (e.g., as modeled by a rectangle) between successive robot positions 2120 in the robot path 2110, to prevent robot collisions during the transition from one robot position 2120 to the next.

Figure 21C:
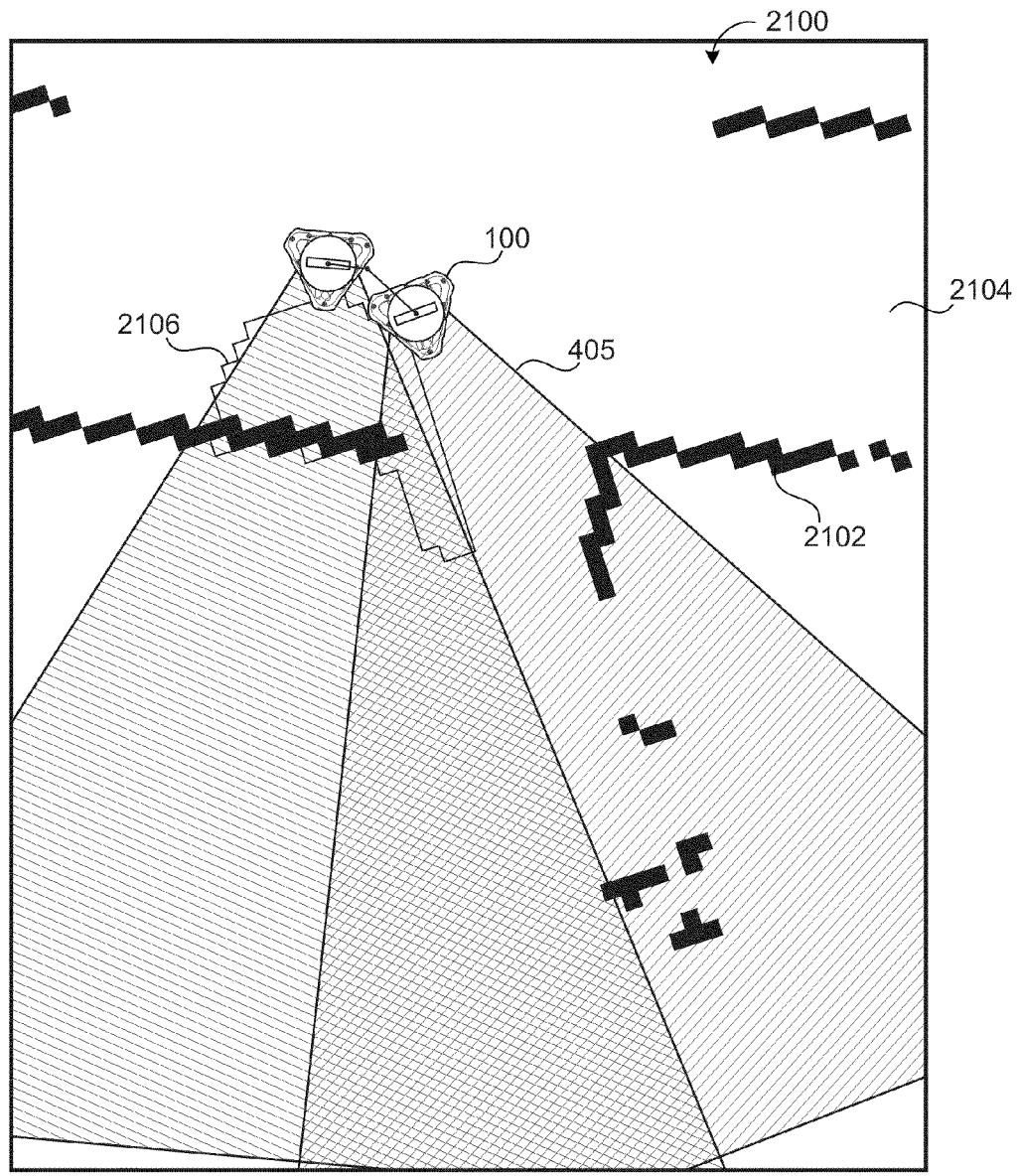
FIG. 21C provides an exemplary schematic view of the local perceptual space of a mobile human interface robot while stationary.

FIG. 21C provides a schematic view of the local perceptual space of the robot 100 and a sensor system field of view 405 (the control system 510 may use only certain sensor, such as the first and second 3-D image sensors 450*a*, 450*b*, for robot path determination). Taking advantage of the holonomic mobility of the drive system 200, the robot 100 can use the persistence of the known ground G to allow it to drive in directions where the sensor system field of view 405 does not actively cover. For example, if the robot 100 has been sitting still with the first and second 3-D image sensors 450a, 450b pointing forward, although the robot 100 is capable of driving sideways, the control system 510 will reject the proposed move, because the robot 100 does not know what is to its side, as illustrated in the example shown in FIG. 21C, which shows an unknown classified area to the side of the robot 100. If the robot 100 is driving forward with the first and second 3-D image sensors 450a, 450b pointing forward, then the ground G next to the robot 100 may be classified as known free 2106, because both the first and second 3-D image sensors 450a, 450b can view the ground G as free as the robot 100 drives forward and persistence of the classification has not decayed yet. (See e.g., FIG. 21B.) In such situations the robot 100 can drive sideways.

Figure 21D:
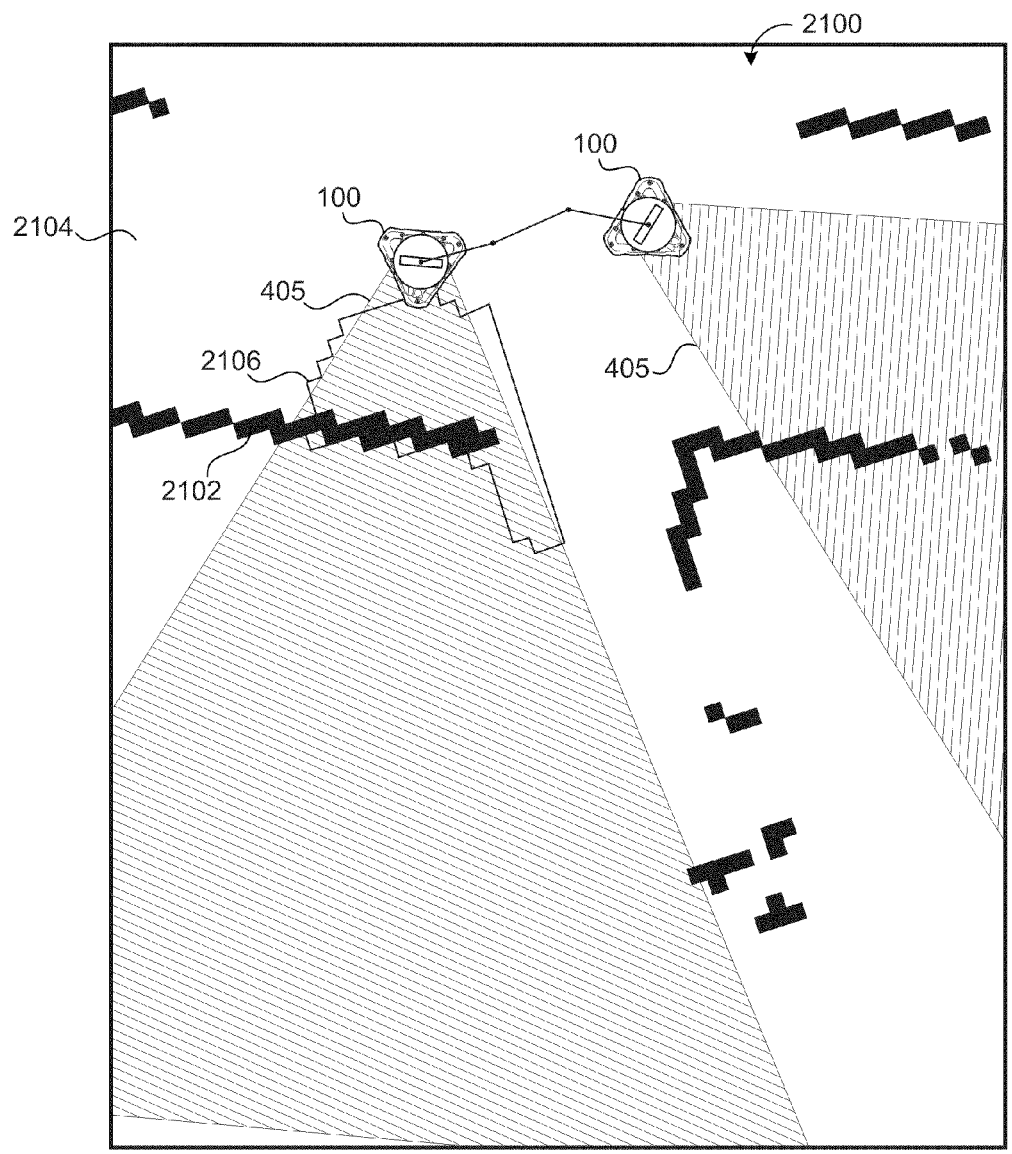
FIG. 21D provides an exemplary schematic view of the local perceptual space of a mobile human interface robot while moving.

Referring to FIG. 21D, in some examples, given a large number of possible trajectories with holonomic mobility, the ODOA behavior 600b may cause robot to choose trajectories where it will (although not currently) see where it is going. For example, the robot 100 can anticipate the sensor field of view orientations that will allow the control system 510 to detect objects. Since the robot can rotate while translating, the robot can increase the sensor field of view 405 while driving.

Figure 21E:
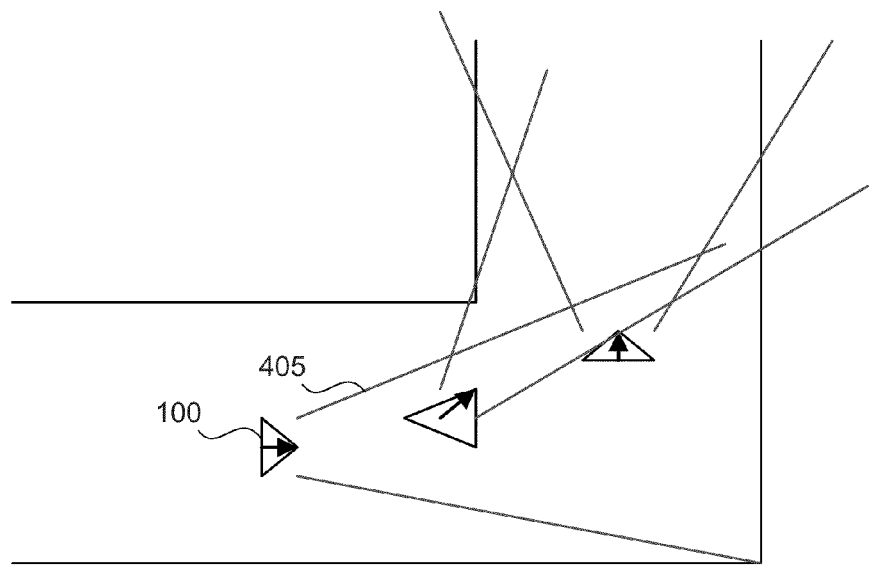
FIG. 21E provides an exemplary schematic view of a mobile human interface robot with the corresponding sensory field of view moving closely around a corner.
Figure 21F:
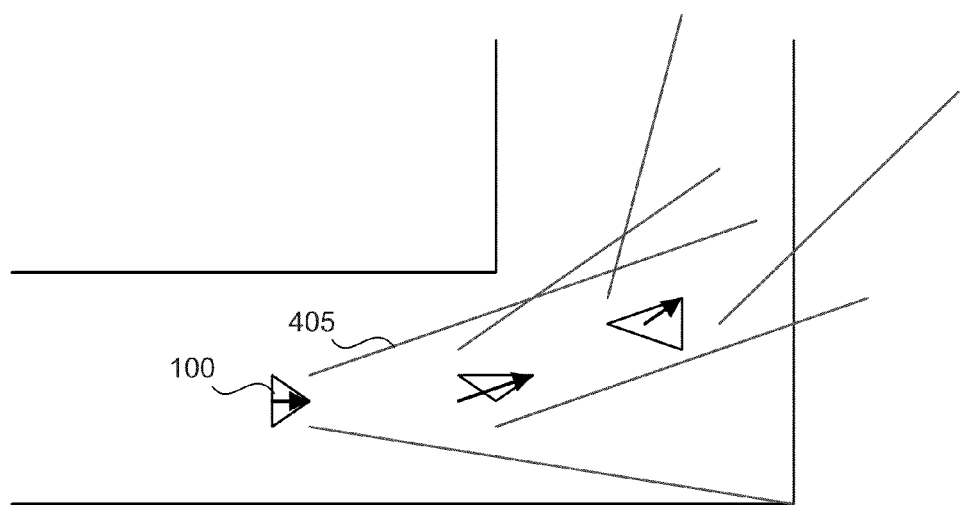
FIG. 21F provides an exemplary schematic view of a mobile human interface robot with the corresponding sensory field of view moving widely around a corner.

By understanding the field of view 405 of the sensor system 400 and what it will see at different positions, the robot 100 can select movement trajectories that help it to see where it is going. For example, when turning a corner, the robot 100 may reject trajectories that make a hard turn around the corner because the robot 100 may end up in a robot position 2120 that is not sensor system field of view 405 of a parent robot position 2120 and of which it currently has no knowledge of, as shown in FIG. 21E. Instead, the robot 100 may select a movement trajectory that turns to face a desired direction of motion early and use the holonomic mobility of the drive system 200 to move sideways and then straight around the corner, as shown in FIG. 21F.

In some examples, the mapping and navigation application 1610b (FIG. 16C) provides teleoperation functionality. For example, the user can drive the robot 100 using video waypoint driving (e.g., using one or more of the cameras or imaging sensors 320, 450). The user may alter a height $H_L$ of the leg 130 to raise/lower the height $H_T$ of the torso 140 (FIG. 14) to alter a view field of one of the imaging sensors 450 and/or pan and/or tilt the robot head 160 to alter a view field of a supported camera 320 or imaging sensor 450, 450b (see e.g., FIGS. 11 and 12). Moreover, the user can rotate the robot about its Z-axis using the drive system 200 to gain other fields of view of the cameras or imaging sensors 320, 450. In some examples, the mapping and navigation application 1610b allows the user to switch between multiple layout maps 1810 (e.g., for different environments or different robots 100) and/or manage multiple robots 100 on one layout map 1810. The mapping and navigation application 1610b may communicate with the cloud services API to enforce policies on proper robot usage set forth by owners or organizations of the robots 100.

Referring again to FIG. 16C, in some implementations, the video conferencing application 1610c allows a user to initiate and/or participate in a video conferencing session with other users. In some examples, the video conferencing application 1610c allows a user to initiate and/or participate in a video conferencing session with a user of the robot 100, a remote user on a computing device connected to the cloud 1620 and/or another remote user connected to the Internet using a mobile handheld device. The video conferencing application 1610c may provide an electronic whiteboard for sharing information, an image viewer, and/or a PDF viewer.

The scheduling application 1610d allows users to schedule usage of one or more robots 100. When there are fewer robots 100 than the people who want to use them, the robots 100 become scarce resources and scheduling may be needed. Scheduling resolves conflicts in resource allocations and enables higher resource utilization. The scheduling application 1610d can be robot-centric and may integrate with third party calendaring systems, such as MICROSOFT OFFICE OUTLOOK® by the Microsoft Corporation or GOOGLE CALENDAR by Google Inc. In some examples, the scheduling application 1610d communicates with the cloud 1620 through one or more cloud services to dispatch robots 100 at pre-scheduled times. The scheduling application 1610d may integrate time-related data (e.g., maintenance schedule, etc.) with other robot data (e.g., robot locations, health status, etc.) to allow selection of a robot 100 by the cloud services for missions specified by the user.

In one scenario, a doctor may access the scheduling application 1610d on a computing device (e.g., a portable tablet computer or hand held device) in communication with the cloud 1620 for scheduling rounds at a remote hospital later in the week. The scheduling application 1610d can schedule robots 100 in a similar manner to allocating a conference room on a electronic calendar. The cloud services manage the schedules. If in the middle of the night, the doctor gets a call that a critical patient at a remote hospital needs to be seen, the doctor can request a robot 100 using the scheduling application 1610d and/or send a robot 100 to a patient room using the mapping and navigation application 1610b. The doctor may access medical records on his computing device (e.g., by accessing the cloud storage 1622) and video or imagery of the patient using the video conferencing application 1610c. The cloud services may integrate with robot management, an electronic health record systems and medical imaging systems. The doctor may control movement of the robot 100 remotely to interact with the patient. If the patent speaks only Portuguese, the video conferencing application 1610c may automatically translate languages or a 3rd party translator may join the video conference using another computing device in communication with the cloud 1620 (e.g., via the Internet). The translation services can be requested, fulfilled, recorded, and billed using the cloud services.

The usage/statistics application 1610e can be a general-purpose application for users to monitor robot usage, produce robot usage reports, and/or manage a fleet of robots 100. This application 1610e may also provide general operating and troubleshooting information for the robot 100. In some examples, the usage/statistics application 1610e allows the user to add/disable services associated with use of the robot 100, register for use of one or more simulators 1670, modify usage policies on the robot, etc.

In another scenario, a business may have a fleet of robots 100 for at least one telepresence application. A location manager may monitor a status of one or more robots 100 (e.g., location, usage and maintenance schedules, battery info, location history, etc.) using the usage/statistics application 1610e executing on a computing device in communication with the cloud 1620 (e.g., via the Internet). In some examples, the location manager can assist a user with a robot issue by sharing a user session. The location manager can issue commands to any of the robots 100 using an application 1610 to navigate the corresponding robot 100, speak through the robot 100 (i.e., telepresence), enter into a power-saving mode (e.g., reduce functionality), find a charger, etc. The location manager or a user can use applications 1610 to manage users, security, layout maps 1810, video view fields, add/remove robots to/from the fleet, and more. Remote operators of the robot 100 can schedule/reschedule/cancel a robot appointment (e.g., using the scheduling application 1610d) and attend a training course using a simulated robot that roams a simulated space (e.g., using the simulator 1670 executing on a cloud server).

The SDK libraries 1644 may include one or more source code libraries for use by developers 1602 of applications 1610. For example, a visual component library can provide graphical user interface or visual components having interfaces for accessing encapsulated functionality. Exemplary visual components include code classes for drawing layout map tiles and robots, video conferencing, viewing images and documents, and/or displaying calendars or schedules. A robot communication library (e.g., a web services API) can provide a RESTful (Representational State Transfer), JSON (JavaScript Object Notation)-based API for communicating directly with the robot 100. The robot communication library can offer Objective-C binding (e.g., for iOS development) and Java binding (e.g., for ANDROID® development). These object-oriented APIs allow applications 1610 to communicate with the robot 100, while encapsulating from the developers 1602 underlying data transfer protocol(s) of the robot 100. A person following routine of the robot communication library may return a video screen coordinate corresponding to a person tracked by the robot 100. A facial recognition routine of the robot communication library may return a coordinate of a face on a camera view of the camera 320 and optionally the name of the recognized tracked person. Table 1 provides an exemplary list of robot communication services.

TABLE 1

| Service | Description |
| --- | --- |
| Database Service | List all available map databases on the robot 100. |
| Create Database Service | Create a robot map database. |
| Delete Database Service | Delete a robot map database. |
| Map List Service | Return a list of maps from a map database on the robot 100. |
| Map Service | Return a specific robot map. |
| Create Map Service | Create a robot map in a database. |
| Delete Map Service | Delete a robot map from a database. |
| Create Tag Service | Create a tag for a map in a database (e.g., by providing x, y, and z coordinates of the tag position an orientation angle of the robot, in radians, and a brief description of the tag). |
| Delete Tag Service | Delete a tag for a map in a database. |
| List Tags Service | List tags for a specified map in a specified database. |
| Cameras Service | List available cameras 320, 450 on the robot 100. |
| Camera Image Service | Take a snapshot from a camera 320, 450 on the robot 100. |
| Robot Position Service | Return a current position of the robot 100. The position can be returned as: x -- a distance along an x-axis from an origin (in meters). y -- a distance along a y-axis from an origin (in meters). theta -- an angle from the x-axis, measured counterclockwise in radians. |
| Robot Destination Service | Sets a destination location of the robot 100 and commands the robot 100 to begin moving to that location. |
| Drive-To-Tag Service | Drives the robot 100 to a tagged destination in a map. |
| Stop Robot Service | Commands the robot 100 to stop moving. |
| Robot Info Service | Provide basic robot information (e.g., returns a dictionary of the robot information). |

A cloud services communication library may include APIs that allow applications 1610 to communicate with the cloud 1620 (e.g., with cloud storage 1622, applications servers 1650, databases 1660 and the simulator 1670) and/or robots 100 in communication with the cloud 1620. The cloud services communication library can be provided in both Objective-C and Java bindings. Examples of cloud services APIs include a navigation API (e.g., to retrieve positions, set destinations, etc.), a map storage and retrieval PAI, a camera feed API, a teleoperation API, a usage statistics API, and others.

A cloud services extensibility interface may allow the cloud services to interact with web services from external sources. For example, the cloud services may define a set of extension interfaces that allow enterprise developers 1603 to implement interfaces for external proprietary systems. The extensions can be uploaded and deployed to the cloud infrastructure. In some examples, the cloud services can adopt standard extensibility interface defined by various industry consortiums.

The simulator 1670 may allow debugging and testing of applications 1610 without connectivity to the robot 100. The simulator 1670 can model or simulate operation of the robot 100 without actually communicating with the robot 100 (e.g., for path planning and accessing map databases). For executing simulations, in some implementations, the simulator 1670 produces a map database (e.g., from a layout map 1810) without using the robot 100. This may involve image processing (e.g., edge detection) so that features (like walls, corners, columns, etc) are automatically identified. The simulator 1670 can use the map database to simulate path planning in an environment dictated by the layout map 1810.

A cloud services extension uploader/deployer may allow users upload extensions to the cloud 1620, connect to external third party user authentication systems, access external databases or storage (e.g., patient info for pre-consult and post-consult), access images for illustration in video conferencing sessions, etc. The cloud service extension interface may allow integration of proprietary systems with the cloud 1620.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Implementations of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of operating a mobile robot, the method comprising:
 receiving, at a data processing device, a layout map corresponding to an environment of the robot;
 moving the robot in the environment to one or more layout map locations on the layout map;

recording, in non-transitory memory in communication with the data processing device, one or more robot map locations on a robot map, the robot map corresponding to the environment and produced by the robot;

determining, using the data processing device, a distortion between the robot map and the layout map using the recorded robot map locations of the robot map and the corresponding layout map locations of the layout map; and applying, using the data processing device, the determined distortion to a target layout map location to determine a corresponding target robot map location.

2. The method of claim 1, further comprising receiving, at the data processing device, the layout map from a cloud computing service.

3. The method of claim 2, further comprising producing the layout map on an application executing on a remote computing device and storing the layout map on a remote cloud storage device using the cloud computing service.

4. The method of claim 1, further comprising:
determining, using the data processing device, a scaling size, origin mapping, and rotation between the layout map and the robot map using existing layout map locations and recorded robot map locations; and
resolving, using the data processing device, a robot map location corresponding to the target layout map location.

5. The method of claim 4, further comprising applying data processing device, an affine transformation to the determined scaling size, origin mapping, and rotation to resolve the target robot map location.

6. The method of claim 1, further comprising determining, using the data processing device, a triangulation between layout map locations that bound the target layout map location.

7. The method of claim 6, further comprising determining, using the data processing device, a scale, rotation, translation, and skew between a triangle mapped in the layout map and a corresponding triangle mapped in the robot map and applying the determined scale, rotation, translation, and skew to the target layout map location to determine the corresponding robot map point.

8. The method of claim 1, further comprising:
determining, using the data processing device, distances between all layout map locations and the target layout map location;
determining, using the data processing device, a centroid of the layout map locations;
determining, using the data processing device, a centroid of all recorded robot map locations; and
for each layout map location, determining a rotation and a length scaling to transform a vector running from the layout map centroid to the target layout location into a vector running from the robot map centroid to the target robot map location.

9. The method of claim 1, further comprising producing the robot map using a sensor system of the robot.

10. The method of claim 9, further comprising
emitting light onto a scene of the environment;
receiving reflections of the emitted light off surfaces of the scene;
determining, using the data a distance of each reflecting surface; and
constructing, using the data processing device, a three-dimensional depth map of the scene.

11. The method of claim 10, further comprising emitting a speckle pattern of light onto the scene and receiving reflections of the speckle pattern from the scene.

12. The method of claim 11, further comprising storing, in the non-transitory memory, reference images of the speckle pattern as reflected off a reference object in the scene, the reference images captured at different distances from the reference object.

13. The method of claim 12, further comprising capturing at least one target image of the speckle pattern as reflected off a target object in the scene and comparing the at least one target image with the reference images for determining a distance of the reflecting surfaces of the target object.

14. The method of claim 13, further comprising determining a primary speckle pattern on the target object and computing at least one of a respective cross-correlation and a decorrelation between the primary speckle pattern and the speckle patterns of the reference images.

15. The method of claim 13, further comprising maneuvering the robot with respect to the target object based on the determined distances of the reflecting surfaces of the target object.

16. The method of claim 10, further comprising determining, using the data processing device, a time-of-flight between emitting the light and receiving the reflected light and determining, using the data processing device, a distance to the reflecting surfaces of the scene.

17. The method of claim 10, further comprising emitting the light onto the scene in intermittent pulses.

18. The method of claim 17, further comprising altering a frequency of the emitted light pulses.

* * * * *

UNITED STATES PATENT AND TRADEMARK OFFICE
CERTIFICATE OF CORRECTION

| | | |
|---|---|---|
| PATENT NO. | : 9,014,848 B2 | Page 1 of 1 |
| APPLICATION NO. | : 13/032406 | |
| DATED | : April 21, 2015 | |
| INVENTOR(S) | : Timothy S. Farlow | |

It is certified that error appears in the above-identified patent and that said Letters Patent is hereby corrected as shown below:

In the Claims

At column 41, claim number 5, line number 27, should read "The method of claim 4, further comprising applying, using the data processing device"

At column 42, claim number 10, line number 12, should read "determining, using the data processing device, a distance of each reflecting surface"

Signed and Sealed this
First Day of September, 2015

Michelle K. Lee
*Director of the United States Patent and Trademark Office*